US012734676B2

(12) United States Patent
Smith

(10) Patent No.: US 12,734,676 B2
(45) Date of Patent: Sep. 15, 2026

(54) SENSOR SUITE DISCREPANCY DETECTION SYSTEM FOR SAFE OPERATION OF AN EXOSKELETON

(71) Applicant: Palladyne Corp., Salt Lake City, UT (US)

(72) Inventor: Fraser M. Smith, Salt Lake City, UT (US)

(73) Assignee: Palladyne Corp., Salt Lake City, UT (US)

( * ) Notice: Subject to any disclaimer, the term of this patent is extended or adjusted under 35 U.S.C. 154(b) by 73 days.

(21) Appl. No.: 18/332,660

(22) Filed: Jun. 9, 2023

(65) Prior Publication Data

US 2023/0330837 A1 Oct. 19, 2023

Related U.S. Application Data

(63) Continuation-in-part of application No. 17/114,460, filed on Dec. 7, 2020, now abandoned.

(51) Int. Cl.

*B25J 13/08* (2006.01)
*B25J 9/00* (2006.01)
*B25J 9/16* (2006.01)

(52) U.S. Cl.

CPC ........... *B25J 9/0006* (2013.01); *B25J 13/085* (2013.01)

(58) Field of Classification Search

CPC ...... B25J 9/0006; B25J 13/085; B25J 9/1674; B25J 9/1694; G05B 2219/31294; G05B 2219/37325; G05B 2219/37326; G05B 2219/40204; G05B 2219/40305; G05B 2219/42329

See application file for complete search history.

(56) References Cited

U.S. PATENT DOCUMENTS 1,880,138 A 9/1932 Franz
2,850,189 A 9/1958 Leroy
(Continued)

FOREIGN PATENT DOCUMENTS

CN 101214653 A 7/2008
CN 101823517 A 9/2010
(Continued)

OTHER PUBLICATIONS

International Search Report for International Application No. PCT/US2023/072422 dated Dec. 18, 2023, 12 pages.
(Continued)

*Primary Examiner* — Adam R Mott
*Assistant Examiner* — Heather J Keniry
(74) *Attorney, Agent, or Firm* — Thorpe North & Western, LLP

(57) ABSTRACT

An exoskeleton comprising a plurality of support structures, and a plurality of joint mechanisms each joint mechanism rotatably coupling at least two of the plurality of support structures. A sensor discrepancy detection system can be operable to compare sensor output data from a user operated force moment sensor and at least one torque sensor of a joint mechanism. A controller can be configured to recruit at least one substitute sensor from a first sensor group of based on an identified discrepancy between the sensor output data and to execute a remedial measure associated with a safety mode of the exoskeleton for safe operation of the exoskeleton.

20 Claims, 20 Drawing Sheets

(56) References Cited

U.S. PATENT DOCUMENTS

| | | | |
|---|---|---|---|
| 2,981,198 | A | 4/1961 | Nettel |
| 3,171,549 | A | 3/1965 | Orloff |
| 3,280,991 | A | 10/1966 | Melton et al. |
| 3,306,646 | A | 2/1967 | Flora, Jr. |
| 3,358,678 | A | 12/1967 | Kulstar |
| 3,449,008 | A | 6/1969 | Colechia |
| 3,449,769 | A | 6/1969 | Mizen |
| 3,535,711 | A | 10/1970 | Fick |
| 3,759,563 | A | 9/1973 | Kitamura |
| 3,858,468 | A | 1/1975 | Pasbrig |
| 4,046,262 | A | 9/1977 | Vykukal et al. |
| 4,179,233 | A | 12/1979 | Bromell et al. |
| 4,200,596 | A | 4/1980 | Iiyama et al. |
| 4,251,791 | A | 2/1981 | Yanagisawa et al. |
| 4,367,891 | A | 1/1983 | Wauer et al. |
| 4,398,110 | A | 8/1983 | Flinchbaugh et al. |
| 4,483,407 | A | 11/1984 | Iwamoto et al. |
| 4,561,686 | A | 12/1985 | Atchley |
| 4,567,417 | A | 1/1986 | Francois et al. |
| 4,575,297 | A | 3/1986 | Richter |
| 4,591,944 | A | 5/1986 | Gravel |
| 4,598,601 | A | 7/1986 | Molaug |
| 4,603,896 | A | 8/1986 | Vasseur et al. |
| 4,661,032 | A | 4/1987 | Arai |
| 4,666,357 | A | 5/1987 | Babbi |
| 4,723,353 | A | 2/1988 | Monforte |
| 4,762,455 | A | 8/1988 | Coughlan et al. |
| 4,768,143 | A | 8/1988 | Lane et al. |
| 4,821,594 | A | 4/1989 | Rosheim et al. |
| 4,834,443 | A | 5/1989 | Crowder et al. |
| 4,853,874 | A | 8/1989 | Iwamoto et al. |
| 4,883,400 | A | 11/1989 | Kuban et al. |
| 4,884,720 | A | 12/1989 | Whigham et al. |
| 4,915,437 | A | 4/1990 | Cherry |
| 4,921,292 | A | 5/1990 | Harwell et al. |
| 4,997,095 | A | 3/1991 | Jones et al. |
| 5,004,391 | A | 4/1991 | Burdea |
| 5,038,089 | A | 8/1991 | Szakaly |
| 5,072,361 | A | 12/1991 | Davis et al. |
| 5,080,682 | A | 1/1992 | Schectman |
| 5,101,472 | A | 3/1992 | Repperger |
| 5,105,367 | A | 4/1992 | Tsuchihashi et al. |
| 5,117,814 | A | 6/1992 | Luttrell et al. |
| 5,144,943 | A | 9/1992 | Luttrell et al. |
| 5,172,951 | A | 12/1992 | Jacobsen et al. |
| 5,230,147 | A | 7/1993 | Asaoka et al. |
| 5,239,246 | A | 8/1993 | Kim |
| 5,246,216 | A | 9/1993 | Oberst |
| 5,280,981 | A | 1/1994 | Schulz |
| 5,282,460 | A | 2/1994 | Boldt |
| 5,328,224 | A | 7/1994 | Jacobsen et al. |
| 5,336,982 | A | 8/1994 | Backes |
| 5,389,849 | A | 2/1995 | Asano et al. |
| 5,399,951 | A | 3/1995 | Lavallee et al. |
| 5,402,690 | A | 4/1995 | Sekiguchi et al. |
| 5,516,249 | A | 5/1996 | Brimhall |
| 5,577,417 | A | 11/1996 | Fournier |
| 5,577,902 | A | 11/1996 | Todo et al. |
| 5,588,688 | A | 12/1996 | Jacobsen et al. |
| 5,664,636 | A | 9/1997 | Ikuma et al. |
| 5,704,945 | A | 1/1998 | Wagner et al. |
| 5,762,390 | A | 6/1998 | Gosselin et al. |
| 5,784,542 | A | 7/1998 | Ohm et al. |
| 5,785,505 | A | 7/1998 | Price |
| 5,797,615 | A | 8/1998 | Murray |
| 5,845,540 | A | 12/1998 | Rosheim |
| 5,865,770 | A | 2/1999 | Schectman |
| 5,898,599 | A | 4/1999 | Massie et al. |
| 5,912,658 | A | 6/1999 | Bergamasco et al. |
| 5,949,686 | A | 9/1999 | Yoshinada et al. |
| 5,957,981 | A | 9/1999 | Gramnas |
| 5,961,476 | A | 10/1999 | Betto et al. |
| 5,967,580 | A | 10/1999 | Rosheim |
| 5,994,864 | A | 11/1999 | Inoue et al. |
| 6,016,385 | A | 1/2000 | Yee et al. |
| 6,170,162 | B1 | 1/2001 | Jacobsen et al. |
| 6,202,013 | B1 | 3/2001 | Anderson et al. |
| 6,272,924 | B1 | 8/2001 | Jansen |
| 6,301,526 | B1 | 10/2001 | Kim et al. |
| 6,338,605 | B1 | 1/2002 | Halverson et al. |
| 6,340,065 | B1 | 1/2002 | Harris |
| 6,360,166 | B1 | 3/2002 | Alster |
| 6,394,731 | B1 | 5/2002 | Konosu et al. |
| 6,425,865 | B1 | 7/2002 | Salcudean et al. |
| 6,430,473 | B1 | 8/2002 | Lee et al. |
| 6,435,794 | B1 | 8/2002 | Springer |
| 6,507,163 | B1 | 1/2003 | Allen |
| 6,508,058 | B1 | 1/2003 | Seaverson |
| 6,554,342 | B1 | 4/2003 | Burnett |
| 6,641,371 | B2 | 11/2003 | Graziani et al. |
| 6,659,703 | B1 | 12/2003 | Kirkley |
| 6,659,939 | B2 | 12/2003 | Moll et al. |
| 6,663,154 | B2 | 12/2003 | Pancheri |
| 6,714,839 | B2 | 3/2004 | Salisbury, Jr. et al. |
| 6,740,125 | B2 | 5/2004 | Mosler |
| 6,855,170 | B2 | 2/2005 | Gramnas |
| 6,920,374 | B2 | 7/2005 | Takenaka et al. |
| 7,168,748 | B2 | 1/2007 | Townsend et al. |
| 7,319,919 | B2 | 1/2008 | Takenaka et al. |
| 7,337,040 | B2 | 2/2008 | Takenaka et al. |
| 7,379,789 | B2 | 5/2008 | Takenaka et al. |
| 7,396,057 | B2 | 7/2008 | Ye et al. |
| 7,405,531 | B2 | 7/2008 | Khatib et al. |
| 7,409,882 | B2 | 8/2008 | Massimo et al. |
| 7,410,338 | B2 | 8/2008 | Schiele et al. |
| 7,509,905 | B2 | 3/2009 | Jacobsen et al. |
| 7,628,766 | B1 | 12/2009 | Kazerooni et al. |
| 7,783,384 | B2 | 8/2010 | Kraft |
| 7,862,522 | B1 | 1/2011 | Barclay et al. |
| 7,862,524 | B2 | 1/2011 | Carignan et al. |
| 7,883,546 | B2 | 2/2011 | Kazerooni et al. |
| 7,947,004 | B2 | 5/2011 | Kazerooni et al. |
| 7,965,006 | B2 | 6/2011 | Kang et al. |
| 8,024,071 | B2 | 9/2011 | Komatsu et al. |
| 8,051,764 | B2 | 11/2011 | Jacobsen et al. |
| 8,100,451 | B2 | 1/2012 | Okuda et al. |
| 8,112,179 | B2 | 2/2012 | Nakajima |
| 8,132,835 | B2 | 3/2012 | Ban et al. |
| 8,151,401 | B2 | 4/2012 | Cheyne |
| 8,182,010 | B2 | 5/2012 | Lee et al. |
| 8,204,626 | B2 | 6/2012 | Yoshiike et al. |
| 8,245,728 | B2 | 8/2012 | Jacobsen et al. |
| 8,295,975 | B2 | 10/2012 | Arimatsu et al. |
| 8,336,420 | B2 | 12/2012 | Carter et al. |
| 8,375,982 | B2 | 2/2013 | Gray, Jr. |
| 8,435,309 | B2 | 5/2013 | Gilbert et al. |
| 8,452,447 | B2 | 5/2013 | Nixon |
| 8,473,101 | B2 | 6/2013 | Summer |
| 8,511,192 | B2 | 8/2013 | Hirtt et al. |
| 8,516,918 | B2 | 8/2013 | Jacobsen et al. |
| 8,529,582 | B2 | 9/2013 | Devengenzo et al. |
| 8,534,728 | B1 | 9/2013 | Bosscher et al. |
| 8,560,118 | B2 | 10/2013 | Greer et al. |
| 8,626,326 | B1 | 1/2014 | Theobald et al. |
| 8,640,723 | B2 | 2/2014 | Jacobsen et al. |
| 8,667,643 | B2 | 3/2014 | Simonelli et al. |
| 8,672,378 | B2 | 3/2014 | Yamasaki et al. |
| 8,747,486 | B2 | 6/2014 | Kawasaki et al. |
| 8,794,262 | B2 | 8/2014 | Jacobsen et al. |
| 8,821,338 | B2 | 9/2014 | Thorson |
| 8,849,457 | B2 | 9/2014 | Jacobsen et al. |
| 8,870,967 | B2 | 10/2014 | Herr et al. |
| 8,881,616 | B2 | 11/2014 | Dize et al. |
| 8,888,864 | B2 | 11/2014 | Iversen et al. |
| 8,892,258 | B2 | 11/2014 | Jacobsen et al. |
| 8,920,517 | B2 | 12/2014 | Smith et al. |
| 8,942,846 | B2 | 1/2015 | Jacobsen et al. |
| 8,977,388 | B2 | 3/2015 | Jacobsen et al. |
| 8,977,398 | B2 | 3/2015 | Jacobsen et al. |
| 9,079,305 | B2 | 7/2015 | Williamson et al. |
| 9,098,075 | B2 * | 8/2015 | Seo ........................ B25J 13/085 |
| 9,205,560 | B1 | 12/2015 | Edsinger et al. |
| 9,295,604 | B2 | 3/2016 | Zoss et al. |
| 9,314,921 | B2 | 4/2016 | Jacobsen et al. |

(56) References Cited

U.S. PATENT DOCUMENTS 9,329,587 B2 5/2016 Fudaba et al.
9,333,097 B2 5/2016 Herr et al.
9,346,165 B1 5/2016 Metzger et al.
9,446,510 B2 9/2016 Vu et al.
9,526,636 B2 12/2016 Bedard et al.
9,533,411 B2 1/2017 Jacobsen et al.
9,616,580 B2 4/2017 Smith et al.
9,618,937 B1 4/2017 Blankespoor et al.
9,643,323 B2 5/2017 Nagatsuka et al.
9,727,076 B2 8/2017 Smith et al.
9,789,603 B2 10/2017 Jacobsen et al.
9,862,090 B2 1/2018 Kennedy et al.
9,895,812 B2 2/2018 Gonzalez et al.
9,926,025 B1 3/2018 Blankespoor et al.
10,028,844 B2 7/2018 Cheng et al.
10,071,485 B2 9/2018 Schiele et al.
10,216,177 B2 2/2019 Gildert et al.
10,300,969 B1 5/2019 Blackespoor et al.
10,390,974 B2 8/2019 Clausen et al.
10,406,676 B2 9/2019 Smith et al.
10,512,583 B2 12/2019 Smith
10,518,404 B2 12/2019 Barnes
10,533,542 B2 1/2020 Smith et al.
10,561,564 B2 2/2020 LaChappelle et al.
10,566,914 B2 2/2020 Fujita et al.
10,609,896 B2 4/2020 Kraaij et al.
10,709,633 B2 7/2020 Kazerooni et al.
10,765,537 B2 9/2020 Smith et al.
10,828,767 B2 11/2020 Smith et al.
11,148,279 B1 10/2021 Mooney et al.
11,241,801 B2 2/2022 Smith et al.
2001/0033146 A1 10/2001 Kato et al.
2001/0043847 A1 11/2001 Kramer
2002/0075233 A1 6/2002 White et al.
2002/0094919 A1 7/2002 Rennex et al.
2003/0005896 A1 1/2003 Jacobsen et al.
2003/0060808 A1 3/2003 Wilk
2003/0146720 A1 8/2003 Riwan et al.
2003/0152452 A1 8/2003 Hodgson
2003/0223844 A1 12/2003 Schiele et al.
2004/0004362 A1 1/2004 Love
2004/0037681 A1 2/2004 Marcotte
2004/0102723 A1 5/2004 Horst
2004/0106881 A1 6/2004 McBean et al.
2004/0116836 A1 6/2004 Kawai et al.
2004/0246769 A1 12/2004 Ido
2004/0250644 A1 12/2004 Gosselin et al.
2005/0059908 A1 3/2005 Bogert
2005/0099386 A1 5/2005 Kukita
2005/0159850 A1 7/2005 Melman
2005/0166413 A1 8/2005 Crampton
2005/0193451 A1 9/2005 Quistgaard et al.
2005/0251110 A1 11/2005 Nixon
2006/0052732 A1 3/2006 Shimada et al.
2006/0064047 A1 3/2006 Shimada et al.
2006/0069449 A1 3/2006 Bisbee, III et al.
2006/0130594 A1 6/2006 Ikeuchi
2006/0149419 A1 7/2006 Ogawa et al.
2006/0184275 A1 8/2006 Hosokawa et al.
2006/0197049 A1 9/2006 Hamada et al.
2006/0245897 A1 11/2006 Hariki et al.
2006/0249315 A1 11/2006 Herr et al.
2007/0054777 A1 3/2007 Kawai et al.
2007/0056592 A1 3/2007 Angold et al.
2007/0105070 A1 5/2007 Trawick
2007/0123997 A1 5/2007 Herr et al.
2007/0129653 A1 6/2007 Sugar et al.
2008/0009771 A1 1/2008 Perry et al.
2008/0023974 A1 1/2008 Park et al.
2008/0156363 A1 7/2008 Ikeuchi et al.
2008/0269027 A1 10/2008 Chen
2008/0271942 A1 11/2008 Yamashita et al.
2008/0281468 A1 11/2008 Jacobsen et al.
2009/0036815 A1 2/2009 Ido
2009/0038258 A1 2/2009 Pivac et al.
2009/0039579 A1 2/2009 Clifford et al.
2009/0149993 A1 6/2009 Neki et al.
2009/0199883 A1 8/2009 Hiki
2009/0210093 A1 8/2009 Jacobsen et al.
2009/0294238 A1 12/2009 Gilmore
2010/0017033 A1 1/2010 Boca
2010/0050947 A1 3/2010 Kortekaas
2010/0089855 A1 4/2010 Kjolseth
2010/0094185 A1 4/2010 Amundson et al.
2010/0152630 A1 6/2010 Matsuoka et al.
2010/0198402 A1 8/2010 Greer et al.
2010/0234996 A1 9/2010 Schreiber et al.
2010/0241242 A1 9/2010 Herr et al.
2010/0295497 A1 11/2010 Takamatsu
2011/0010012 A1 1/2011 Murayama et al.
2011/0015786 A1 1/2011 Kawai
2011/0040216 A1 2/2011 Herr et al.
2011/0046781 A1 2/2011 Summer
2011/0066088 A1 3/2011 Little et al.
2011/0071677 A1 3/2011 Stillman
2011/0214524 A1 9/2011 Jacobsen et al.
2011/0219899 A1 9/2011 Dize et al.
2011/0264230 A1 10/2011 Herr et al.
2012/0000891 A1 1/2012 Nakanishi et al.
2012/0060322 A1 3/2012 Simonelli et al.
2012/0065902 A1 3/2012 Nakajima
2012/0073930 A1 3/2012 Lansberry et al.
2012/0137667 A1 6/2012 Jacobsen et al.
2012/0179075 A1* 7/2012 Perry ..................... B25J 9/0006
601/33
2012/0191245 A1 7/2012 Fudaba et al.
2012/0216671 A1 8/2012 Gammon
2012/0237319 A1 9/2012 Jacobsen et al.
2012/0259429 A1 10/2012 Han et al.
2012/0277901 A1 11/2012 Jacobsen et al.
2012/0277911 A1 11/2012 Jacobsen et al.
2012/0277915 A1 11/2012 Jacobsen et al.
2012/0328395 A1 12/2012 Jacobsen et al.
2013/0011220 A1 1/2013 Jacobsen et al.
2013/0013108 A1 1/2013 Jacobsen et al.
2013/0023803 A1 1/2013 Hsu et al.
2013/0033050 A1 2/2013 Matsuoka et al.
2013/0057001 A1 3/2013 Tsai
2013/0090580 A1 4/2013 Hong et al.
2013/0106127 A1 5/2013 Lipson et al.
2013/0106128 A1 5/2013 Yamasaki et al.
2013/0192406 A1 8/2013 Godowski
2013/0223204 A1 8/2013 Angst et al.
2013/0226048 A1 8/2013 Unluhisarcikili et al.
2013/0253385 A1 9/2013 Goffer et al.
2013/0296746 A1 11/2013 Herr et al.
2013/0302129 A1 11/2013 Smith et al.
2013/0306430 A1 11/2013 Laffranchi et al.
2013/0331744 A1 12/2013 Kamon
2013/0333368 A1 12/2013 Durfee et al.
2014/0028453 A1 1/2014 Schwenkel et al.
2014/0067124 A1 3/2014 Williamson et al.
2014/0088728 A1 3/2014 Herr
2014/0100492 A1 4/2014 Nagasaka
2014/0190289 A1 7/2014 Zhu
2014/0195052 A1 7/2014 Tsusaka et al.
2015/0073595 A1 3/2015 Fudaba et al.
2015/0073596 A1 3/2015 Fudaba et al.
2015/0173929 A1 6/2015 Kazerooni et al.
2015/0209214 A1 7/2015 Herr et al.
2015/0217457 A1 8/2015 Lipson et al.
2015/0224638 A1 8/2015 Dockter
2015/0272749 A1 10/2015 Amend, Jr. et al.
2015/0278263 A1 10/2015 Bowles et al.
2015/0289995 A1 10/2015 Wilkinson et al.
2015/0321340 A1 11/2015 Smith
2015/0321342 A1 11/2015 Smith et al.
2015/0351995 A1 12/2015 Zoss et al.
2016/0003268 A1 1/2016 Shevchenko et al.
2016/0114482 A1 4/2016 Lessing et al.
2016/0153508 A1 6/2016 Battlogg
2016/0279788 A1 9/2016 Kanaoka et al.
2016/0331556 A1 11/2016 Wijesundara et al.
2016/0331572 A1 11/2016 Popovic et al.

(56) References Cited

U.S. PATENT DOCUMENTS

| | | | |
|---|---|---|---|
| 2016/0332302 | A1 | 11/2016 | Bingham et al. |
| 2016/0332305 | A1 | 11/2016 | Gonzalez et al. |
| 2016/0332312 | A1 | 11/2016 | Song et al. |
| 2017/0050310 | A1 | 2/2017 | Kanaoka |
| 2017/0119132 | A1 | 5/2017 | Pruess et al. |
| 2017/0326737 | A1 | 11/2017 | Martin et al. |
| 2018/0098864 | A1 | 4/2018 | Auberger et al. |
| 2018/0126548 | A1 | 5/2018 | Sugito et al. |
| 2018/0133905 | A1 | 5/2018 | Smith et al. |
| 2018/0133906 | A1 | 5/2018 | Smith et al. |
| 2018/0193172 | A1 | 7/2018 | Smith et al. |
| 2018/0193999 | A1 | 7/2018 | Jacobsen et al. |
| 2018/0194000 | A1 | 7/2018 | Smith et al. |
| 2018/0221237 | A1 | 8/2018 | Swift et al. |
| 2018/0290309 | A1 | 10/2018 | Becker et al. |
| 2018/0298976 | A1 | 10/2018 | Battlogg |
| 2019/0022853 | A1 | 1/2019 | Kim et al. |
| 2019/0042509 | A1 | 2/2019 | Buhlman et al. |
| 2019/0105777 | A1* | 4/2019 | Dalley .................. B25J 9/1615 |
| 2019/0138423 | A1 | 5/2019 | Agerstam et al. |
| 2019/0176320 | A1 | 6/2019 | Smith et al. |
| 2019/0184576 | A1 | 6/2019 | Smith et al. |
| 2019/0328937 | A1 | 10/2019 | Kim et al. |
| 2020/0001450 | A1 | 1/2020 | Smith et al. |
| 2020/0067570 | A1 | 2/2020 | Bauer et al. |
| 2020/0164523 | A1 | 5/2020 | Hallock et al. |
| 2020/0206948 | A1 | 7/2020 | Olivier et al. |
| 2020/0281803 | A1 | 9/2020 | Teng et al. |
| 2020/0312109 | A1 | 10/2020 | Shionozaki |
| 2020/0346009 | A1 | 11/2020 | Murray et al. |
| 2020/0368094 | A1 | 11/2020 | Yoshimi et al. |
| 2020/0405417 | A1 | 12/2020 | Shelton, IV et al. |
| 2021/0023693 | A1 | 1/2021 | Berger et al. |
| 2021/0039269 | A1 | 2/2021 | Son |
| 2021/0059780 | A1 | 3/2021 | Sutherland et al. |
| 2021/0369536 | A1 | 12/2021 | Mooney et al. |
| 2021/0378903 | A1* | 12/2021 | Mooney ............... A61H 1/0266 |
| 2022/0105633 | A1 | 4/2022 | Stoeffler et al. |
| 2022/0117825 | A1 | 4/2022 | Yuan |
| 2022/0176561 | A1 | 6/2022 | Smith et al. |
| 2023/0023083 | A1 | 1/2023 | Shelton, IV et al. |

FOREIGN PATENT DOCUMENTS

| | | | |
|---|---|---|---|
| CN | 101121424 | B | 2/2011 |
| CN | 101486191 | B | 11/2012 |
| CN | 103610524 | A | 3/2014 |
| CN | 203495949 | U | 3/2014 |
| CN | 103802907 | A | 5/2014 |
| CN | 203752160 | U | 8/2014 |
| CN | 104843484 | A | 8/2015 |
| CN | 105411813 | A | 3/2016 |
| CN | 205250544 | U | 5/2016 |
| CN | 105818143 | A | 8/2016 |
| CN | 105856190 | A | 8/2016 |
| CN | 107471203 | A | 12/2017 |
| CN | 108081303 | A | 5/2018 |
| CN | 106426097 | B | 6/2018 |
| CN | 109431752 | A | 3/2019 |
| CN | 111267992 | A | 6/2020 |
| CN | 111450492 | A | 7/2020 |
| CN | 111616914 | A | 9/2020 |
| CN | 109262596 | B | 10/2020 |
| CN | 112237528 | A | 1/2021 |
| CN | 112692812 | A | 4/2021 |
| CN | 112891150 | A | 6/2021 |
| DE | 102004029513 | B3 | 9/2005 |
| DE | 102010023914 | A1 | 9/2011 |
| DE | 102010029088 | A1 | 11/2011 |
| DE | 202013009698 | U1 | 11/2013 |
| DE | 102016201540 | A1 | 8/2017 |
| DE | 202018104980 | U1 | 9/2018 |
| EP | 0039578 | A1 | 11/1981 |
| EP | 0616275 | A3 | 9/1998 |
| EP | 1037264 | A2 | 9/2000 |
| EP | 1258324 | A2 | 11/2002 |
| EP | 1442846 | A1 | 8/2004 |
| EP | 1721593 | A1 | 11/2006 |
| EP | 2198810 | A1 | 6/2010 |
| EP | 2548543 | B1 | 1/2015 |
| EP | 2942162 | A2 | 11/2015 |
| EP | 2168548 | B1 | 10/2016 |
| EP | 3326759 | A1 | 5/2018 |
| EP | 3326760 | A1 | 5/2018 |
| EP | 3536297 | A1 | 9/2019 |
| FR | 2651220 | A1 | 3/1991 |
| GB | 686237 | A | 1/1953 |
| GB | 2278041 | A | 11/1994 |
| JP | S34-015764 | | 10/1959 |
| JP | S36-005228 | | 5/1961 |
| JP | S44-000603 | | 1/1969 |
| JP | S50-009803 | | 1/1975 |
| JP | S50-006043 | | 3/1975 |
| JP | S52-013252 | A | 2/1977 |
| JP | S52-134985 | A | 11/1977 |
| JP | S56-114688 | A | 9/1981 |
| JP | S56-140510 | A | 11/1981 |
| JP | S58-113586 | A | 7/1983 |
| JP | S58-45724 | B2 | 10/1983 |
| JP | S60-177883 | U | 11/1985 |
| JP | S62-193784 | A | 8/1987 |
| JP | S62-200600 | A | 9/1987 |
| JP | H01-295772 | A | 11/1989 |
| JP | H02-51083 | U | 4/1990 |
| JP | H02-298480 | | 12/1990 |
| JP | H03-85398 | U | 8/1991 |
| JP | H04-44296 | U | 4/1992 |
| JP | H05-004177 | A | 1/1993 |
| JP | H05-023989 | A | 2/1993 |
| JP | H06-213266 | A | 8/1994 |
| JP | H06-315879 | A | 11/1994 |
| JP | H07-001366 | A | 1/1995 |
| JP | H07-5129 | Y2 | 2/1995 |
| JP | H07-060679 | A | 3/1995 |
| JP | H07-112377 | A | 5/1995 |
| JP | H07-031291 | U | 6/1995 |
| JP | H07-246578 | A | 9/1995 |
| JP | H08-126984 | A | 5/1996 |
| JP | H09-11176 | A | 1/1997 |
| JP | H09-190207 | A | 7/1997 |
| JP | H1156931 | | 3/1999 |
| JP | H11-130279 | A | 5/1999 |
| JP | 2002-161547 | A | 6/2002 |
| JP | 2003-089084 | A | 3/2003 |
| JP | 2003-103480 | A | 4/2003 |
| JP | 2003-146575 | A | 5/2003 |
| JP | 2003-194104 | A | 7/2003 |
| JP | 2004-041279 | A | 2/2004 |
| JP | 2004-105261 | A | 4/2004 |
| JP | 2004-195576 | A | 7/2004 |
| JP | 2005-118938 | A | 5/2005 |
| JP | 2005-237504 | A | 9/2005 |
| JP | 2005-334999 | A | 12/2005 |
| JP | 2006-007337 | A | 1/2006 |
| JP | 2006-016916 | A | 1/2006 |
| JP | 2006-028953 | A | 2/2006 |
| JP | 2006-051558 | A | 2/2006 |
| JP | 2006-167223 | A | 6/2006 |
| JP | 3909770 | B2 | 4/2007 |
| JP | 2007-130234 | A | 5/2007 |
| JP | 2007-252514 | A | 10/2007 |
| JP | 2007-307216 | A | 11/2007 |
| JP | 2008-143449 | A | 6/2008 |
| JP | 2009-023828 | A | 2/2009 |
| JP | 2009-167673 | A | 7/2009 |
| JP | 2009-178253 | A | 8/2009 |
| JP | 2009-219650 | A | 10/2009 |
| JP | 2009-240488 | A | 10/2009 |
| JP | 2009-268839 | A | 11/2009 |
| JP | 2010-098130 | A | 4/2010 |
| JP | 2010-110381 | A | 5/2010 |
| JP | 2010-110465 | A | 5/2010 |
| JP | 2010-142351 | A | 7/2010 |
| JP | 2010-263761 | A | 11/2010 |

(56) References Cited

FOREIGN PATENT DOCUMENTS

| | | | |
|---|---|---|---|
| JP | 2011-067941 | A | 4/2011 |
| JP | 2011-073127 | A | 4/2011 |
| JP | 2011-156171 | A | 8/2011 |
| JP | 2011-193899 | A | 10/2011 |
| JP | 2011-230260 | A | 11/2011 |
| JP | 2012-501739 | A | 1/2012 |
| JP | 2012-125279 | A | 7/2012 |
| JP | 2012-176476 | A | 9/2012 |
| JP | 2012-183291 | A | 9/2012 |
| JP | 2013-022091 | A | 2/2013 |
| JP | 2013-090693 | A | 5/2013 |
| JP | 2013-123786 | A | 6/2013 |
| JP | 2013-142445 | A | 7/2013 |
| JP | 5267730 | | 8/2013 |
| JP | 2013-176429 | A | 9/2013 |
| JP | 2013-208293 | A | 10/2013 |
| JP | 2013-220496 | A | 10/2013 |
| JP | 2013-248699 | A | 12/2013 |
| JP | 2014-054273 | A | 3/2014 |
| JP | 2014-073199 | A | 4/2014 |
| JP | 2014-073222 | A | 4/2014 |
| JP | 2014-516433 | A | 7/2014 |
| JP | 2014-200853 | A | 10/2014 |
| JP | 2015-112649 | A | 6/2015 |
| JP | 2015-208814 | A | 11/2015 |
| JP | 2015-212010 | A | 11/2015 |
| JP | 2015-214019 | A | 12/2015 |
| JP | 2016-539017 | A | 12/2016 |
| JP | 2018-143572 | A | 9/2018 |
| JP | 2018-167375 | A | 11/2018 |
| JP | 2018-207770 | A | 12/2018 |
| JP | 2020-037164 | A | 3/2020 |
| JP | 6748374 | B2 | 9/2020 |
| JP | 2022-526788 | A | 5/2022 |
| JP | 2022-113444 | A | 8/2022 |
| KR | 2005-0037754 | A | 4/2005 |
| KR | 2007-0057209 | A | 6/2007 |
| KR | 2010-0112670 | | 10/2010 |
| KR | 2012-0105194 | A | 9/2012 |
| KR | 10-1219795 | | 1/2013 |
| KR | 2013-0001409 | A | 1/2013 |
| KR | 2013-0045777 | A | 5/2013 |
| KR | 2018-0128731 | A | 12/2018 |
| KR | 2019-0108386 | A | 9/2019 |
| SE | 515372 | C2 | 7/2001 |
| WO | WO 94/29605 | | 12/1994 |
| WO | WO 2003/002309 | A1 | 1/2003 |
| WO | WO 2003/081762 | A1 | 10/2003 |
| WO | WO 2007/144629 | A2 | 12/2007 |
| WO | WO 2009/040908 | A1 | 4/2009 |
| WO | WO 2009/143377 | A2 | 11/2009 |
| WO | WO 2010/025409 | A1 | 3/2010 |
| WO | WO 2010/027968 | A2 | 3/2010 |
| WO | WO 2012/042471 | A1 | 4/2012 |
| WO | WO 2016/049622 | A1 | 3/2016 |
| WO | WO 2017/148499 | A1 | 9/2017 |
| WO | WO 2017/159504 | A1 | 9/2017 |
| WO | WO 2018/118004 | A1 | 6/2018 |
| WO | WO 2018/211869 | A1 | 11/2018 |
| WO | WO 2018/215705 | A1 | 11/2018 |
| WO | WO 2019/060791 | A1 | 3/2019 |
| WO | WO 2020/175949 | A1 | 9/2020 |
| WO | WO 2021/053623 | A1 | 3/2021 |

OTHER PUBLICATIONS

Invitation to Pay Additional Fees for International Application No. PCT/US2023/074396 dated Dec. 19, 2023, 11 pages.

Partial European Search Report for European Application No. 23192598.3 dated Jan. 4, 2024, 12 pages.

Aghili et al., Sensing the torque in a robot's joints, www.memagazine.org/backissues/september98/features/torque/torque.html, 1998, pp. 1-9, The American Society of Mechanical Engineers.

Albu-Schaffer et al., A Unified Passivity Based Control Framework for Position, Torque and Impedance Control of Flexible Joint Robots, Institute of Robotics and Mechatronics, 2007, vol. 26, 17 pages, Germany.

Aliens (Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 00:27:40-00:28:05 & 02:08:25-02:10:39 Non-Patent Literature documentation; Aliens(1986)—IMDb; downloaded Sep. 27, 2014; 4 pages; http://www.imdb.com/title/ttl0090605/.

Amikabir University of Technology, Manipulator Dynamics (Power Point), Computer Engineering and Information Technology Department, to the best of applicant's knowledge article was available before the application filing date, 44 pages.

Bao et al., A unified modeling and control design for precision transmission system with friction and backlash, Advances in Mechanical Engineering, 2016, vol. 8(5), 11 pages.

Barras, Stabilization of a Biped Robot with its arms—A Practical Approach, http://biorob.epfl.ch/files/content/sites/biorob/files/users/170220/public/Report.pdf; May 2010, 33 pages, EPFL Biorobotics Laboratory (BioRob), Switzerland.

Bauman, Utah Firm Markets on Big Gorilla of an Arm, Deseret News; Jan. 27, 1993, 2 pages, Deseret News Publishing Company, Salt Lake City, Utah.

Claeyssen et al., Magnetostrictive actuators compared to piezoelectric actuators, Proceedings of SPIE—The International Society for Optical Engineering 4763, Mar. 2003, 6 pages.

David et al., Study of an External Passive Shock-absorbing Mechanism for Walking Robots, 8th IEEE International Conference on Humanoid Robots, Dec. 1-3, 2008, pp. 435-440, Institute of Electrical and Electronics Engineers, Piscataway, New Jersey.

Desai et al., Robust Swing Leg Placement under Leg Disturbances, 2012 IEEE International Conference on Robotics and Biomimetics, Dec. 11-14, 2012, pp. 265-270, China.

Digital World Tokyo, Giant Robot Grabbing Hands Grab All They Can, www.digitalworkltokyo.com/index.php/digital_tokyo/articles/giant_robot_grabbing_hands_grab_all_they_can/, Jul. 17, 2007, 3 pages.

Elliott et al., The Biomechanics and Energetics of Human Running using an Elastic Knee Exoskeleton, Jun. 2013, 7 pages, IEEE International Conference on Rehabilitation Robotics, Seattle, Washington.

Elliott et al., Design of a Clutch-Spring Knee Exoskeleton for Running, Journal of Medical Devices, Sep. 2014, 11 pages, vol. 8, The American Society of Mechanical Engineers, New York City, New York.

Endo et al., A quasi-passive model of human leg function in level-ground walking, 2006 IEEE/RSJ International Conference on Intelligent Robots and Systems, Oct. 9-15, 2006, pp. 4935-4939, Institute of Electrical and Electronics Engineers, Piscataway, New Jersey.

Filippeschi et al., Survey of Motion Tracking Methods on Inertial Sensors: A Focus on Upper Limb Human Motion, www.mdpi/journal/sensors, 2017, 40 pages, Sensors, Switzerland.

Gauthier et al., Magnetic Shape Memory Alloy and Actuator Design, Conference: 5th International Workshop on Microfactories (IWMF'06), Oct. 2006, 5 pages, Besançon, France.

Grabowski et al., Exoskeletons for Running and Hopping Augmentation, Journal of Applied Physiology, http://biomech.media.mit.edu/portfolio_page/load-bearing-exoskeleton-for-augmentation-of-human-running/, 2009, 4 pages, vol. 107, No. 3, American Physiological Society, United States.

Hauser et al., JammJoint: A Variable Stiffness Device Based on Granular Jamming for Wearable Joint Support, IEEE Robotics and Automation Letters, Apr. 2017, 7 pages, vol. 2, Issue 2, Institute of Electrical and Electronics Engineers, Piscataway, New Jersey.

Huber et al., The selection of mechanical actuators based on performance indices, Oct. 8, 1997, pp. 2185-2205, vol. 453 Issue 1965, The Royal Society, London.

(56) References Cited

OTHER PUBLICATIONS

Hunter et al., Fast Reversible NiTi Fibers For Use In Microrobotics, Proceedings. IEEE Micro Electro Mechanical Systems, Jan. 30-Feb. 2, 1991, pp. 166-170, Institute of Electrical and Electronics Engineers, Piscataway, New Jersey.
Industrial Magnetics, Inc., PowerLift® Magnets; www.magnetics.com/product.asp?ProductID=1; as accessed Nov. 6, 2012, 2 pages; Boyne City, Michigan.
Jacobsen et al., Design of the Utah/M.I.T. Dextrous Hand, IEEE International Conference on Robotics and Automation, 1986, pp. 1520-1532, Institute of Electrical and Electronics Engineers, Piscataway, New Jersey.
Jacobsen et al., Development of the Utah Artificial Arm, IEEE Transactions on Biomedical Engineering, Apr. 1982, pp. 249-269, vol. BME-29, No. 4, Institute of Electrical and Electronics Engineers, Piscataway, New Jersey.
Jacobsen et al., Research Robots for Application in AI, Teleoperation and Entertainment, Proceedings of the International Fluid Power Exposition and Technical Conference, Mar. 24-24, 1992, pp. 1-19, Chicago, Illinois.
Jacobsen et al., Research Robots for Applications in Artificial Intelligence, Teleoperation and Entertainment; The International Journal of Robotics Research; Apr.-May 2004, pp. 319-330, vol. 23, No. 4-5, SAGE Publications, Thousand Oaks, California.
Jacobsen, Science, Robotics, and Superheroes, Presented at Department of Science University of Utah Science at Breakfast, Mar. 17, 2010, 16 pages.
Jafari et al., A Novel Actuator with Adjustable Stiffness (AwAS), Oct. 18-22, 2010, 6 pages, IEEE/RSJ International Conference on Intelligent Robots and Systems, Taiwan.
Jansen et al., Exoskeleton for Soldier Enhancement Systems Feasibility Study, Sep. 2000, 44 pages, Oak Ridge National Laboratory, Oak Ridge, Tennessee.
Kaslin et al., Towards a Passive Adaptive Planar Foot with Ground Orientation and Contact Force Sensing for Legged Robots, IEEE International Conference on Intelligent Robots and Systems, Oct. 1-5, 2018, pp. 2707-2714, Institute of Electrical and Electronics Engineers, Piscataway, New Jersey.
Kazerooni, Berkeley Lower Extremity Exoskeleton (BLEEX), to the best of applicant's knowledge article was available before the application filing date, 3 pages, University of California, Berkeley, Berkeley, California.
Kim, Development of a small 6-axis force/moment sensor for robot's fingers, Measurement Science and Technology, Sep. 30, 2004, 2 pages, Issue 11, Institute of Physics and IOP Publishing Limited.
Kim et al., A Force Reflected Exoskeleton-Type Masterarm for Human-Robot Interaction, IEEE Transactions on Systems, Man and Cybertentics—Part A: Systems and Humans, Mar. 2005, pp. 198-212, vol. 35, No. 2, Institute of Electrical and Electronics Engineers, Piscataway, New Jersey.
Kulick, An Unpowered Exoskeleton Springs Into Action: Researchers Increase Walking Efficiency, http://www.cmu.edu/me/news/archive/2015/collins-clutch. html, Apr. 1, 2015, 2 pages, Carnegie Mellon University Mechanical Engineering, Pittsburgh, Pennsylvania.
Laliberte et al., Underactuation in Space Robotic Hands, Proceeding of the 6th International Symposium on Artificial Intelligence and Robotics & Automation in Space, Jun. 18-22, 2001, 8 pages, Canadian Space Agency, Canada.
Liu et al., Cat-inspired Mechanical Design of Self-Adaptive Toes for a Legged Robot, IEEE International Conference on Intelligent Robots and Systems, Oct. 9-14, 2016, pp. 2425-2430, Institute of Electrical and Electronics Engineers, Piscataway, New Jersey.
Liu et al., Concept and Design of a Lightweight Biped Robot for Walking on Rough Terrain, IEEE International Conference on Robotics and Biomimetics, 2017, 6 pages, Institute of Electrical and Electronics Engineers, Piscataway, New Jersey.
Magnetic Base, www.ask.com/wiki/magnetic_base; page last updated Sep. 12, 2012, 2 pages, retrieved from www.ask.com/wiki/magnetic_base.
Miao et al., Mechanical Design of Hybrid Leg Exoskeleton to Augment Load-Carrying for Walking, International Journal of Advanced Robotic Systems, Mar. 28, 2013, 11 pages, vol. 10, Intech open science open minds, Europe.
Mirfakhrai et al., Polymer artificial muscles, materialstoday, Apr. 2007, pp. 30-38, vol. 10 No. 4, Elsevier, Netherlands.
Mombaur et al., HEIKA-EXO: Optimization-based development and control of an exoskeleton for medical applications, http://typo.iwr.uni-heidelberg.de/groups/orb/research/heika-exo/, Optimization in Robotics & Biomechanics, Oct. 20, 2014, 3 pages, Germany.
Moosavian et al., Dynamics Modeling and Tip-Over Stability of Suspended Wheeled Mobile Robots with Multiple Arms, 2007 IEEE/RSJ International Conference on Intelligent Robots and Systems, Oct. 29-Nov. 2, 2007; pp. 1210-1215, Institute of Electrical and Electronics Engineers, Piscataway, New Jersey.
Newport Corporation, Heavy-Duty Magnetic Base, 300 lb (1334 N) Holding Force, 1⁄4-20 Thread, http://search.newport.com/?q=*&x2=sku&q2=200, as accessed Apr. 23, 2011, 1 page, Irvine, CA.
Oak Ridge National Laboratory, Foot Force-Torque Sensor Novel Sensor for Measuring Forces and Torques at the Foot, www.ornl.gov, to the best of applicant's knowledge article was available before the application filing date, 1 page, Oak Ridge National Laboratory, Oak Ridge, Tennessee.
Omega, Load Cell Designs, www.omega.com/literature/transactions/volume3/load3.html, Nov. 1, 2005, 3 pages.
Ostling, Wearable Robots, Technology Review, Jul./Aug. 2004, pp. 70-73, Elizabeth Bramson—Boudreau, Cambridge, Massachusetts.
Ott et al., Admittance Control using a Base Force/Torque Sensor, Department of Mechano-Informatics, 2009, 6 pages, University of Tokyo, Japan.
Pan, Improved Design of a Three-degree of Freedom Hip Exoskeleton Based on Biomimetic Parallel Structure, Jul. 2011, 132 pages, University of Ontario Institute of Technology, Canada.
Pelrine et al., Electrostriction of polymer dielectrics with compliant electrodes as a means of actuation, Sensors and Actuators A: Physical, Jan. 1998, pp. 77-85, vol. 64 Issue 1, Elsevier, Netherlands.
Pelrine et al., High-field deformation of elastomeric dielectrics for actuators, Materials Science and Engineering, Nov. 28, 2000, pp. 89-100, vol. 11 Issue 2, Elsevier, Netherlands.
Pelrine et al., Dielectric Elastomer Artificial Muscle Actuators: Toward Biomimetic Motion, Proceedings of SPIE—The International Society for Optical Engineering, Jul. 2002, pp. 126-137, vol. 4695, SPIE, Bellingham, WA.
Pin, Wearable Robotics Presented to New Horizons in Science Briefing, Oct. 2003, 34 pages, Knoxville, Tennessee.
Pratt et al., The RoboKnee: An Exoskeleton for Enhancing Strength and Endurance During Walking, International Conference on Robotics & Automation, Apr. 2004, 6 pages, IEEE, New Orleans, LA.
Robotics Research Group, Degrees of Freedom, www.robotics.utexas.edu/rrg/learn_more/low_ed/dof/, Oct. 25, 2006, 2 pages, University of Texas.
Roetenberg et al., Xsens MVN: Full 6DOF Human Motion Tracking Using Miniature Inertial Sensors, XSENS—Inertial Motion Capture, Jan. 2009, 9 pages, XSENS Technologies.
Rouse et al., Clutchable Series-Elastic Actuator: Design of a Robotic Knee Prosthesis for Minimum Energy Consumption, 2013 IEEE 13th International Conference on Rehabilitation Robotics (ICORR), Jun. 24-26, 2013, 6 pages, Institute of Electrical and Electronics Engineers, Piscataway, New Jersey.
Schuler et al., Dextrous Robot Arm, In Proceedings of the 8$^{th}$ ESA Workshop on Advanced Space Technologies for Robotic and Automation 'ASTRA 2004' ESTEC, Nov. 2-4, 2004, 8 pages, Noordwijk, The Netherlands.
Searchmap Blog, Scientists Develop Mechanical Spring-Loaded Leg Brace to Improve Walking, http://www.searchmap.ea/blog/scientists-develop-mechanical-spring-loaded-leg-brace-to-improve-walking/, Apr. 1, 2015, 5 pages, Searchmap Blog.

(56) References Cited

OTHER PUBLICATIONS

Seppala, These exoskeleton heels could help stroke victims walk again, https://www.engadget.com/2015/04/02/feet-exoskeletons/, Apr. 2, 2015, Engadget, San Francisco, California.
Shamaei et al., Estimation of Quasi-Stiffness of the Human Knee in the Stance Phase of Walking, Mar. 22, 2013, 10 pages, vol. 8 Issue 3, PLOS One, San Francisco, California.
Siddharth et al., Design and Analysis of a 1-DOF Walking Mechanism, http://siddharthswaminathan.in/files/WalkingMechanism.pdf , Nov. 2012, 7 pages, India.
Smith et al., Integrated thin-film piezoelectric traveling wave ultrasonic motors, Sensors and Actuators A: Physical, Dec. 2012, pp. 305-311, vol. 188, Elsevier, Netherlands.
Song et al., Kinematics Analysis and Implementation of a Motion-Following Task for a Humanoid Slave Robot Controlled by an Exoskeleton Master Robot, International Journal of Control, Automation and Systems, Dec. 2007, pp. 681-690, vol. 5, No. 6, Korean Institute of Electrical Engineers, South Korea.
Suitx, Phoenix Medical Exoskeleton, https://www.suitx.com/phoenix-medical-exoskeleton, 3 pages, to the best of the applicant's knowledge article was available before the application filing date, US Bionics, Inc., Berkeley, California.
Suleiman, Engineering an affordable exoskeleton, Phys.org, https://phys.org/news/2014-06-exoskeleton html, Jun. 12, 2014, 5 pages, Science X Network.
Szczesna et al., Inertial Motion Capture Costume Design Study, 2017, 21 pages, Sensors, Switzerland.
Tmsuk, Rescue Robot "T-53" release Control Technologies to Control the Synchronous Operation of the Arm, http://robot.watch.impress.co.ip/cda/news/2007/07/18/564.html, as accessed Sep. 1, 2011 5 pages, Robot Watch website.
Ueda et al., Large Effective-Strain Piezoelectric Actuators Using Nested Cellular Architecture With Exponential Strain Amplification Mechanisms, IEEE/ASME Transactions on Mechatronics, Oct. 2010, pp. 770-782, vol. 15 Issue 5, Institute of Electrical and Electronics Engineers, Piscataway, New Jersey.
Vanderborght et al., Variable impedance actuators: A review, Robotics and Autonomous Systems, Dec. 2013, 14 pages, vol. 61, Issue 12, Elsevier, Netherlands.
Walsh, Biomimetic Design of an Under-Actuated Leg Exoskeleton For Load-Carrying Augmentation, Massachusetts Institute of Technology, Feb. 2006, 97 pages, Massachusetts.
Walsh et al., A Quasi-Passive Leg Exoskeleton for Load-Carrying Augmentation, International Journal of Humanoid Robotics, Mar. 8, 2007, 20 pages, vol. 4, No. 3, World Scientific Publishing Company.
Wang et al., A highly-underactuated robotic hand with force and joint angle sensors, 2011 IEEE/RSJ International Conference on Intelligent Robots and Systems, Sep. 25-30, 2011, 6 pages, Institute of Electrical and Electronics Engineers, Piscataway, New Jersey.
Yeates, Utah-built robot safeguards the workplace, http://www.ksl.com?nid=148&SID=17654421&autostart=y; Oct. 13, 2011, 3 pages, KSL Broadcasting, Salt Lake City, Utah.
Yip et al., High-Performance Robotic Muscles from Conductive Nylon Sewing Thread, 2015 IEEE International Conference on Robotics and Automation (ICRA), May 26-30, 2015, 6 pages, Seattle, Washington.
Zubrycki et al., Novel haptic glove-based interface using jamming principle, Proceedings of the 10th International Workshop on Robot Motion and Control, Jul. 6-8, 2015, 6 pages, IEEE, Poland.

* cited by examiner facilitate operation of an exoskeleton comprising a plurality of sensors identified as a group of sensors that complement one another, the plurality of sensors comprising a target sensor associated with a joint mechanism, and a plurality of auxiliary sensors — 402 receive sensor output data generated by each sensor of the plurality of sensors — 404 determine whether each of the plurality of sensors satisfies a self-test defined criteria to generate self-test data — 406 transform the sensor output data for each auxiliary sensor into transformed sensor output data that corresponds to the sensor output data of the target sensor — 408 generate a sensor output data map comprising, at least in part, the sensor output data from the target sensor and the transformed sensor output data derived from the auxiliary sensors — 410 compare, using the sensor output data map, the sensor output data of the target sensor to the transformed sensor output data of each of the auxiliary sensors, wherein each auxiliary sensor operates as a sensor state observer for the target sensor — 412

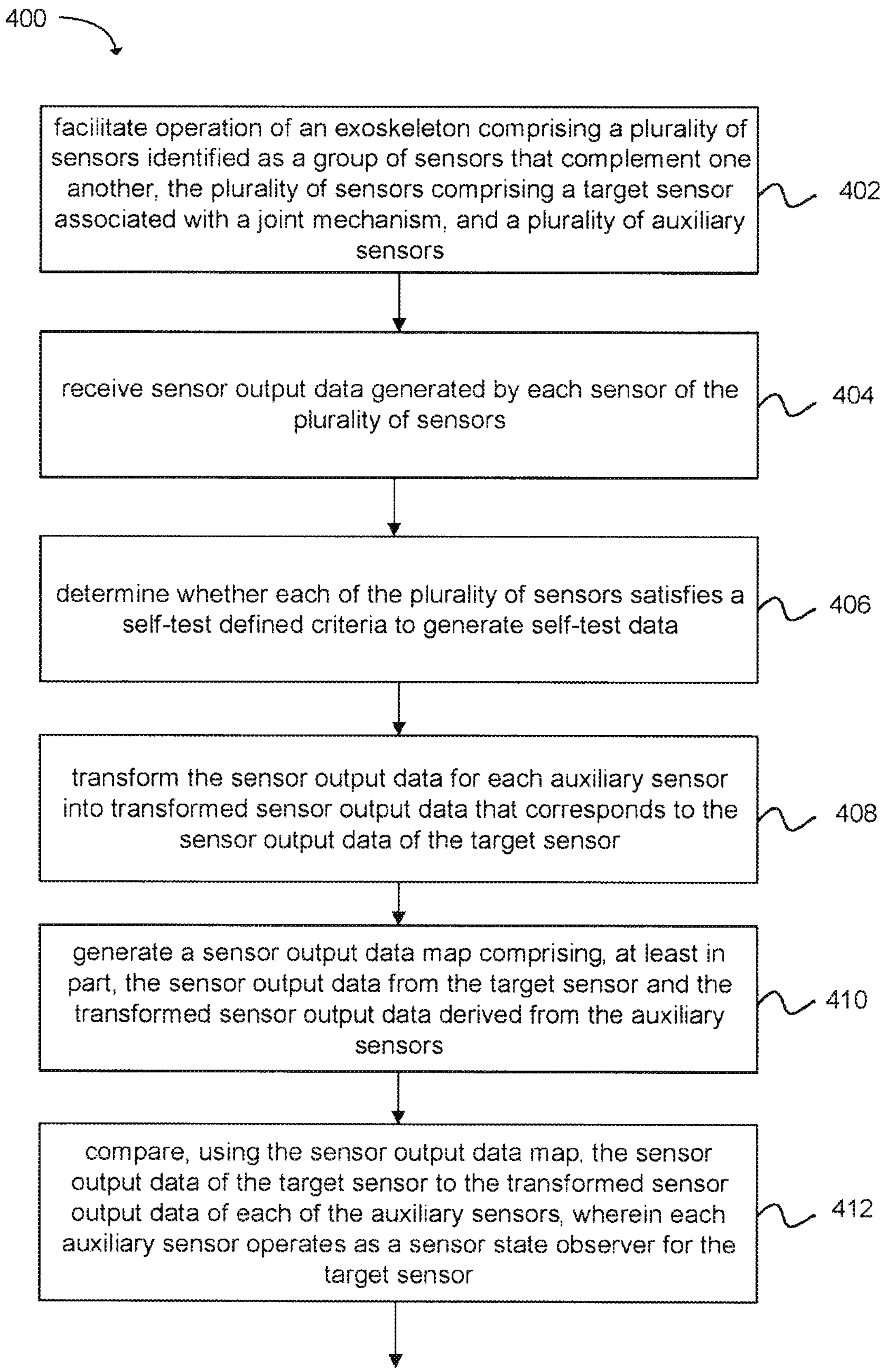

FIG. 11A

SENSOR SUITE DISCREPANCY DETECTION SYSTEM FOR SAFE OPERATION OF AN EXOSKELETON

PRIORITY CLAIM

This is a continuation-in-part of U.S. patent application Ser. No. 17/114,460, filed Dec. 7, 2020, which is hereby incorporated herein by reference in its entirety.

BACKGROUND

Robotic systems, such as exoskeletons and humanoid robots, are becoming more and more robust and powerful. In the case of exoskeletons, in which there is a human operator donning and operating the exoskeleton, these can inherently pose a safety risk to the human operator donning and operating the exoskeleton, such as if one or more components or systems of the exoskeleton fails or malfunctions leading to unintended operation scenarios. In the case of both exoskeletons and humanoid robots, these can pose safety risks to others in the vicinity of the operating exoskeleton or humanoid robot as a result of similar failures of malfunctions. In addition, exoskeletons and other humanoid robots are becoming more and more prevalent in their use as technologies and efficiencies improve. Historically, many exoskeletons (full body or partial body) have been utilized in the rehabilitation industry, and consequently are quite safe because of their limited output torque to joints, and because of the medical personnel supervision over a patient using such rehabilitation-type of exoskeletons. However, in scenarios involving high-performance exoskeletons designed to significantly amplify human capabilities to perform at levels or to achieve various tasks that would otherwise be difficult or impossible or inefficient for a human to carry out alone or unaided, safety to the operator and others must be paramount and of the upmost importance from design to implementation of the functionality of the exoskeleton. Simply said, due to their intended purpose to amplify human capabilities (e.g., strength, endurance, agility, speed, and other aspects), such high-performance exoskeletons comprise operational functionality that, if not properly constrained, can overpower the operator donning and operating the exoskeleton, thus presenting significant potential risks to the operator of serious injury or death.

SUMMARY

An initial overview of the inventive concepts are provided below and then specific examples are described in further detail later. This initial summary is intended to aid readers in understanding the examples more quickly, but is not intended to fully disclose and describe specific features of the examples, nor is it intended to limit the scope of the claimed subject matter.

The present disclosure sets forth an exoskeleton comprising a joint mechanism; at least one actuator configured to actuate the joint mechanism; a force moment sensor carried by the exoskeleton and associated with a support structure in contact with a human element of a user operating the exoskeleton, the force moment sensor being configured to generate sensor output data associated with the force moment sensor; a controller configured to receive the sensor output data associated with the force moment sensor and transmit a command signal to the at least one actuator; and the controller configured to execute a remedial measure associated with a safety mode of the exoskeleton based on an identified discrepancy between the sensor output data associated with the force moment sensor and a known load applied to the joint mechanism.

In one example, the known load is an external weight applied to an end effector associated with the joint mechanism.

In one example, at least one torque sensor is associated with the joint mechanism and configured to generate sensor output data associated with the at least one joint mechanism and corresponding to the known load; and the controller is configured to execute the remedial measure associated with the safety mode of the exoskeleton based on an identified discrepancy between the sensor output data associated with the force moment sensor and transformed sensor output data associated with the at least one torque sensor.

In one example, the controller is configured to transform the sensor output data of the at least one of the force moment sensor and the at least one torque sensor in accordance with a gain ratio between the force moment sensor and the at least one torque sensor.

In one example, the exoskeleton further comprises a sensor group comprising a plurality of sensors configured to generate sensor output data, the sensor group associated with the joint mechanism; at least one auxiliary sensor of the sensor group, the at least one auxiliary sensor positioned at a different location than at least one of the force moment sensor or the torque sensor; and the controller configured to recruit the at least one auxiliary sensor based on the identified discrepancy to execute the remedial measure associated with the safety mode of the exoskeleton.

In one example, the joint mechanism comprises at least one of a brake or a clutch device, and wherein the controller is configured to transmit a command signal to the brake or clutch device for operating the brake or clutch device to execute the remedial measure.

In one example, the exoskeleton further comprises a plurality of joint mechanisms, wherein the controller is configured to control operation of an actuator of each of at least some of the joint mechanisms, independent of user control, to execute the remedial measure associated with the safety mode or a fail-safe mode of the exoskeleton.

In another example, the exoskeleton further comprises a plurality of joint mechanisms, and a suite of sensors comprising a plurality of sensor groups, wherein each sensor group is associated with a respective joint mechanism of the plurality of joint mechanisms, and wherein each sensor group comprises a respective plurality of sensors that complement one another.

In another example, the exoskeleton further comprising a sensor group comprising a plurality of sensors configured to generate sensor output data, the sensor group associated with the joint mechanism; a target sensor of the sensor group defined by at least one of the force moment sensor or the torque sensor; at least one auxiliary sensor of the sensor group, the at least one auxiliary sensor and the target sensor positioned at different locations; and the controller configured to recruit the at least one auxiliary sensor based on the identified discrepancy to execute the remedial measure associated with the safety mode of the exoskeleton.

The present disclosure sets forth an exoskeleton, comprising a joint mechanism; at least one actuator configured to actuate the joint mechanism; at least one torque sensor associated with the joint mechanism and configured to generate sensor output data associated with the at least one joint mechanism; a force moment sensor carried by the exoskeleton and associated with a support structure in contact with a human element of a user operating the exoskeleton, the force moment sensor being configured to generate sensor output data associated with the force moment sensor; a controller configured to receive the sensor output data associated with the force moment sensor and transmit a command signal to the at least one actuator; and the controller configured to execute a remedial measure associated with a safety mode of the exoskeleton based on an identified discrepancy between the sensor output data associated with the force moment sensor and transformed sensor output data associated with the at least one torque sensor.

In one example, the controller is configured to transform the sensor output data of at least one of the force moment sensor and the at least one torque sensor in accordance with a gain ratio between the force moment sensor and the at least one torque sensor.

In one example, the controller, as part of a sensor suite discrepancy detection system, is configured to: receive sensor output data generated by the at least one torque sensor and the force moment sensor; transform the sensor output data of the at least one torque sensor into transformed sensor output data that corresponds to the sensor output data of the force moment sensor; compare the sensor output data of the force moment sensor with the transformed sensor output data of the at least one torque sensor; determine, based on the comparison, whether a discrepancy exists between the sensor output data of the force moment sensor and the transformed sensor output data of the at least one torque sensor; recruit, as a substitute for the force moment sensor or the at least one torque sensor, at least one auxiliary sensor; generate a command signal associated with sensor output data from the at least one recruited auxiliary sensor; and transmit the command signal to execute a remedial measure associated with the safety mode of the exoskeleton.

In one example, the exoskeleton further comprises a sensor group comprising a plurality of sensors configured to generate sensor output data, the sensor group associated with the joint mechanism; at least one auxiliary sensor of the sensor group, the at least one auxiliary sensor positioned at a different location than at least one of the force moment sensor or the torque sensor; and the controller configured to recruit the at least one auxiliary sensor based on the identified discrepancy to execute the remedial measure associated with the safety mode of the exoskeleton.

In one example, the joint mechanism comprises at least one of a brake or a clutch device, and wherein the controller is configured to transmit a command signal to the brake or clutch device for operating the brake or clutch device to execute the remedial measure.

In one example, the exoskeleton further comprises a plurality of joint mechanisms, wherein the controller is configured to control operation of an actuator of each of at least some of the joint mechanisms, independent of user control, to execute the remedial measure associated with the safety mode or a fail-safe mode of the exoskeleton.

In one example the exoskeleton further comprises a plurality of joint mechanisms, and a suite of sensors comprising a plurality of sensor groups, wherein each sensor group is associated with a respective joint mechanism of the plurality of joint mechanisms, and wherein each sensor group comprises a respective plurality of sensors that complement one another.

In one example, the exoskeleton further comprises a sensor group comprising a plurality of sensors configured to generate sensor output data, the sensor group associated with the joint mechanism; a target sensor of the sensor group defined by at least one of the force moment sensor or the torque sensor; at least one auxiliary sensor of the sensor group, the at least one auxiliary sensor and the target sensor positioned at different locations; and the controller configured to recruit the at least one auxiliary sensor based on the identified discrepancy to execute the remedial measure associated with the safety mode of the exoskeleton.

The present disclosure further sets forth an exoskeleton, comprising a joint mechanism; at least one actuator configured to actuate the joint mechanism; at least one torque sensor associated with the joint mechanism and configured to generate sensor output data associated with the joint mechanism; a contact displacement system comprising a force moment sensor associated with the joint mechanism, and coupled to a support structure adjacent the joint mechanism positioned to be in contact with a human element of a user operating the exoskeleton, the force moment sensor being configured to sense movement of the user and transmit output signals; a controller configured to receive the output signals from the force moment sensor and transmit a command signal to the at least one actuator of the joint mechanism configured to effectuate position motion and applied force of the joint mechanism; and a sensor suite discrepancy detection system configured to execute a remedial measure associated with a safety mode of the exoskeleton based on an identified discrepancy between the output data associated with the force moment sensor and transformed sensor output data associated with the at least one torque sensor, the controller transforming the sensor output data with a gain ratio between the force moment sensor and the at least one torque sensor.

In one example, the exoskeleton further comprises a sensor group comprising a plurality of sensors configured to generate sensor output data, the sensor group associated with the joint mechanism; a target sensor of the sensor group defined by at least one of the force moment sensor or the torque sensor; at least one auxiliary sensor of the sensor group, the at least one auxiliary sensor and the target sensor positioned at different locations; and the controller configured to recruit the at least one auxiliary sensor based on the identified discrepancy to execute the remedial measure associated with the safety mode of the exoskeleton.

The present disclosure still further sets forth a method for safe operation of an exoskeleton, the method comprising operating the exoskeleton in a normal operation mode, the exoskeleton comprising a torque sensor configured to generate sensor output data pertaining to an applied load on the exoskeleton; operating a contact displacement system comprising a force moment sensor associated with the joint mechanism, and coupled to a support structure adjacent the joint mechanism positioned to be in contact with a human element of a user operating the exoskeleton, the force moment sensor being configured to sense movement of the user and transmit output signals; operating a sensor suite discrepancy detection system of the exoskeleton to identified discrepancy between the output data associated with the force moment sensor and transformed sensor output data associated with the torque sensor; and operating the exoskeleton in a safe operating mode as switched by the controller from the normal operating mode.

In one example, the exoskeleton comprises a suite of sensors configured to generate sensor output data pertaining to at least one operational function of the exoskeleton; the method further comprising: facilitating recruitment of, through continued use of the exoskeleton and through use of a controller of the sensor suite discrepancy detection system, at least one auxiliary sensor as a substitute for at least one of the force moment sensor and the at least one torque sensor; and operating the exoskeleton in a safe operating mode as switched by the controller from the normal operating mode, wherein the one or more recruited auxiliary sensors operate as a substitute for the at least one of the force moment sensor and the at least one torque sensor.

In one example, the exoskeleton comprises a suite of sensors configured to generate sensor output data pertaining to at least one operational function of the exoskeleton; wherein the sensor suite discrepancy detection system comprises a sensor group comprising a plurality of sensors of the suite of sensors, the sensor group associated with a joint mechanism of the exoskeleton, the sensor group comprising a target sensor and a plurality of auxiliary sensors that complement each other; the method further comprising: facilitating recruitment of, through continued use of the exoskeleton and through use of a controller of the sensor suite discrepancy detection system, at least one auxiliary sensor as a substitute for the target sensor based on an identified discrepancy between sensor output data of the target sensor and transformed sensor output data of at least one auxiliary sensor of the plurality of auxiliary sensors; and operating the exoskeleton in a safe operating mode as switched by the controller from the normal operating mode, wherein the one or more recruited auxiliary sensors operate as a substitute for the target sensor.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 11A and 11B is a flow diagram that illustrates an example method for safe operation of an exoskeleton, in accordance with an example of the present disclosure.

Figure 1:
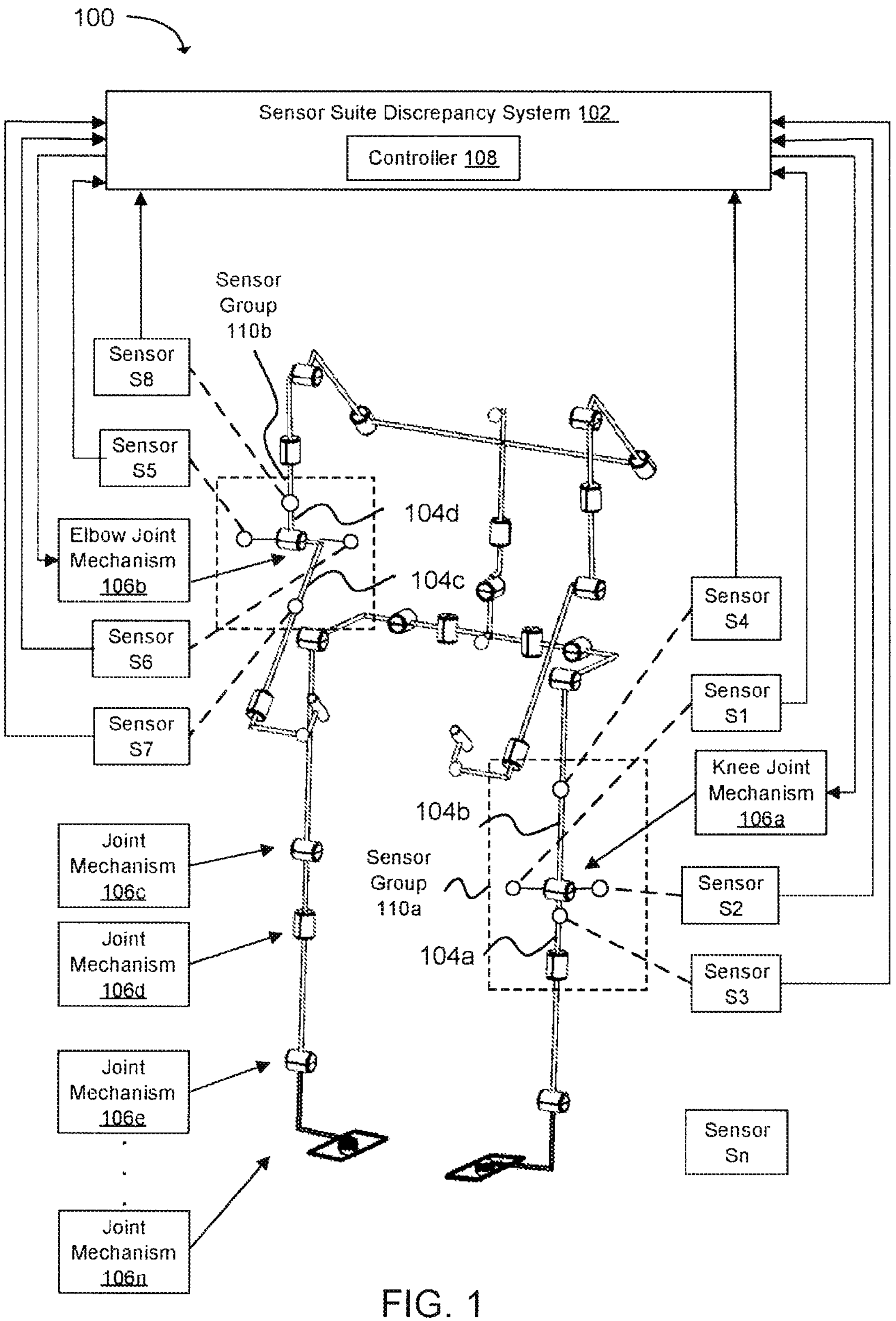
FIG. 1 schematically illustrates an exoskeleton having a sensor suite discrepancy detection system, in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

To further describe the present technology, examples are now provided with reference to the figures. As an introduction, the present disclosure sets forth an exoskeleton having a sensor suite discrepancy detection system operable to interrogate the suite of sensors (all of the sensors) within the exoskeleton and to detect discrepant sensor output data of a plurality of sensors of the exoskeleton for safe operation of the exoskeleton. For example, if a particular sensor (e.g., a target sensor) is producing "bad" or faulty sensor output data for some reason, the sensor suite discrepancy detection system can detect the faulty sensor output data, and then "recruit" (i.e., select and use) one or more other/complementary sensors of the exoskeleton capable of generating comparable sensor output data (e.g., once such output data is transformed) as a substitute for the "bad" or target sensor. The sensor suite discrepancy detection system can then execute a remedial measure, for instance, to operate the exoskeleton in a safety mode for safe operation of the exoskeleton to protect the operator (and/or others around the exoskeleton).

In another example, the sensor discrepancy detection system can be operable to detect discrepant sensor output data of a user operated force moment sensor and at least one torque sensor associated with a joint mechanism of the exoskeleton for safe operation of the exoskeleton. The discrepancy can be detected by comparing the loads as adjusted by an applied transmission ratio or gain between the sensors. Although not specifically discussed herein, those skilled in the art will appreciate that the technology described herein can be applicable or adapted for use in other robots or robot types, such as humanoid robots.

In one example, sensor output data generated by a position sensor associated with a joint or joint mechanism of the exoskeleton (for determining a rotational position of the joint) may be providing inaccurate, faulty, incomplete or no output data (i.e., “bad” or “faulty” sensor output data) for a variety of reasons. One reason may be because the position sensor itself is defective. Another reason may be that a component associated with controlling the joint or joint mechanism may be defective or malfunctioning, such as a belt, gear train, actuator/motor, drive shaft, bearing, elastic element, etc. Such possible defect or malfunctioning may result in the faulty sensor output data provided by the position sensor. In any case, the sensor suite discrepancy detection system is configured and operates to detect such faulty sensor output data, and then utilize the sensor output data from one or more pre-determined other/complementary sensors (auxiliary sensors) as a substitute for the faulty sensor output data in order to maintain or ensure continued safe operation of the exoskeleton, or to allow the operator to safely shut down and doff the exoskeleton. For instance, a torque sensor associated with a particular joint or joint mechanism may be used to measure torque output of a shaft associated with the joint or joint mechanism, but not necessarily used or needed for purposes of measuring rotational position of the joint or joint mechanism. However, as will be discussed more fully below, the sensor suite discrepancy detection system can transform the sensor output data provided by the torque sensor, which can be combined with data provided with a rotor position sensor, and then compare it with the sensor output data of the position sensor to determine whether a discrepancy exists between the data from each sensor. If a discrepancy indeed exists (i.e., indicating a defect or malfunction), the sensor suite discrepancy detection system can recruit or select the torque sensor, and, for example, a rotor position sensor (and/or other sensors or a combination of sensors determined to be complementary to the position sensor) as a back-up or substitute sensor for the position sensor to determine or estimate the rotational position of the joint or joint mechanism, and can cause the exoskeleton to operate in a safety mode, such as executing a remedial measure including actuating the joint or joint mechanism appropriately using the sensor output data from the torque (or other) sensor(s), braking the joint, or shutting down the joint or joint mechanism and/or exoskeleton, etc., as further exemplified herein.

The term “joint mechanism” is referred to herein as a rotating mechanism that comprises a rotating joint of the exoskeleton. More specifically, a joint mechanism can comprise structural components or elements of the exoskeleton that are directly or indirectly rotatably connected or coupled to one another, and that rotate relative to one another about an axis of rotation, thus forming or defining a joint of the exoskeleton. Several different types of joint mechanisms having differing structural arrangements of different types of structural components or elements rotatable relative to one another are contemplated herein, and as such, those specifically described and shown in the drawings are not intended to be limiting in any way. In addition to the structural components or elements that are rotatable relative to one another, a joint mechanism can further comprise one or more objects, devices, and/or systems (e.g., actuator(s), sensor(s), clutch(es), transmission(s), and any combination of these), some of which can comprise or support the rotatably coupled structural components or elements of the joint (e.g., a rotary actuator having structural components or elements in the form of input and output members rotatable relative to one another that can couple to support structures of the exoskeleton, and that is operable to power the joint), or some of which facilitate rotation between two or more coupled structural components or elements (e.g., an actuated joint mechanism comprising a linear actuator operable to rotate relative to one another rotatably coupled structural components or elements in the form of support structures to provide a powered or actuated joint), or some of which indirectly rotatably couple or facilitate the rotatable coupling of the structural components or members (e.g., structural components or elements rotatably coupled together via a clutch or clutch mechanism). A joint mechanism can comprise a powered (i.e., actuated) joint or a non-powered (i.e., non-actuated or passive) joint.

In one example, a “joint mechanism” can comprise adjacent structural components or elements in the form of limb support structures that form all or part of the limbs of the exoskeleton, each having coupling portions that are configured to interface and fit with one another, and that are rotatably coupled together at a point of contact between the limb support structures, thus forming or defining a joint, wherein the limb support structures are able to rotate relative to one another about an axis of rotation of the joint mechanism (i.e., the joint axis of rotation) (e.g., a passive, non-powered exoskeleton joint in the form of or defined by two limb type support structures rotatably coupled together at respective coupling portions, such that they are rotatable relative to each other). In this example, the joint mechanism comprises a portion of the adjacent limb support structures, namely the respective coupling portions of the limb support structures.

In another example, a “joint mechanism” can comprise structural components or elements in the form of input and output members of a system or device at the point of contact between the structural components or elements (such as those part of an actuator or of a clutch device or of a brake device, or an elastic element (e.g., spring or quasi-passive elastic actuator) or of a combination of these operating together), where the input and output members are rotatably coupled together via the actuator or clutch device or brake device, or spring element, or any of these in combination, thus forming or defining a joint, and where the input and output members are able to rotate relative to one another about an axis of rotation of the joint mechanism (i.e., the joint axis of rotation) (e.g., an actuated or powered exoskeleton joint in the form of or defined by an actuator comprising input and output members of a motor indirectly rotatably coupled together, such that they are rotatable relative to each other). In this example, the joint mechanism, and particularly the input and output members of the joint mechanism, can be further coupled to respective limb type support structures, such that the limb type support structures are further caused to rotate with the input and output members, respectively, and relative to one another, about the axis of rotation of the joint mechanism.

Figure 6:
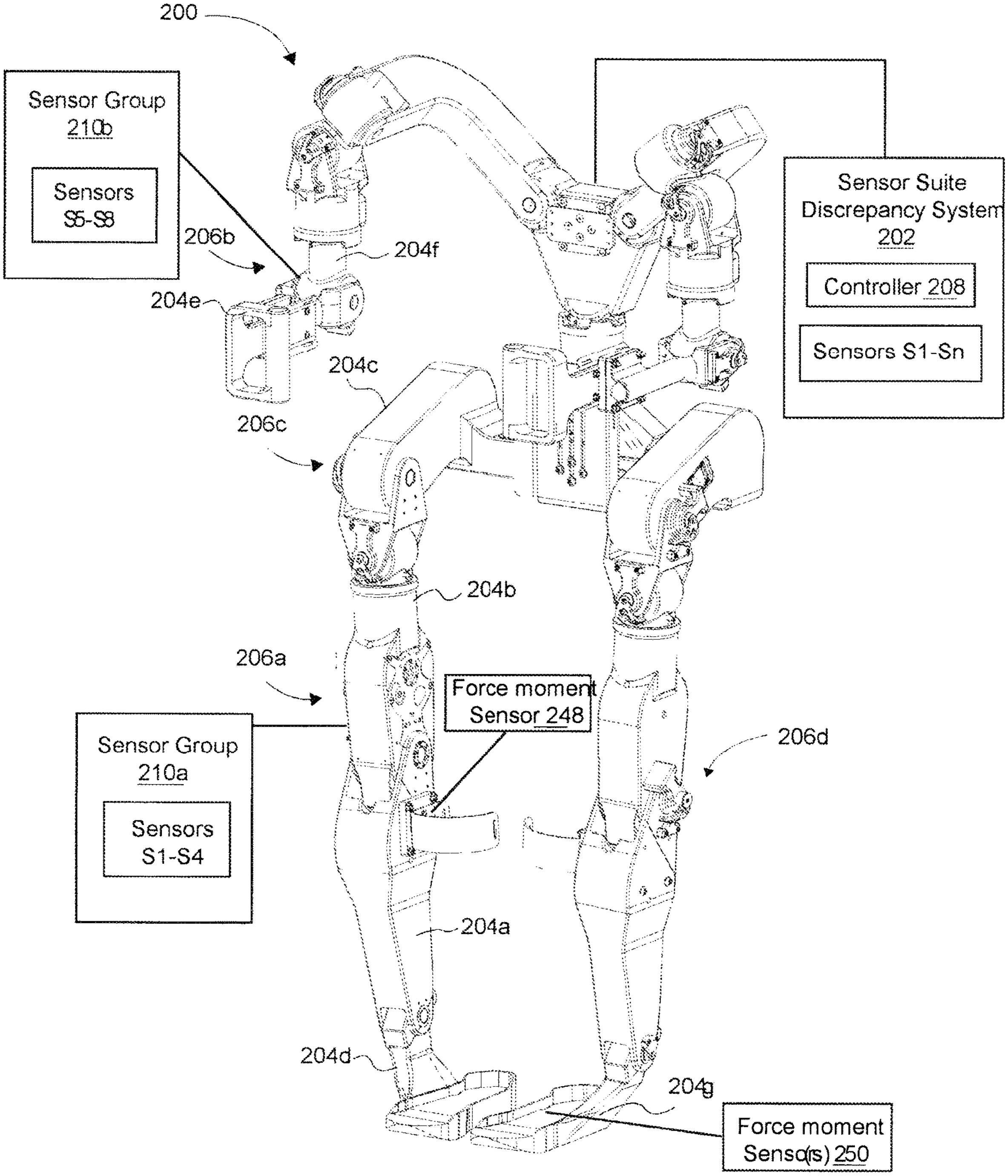
FIG. 6 is an isometric view of an exoskeleton having a sensor suite discrepancy detection system, in accordance with an example of the present disclosure.
Figure 7A:
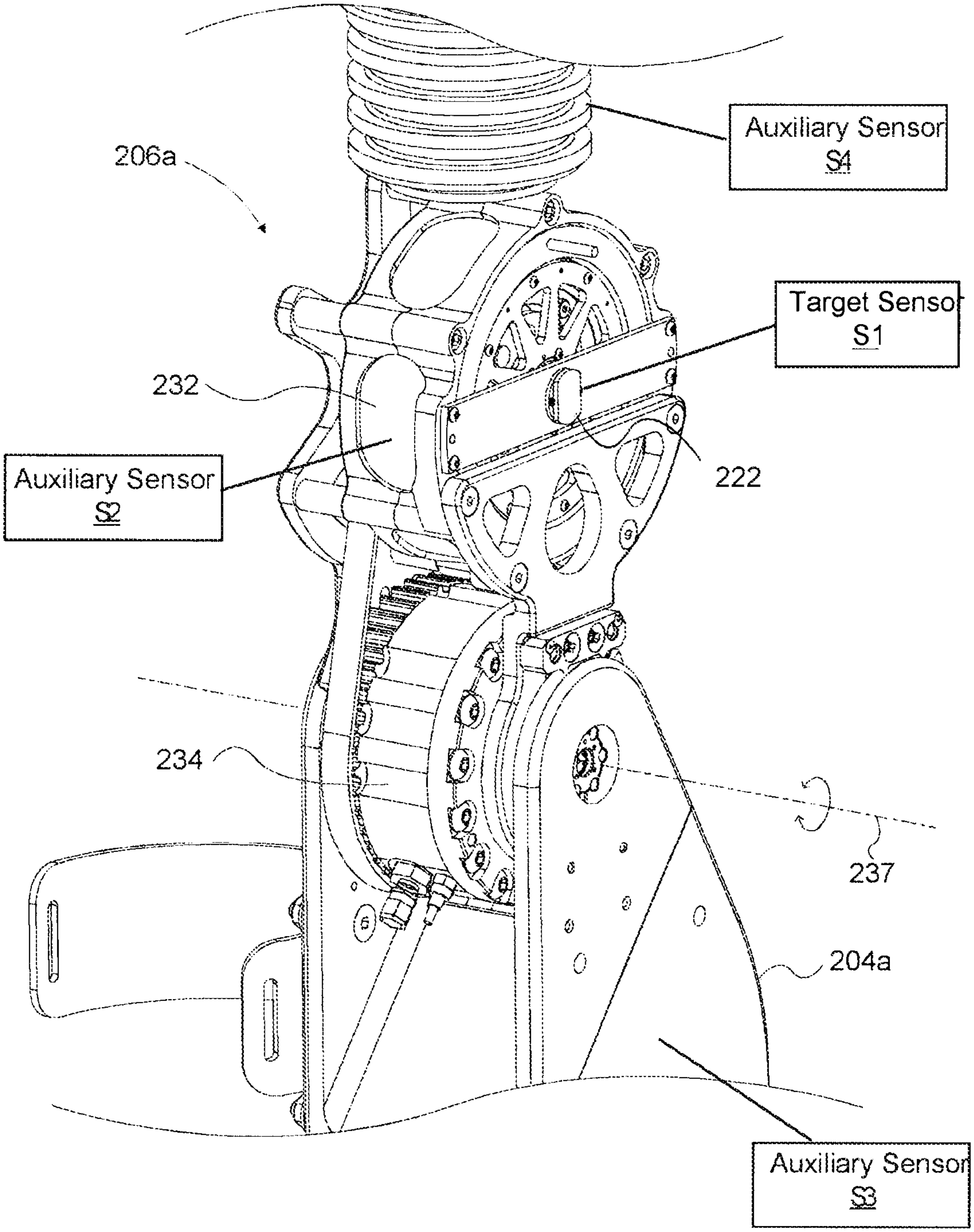
FIG. 7A is an isometric view of a joint mechanism of the exoskeleton of FIG. 6, in accordance with an example of the present disclosure.
Figure 7B:
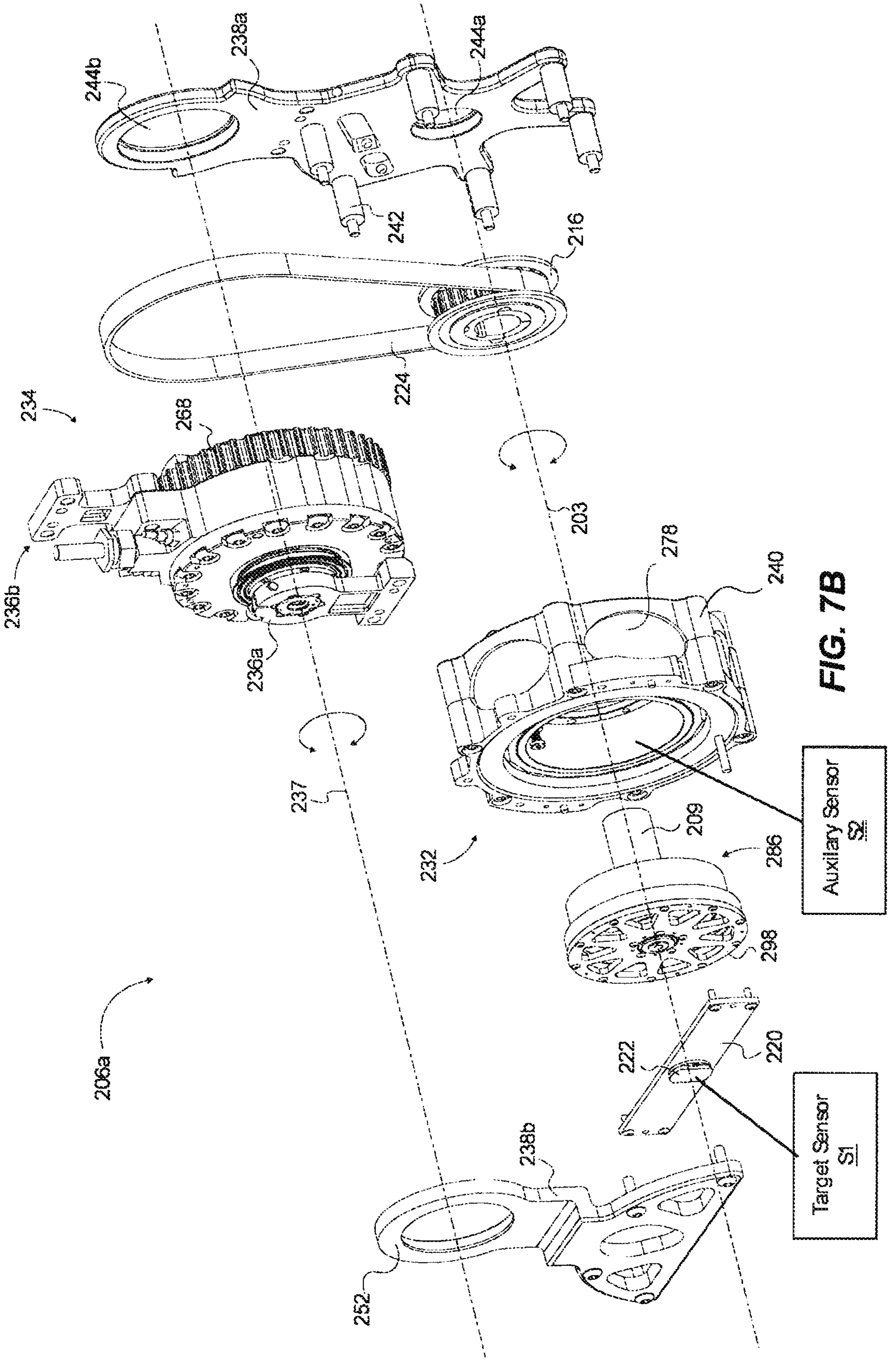
FIG. 7B is a partially exploded view of the joint mechanism of FIG. 7A.

In a specific example, a “joint mechanism” can comprise some or all of the components described in the joint mechanism 106 of FIG. 5, which is further discussed below, and which is further exemplified in the specific joint mechanisms shown and described below as pertaining to FIGS. 6-10. In the example of FIGS. 6-7B, for instance, the input and output members (see FIG. 7B, 236*a*, 236*b*) are part of the "joint mechanism" (see FIGS. 6-7B, 206*a*), but the connecting limb type support structures (FIG. 6, 204*a*, 204*b* are not part of the "joint mechanism" 206*a* as these are additional structural members coupled to the input and output members.

Figure 2:
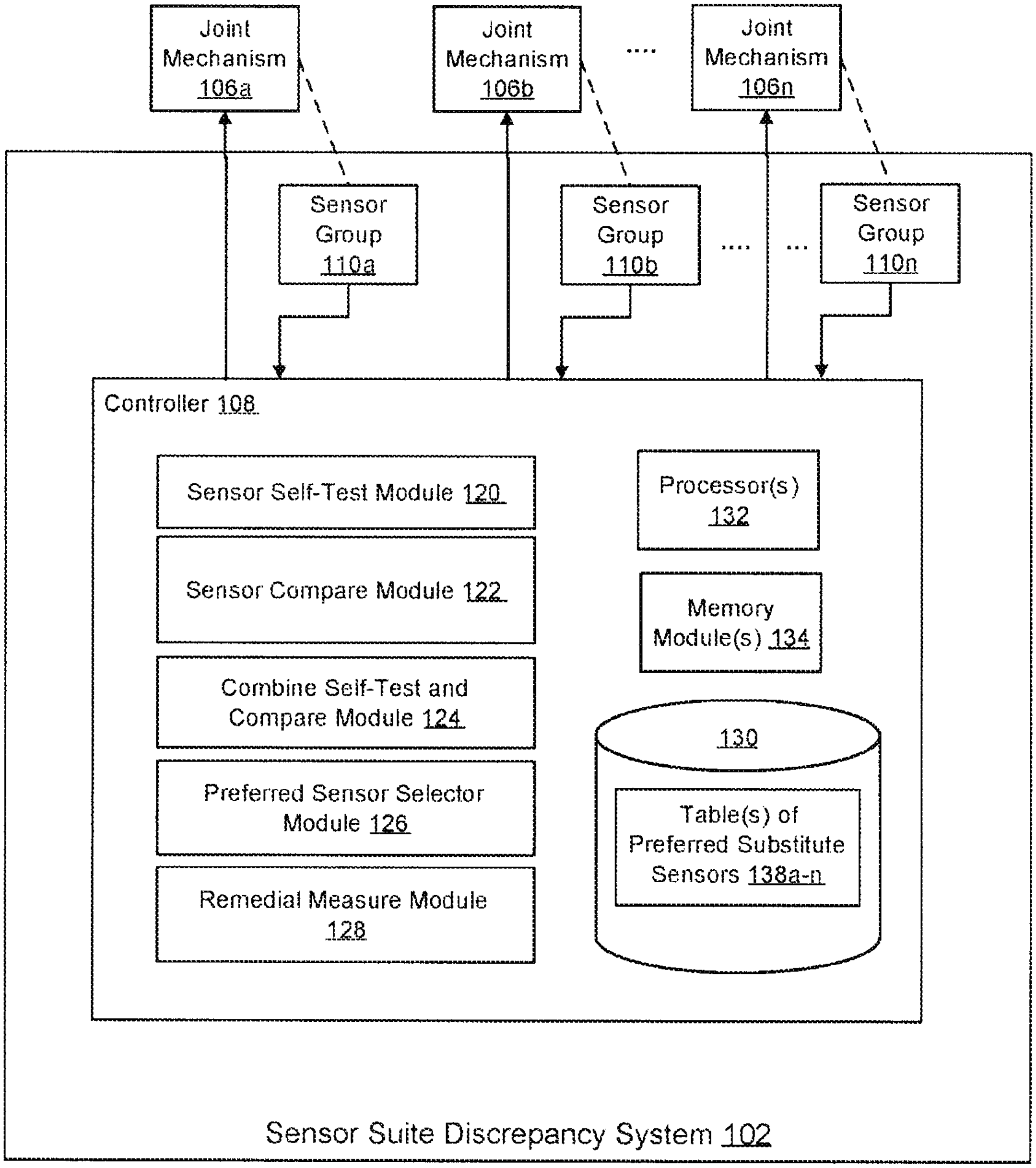
FIG. 2 is a block diagram that illustrates example components included in an exoskeleton and sensor suite discrepancy detection system, in accordance with an example of the present disclosure.

FIG. 1 illustrates a representative layout of joints and sensors of a robot in the form of an exoskeleton 100, and FIG. 2 is a block diagram illustrating a sensor suite discrepancy detection system 102 of the exoskeleton 100, in accordance with an example of the present disclosure. Note that the exoskeleton 100 is a wireframe that is schematically representative of support structures, as well as respective joints of a plurality of joint mechanisms of a full body exoskeleton. FIG. 6 illustrates an example upper and lower body exoskeleton.

The exoskeleton 100 can comprise a plurality of limb type support structures 104*a*-*n* (only four labeled as 104*a*-*d*) and a plurality of joint mechanisms 106*a*-*n* (only some labeled) rotatably coupling together respective support structures 104*a*-*n*. One or more of the joint mechanisms 106*a*-*n* can comprise respective structural components or elements in the form of input and output members (e.g., of an actuator) rotatably coupled together about respective axes of rotation to form or define respective joints of the joint mechanisms 106*a*-*n*, which although not shown here, can be similar to the joint mechanisms discussed below with respect to FIGS. 5-10). Note that "n" as used herein represents any number of the representative components referenced herein. Accordingly, each joint mechanism 106*a*-*n* can rotatably couple together two or more adjacent support structures 104*a*-*n*, and each can comprise a joint defined by structural components or elements rotatable about an axis of rotation. For instance, the joint mechanism 106*a* can rotatably couple together support structures 104*a* and 104*b*, and can be operable to rotate about an axis of rotation associated with and facilitating knee flexion/extension of a human limb. The joint mechanism 106*a* can further comprise an actuator, such as an electromagnetic motor, as part of a drive system for actuation to cause rotation about the associated joint. For instance, the joint mechanism 106*a* can be similarly constructed as the knee joint illustrated in FIGS. 6-7B, or it can have a different construction, such as a passive joint mechanism that does not have an actuator or drive system.

The exoskeleton 100 can comprise a suite of sensors S1-Sn configured to generate sensor output data associated with at least one operational function of the exoskeleton 100. The sensors S1-Sn can be part of the sensor suite discrepancy detection system 102, as illustrated in FIG. 2. The sensors S1-Sn can be coupled to various components of the exoskeleton 100, as further exemplified below, for generating and providing sensor output data via sensor output signals transmitted to a control system or controller 108 of the sensor suite discrepancy detection system 102 of the exoskeleton 100. The sensors S1-Sn may include various types of sensors having various purposes for operation of the exoskeleton 100. For instance, a force moment sensor (e.g., a 6-axis load cell) associated with one or more joint mechanism 106*a*-*n* can be provided as part of a contact displacement system to sense movement of a user to effectuate movement of the exoskeleton 100 (e.g., drive systems of each joint mechanism 106) that at least partially corresponds to movement in accordance with the degrees of freedom of the user when the exoskeleton 100 is being worn or donned by the user, as further discussed below. See FIGS. 4 and 5, and the below discussion, for further details on a contact displacement system using force moment sensors at each joint.

Thus, the control system or controller 108 can be a bimodal or multi-modal controller that has the ability to control the operation of the exoskeleton responsive to user inputs. One such example of a contact displacement system is further described with reference to U.S. Pat. No. 8,849,457 B2, issued Sep. 30, 2014, which is incorporated by reference herein. However, it should be appreciated that an exoskeleton of the present disclosure may implement other suitable means for sensing user movement to effectuate movement of the exoskeleton in accordance with the user movement.

Sensors of the suite of sensors S1-Sn may include a variety of different sensor types for different purposes associated with operating the exoskeleton 100. For instance, the suite of sensors S1-Sn may include a variety of joint position sensors, motor rotor position sensors, joint torque sensors, thermal or temperature sensors, current sensors, and motion sensors such as Inertial Measurement Units (IMUs). Thus, a particular exoskeleton can support dozens of sensors for a variety of different purposes, such as gravity compensation functions, feedback, and others.

Notably, a plurality of sensors S1-S4 of the suite of sensors S1-Sn can be identified as a group of sensors, or a sensor group 110*a*, associated with the joint mechanism 106*a*. In other words, the sensor group 110*a* can comprise a plurality of sensors S1-S4 that are associated with the joint mechanism 106*a*, where the plurality of sensors S1-S4 comprises a target sensor and a plurality of auxiliary sensors. As introduced above, the controller 108 can be configured to determine a discrepancy between sensor output data of two or more sensors, such as between sensors S1-S4 of the sensor group 110*a*, and can be configured to recruit at least one sensor S1-S4 of the sensor group 110*a* as a substitute sensor for discrepant sensor output data. For instance, in a non-limiting example, sensor S1 can comprise a joint position sensor (e.g., Hall effect sensor; see FIG. 7A) that transmits data via sensor output signals to the controller 108 for processing so that the controller 108 can determine a rotational position of the joint associated with the joint mechanism 106*a* at a given time. Such rotational position information may be utilized for purposes of controlling an actuator of the joint mechanism 106*a*, which can be in concert with data provided by the force moment sensor associated with the joint mechanism 106*a*, for actuating the joint mechanism 106*a* about its axis of rotation in response to user movement. In this manner, the sensor S1 can be considered a target sensor S1 as its primary function is to provide position information of the specific joint mechanism 106*a* (i.e., it is directly associated with the joint mechanism 106*a*), and because it is utilized as a sensor that is more critical and reliable in terms of determining the rotational position of the joint specifically provided by the joint mechanism 106*a* at a given time for purposes of effectively controlling the joint mechanism 106*a* in a safe manner, and as intended. In essence, a "target sensor" can be considered any sensor within the suite of sensors of the exoskeleton that is compared against other complementary sensors (the target sensor and the auxiliary sensors comprising a group of sensors) for purposes of identifying potentially discrepant sensor output data, and that is targeted by the controller and the sensor suite discrepancy detection system for potential substitution by a suitable complementary auxiliary sensor.

Of the sensor group 110*a*, a plurality of auxiliary sensors S2-S4 are provided and identified (pre-determined) as being "complementary" to the target sensor S1. This means that the sensor output data provided by each auxiliary sensor S2-S4 can "complement" the sensor output data provided by the target sensor S1 in that one or more of the auxiliary sensors S2-S4 can be recruited and the transformed sensor output data from the one or more auxiliary sensors S2-S4 utilized in one or more ways as a substitute or a replacement for the sensor output data of the target sensor S1, such as, in this example, to provide an estimation of a joint rotational position of the joint defined by the joint mechanism 106*a*, as further detailed below. Again, this can be for purposes of safely operating the exoskeleton, which may entail actuating the joint in a safe mode, within an acceptable and safe range of motion, or powering down or off the joint and/or the exoskeleton, for instance, in the event the controller 108 detects a discrepancy between sensor output data of the target sensor S1 and one or more of the auxiliary sensors S2-S4.

For example, sensor S2 can comprise a rotor motor position sensor that operates to generate position-type sensor output data that is received by the controller 108 for the purpose of determining a position of a rotor of an electric motor of the joint mechanism 106*a*, which may be the primary or intended sensing functionality of the sensor S2 to ensure that the controller 108 knows the position of the rotor for proper commutation of the motor during operation. Further to this example, sensor S3 can comprise a first inertial measurement unit (IMU) coupled to the first support structure 104*a*. Sensor S4 can comprise a second IMU coupled to the second support structure 104*b*. As further exemplified below, the sensor output data from the auxiliary sensor S2 can be transformed (i.e., processed using one or more transformation calculations) into data that is "comparable" (i.e., of the same unit value) to the sensor output data of the target sensor S1 so that, if a discrepancy is detected that indicates a problem or issue with the sensor output data of the target sensor S1, the output sensor data of the auxiliary sensor S2 can be used by the controller 108, such as to estimate the rotational position of the joint for controlling the joint mechanism 106*a* (as one example of a remedial measure). Likewise, the sensor output data from the first and second IMUs of the auxiliary sensors S3 and S4 can be transformed to data that is "comparable" with the sensor output data of the target sensor S1, so that, if a discrepancy is detected that indicates a problem or issue with the sensor output data of the target sensor S1, the output sensor data of the auxiliary sensors S3 and S4 can be used by the controller 108, such as to estimate the rotational position of the joint for controlling the joint mechanism 106*a*.

As indicated above, in the event the sensor suite discrepancy detection system 102 identifies a discrepancy, the controller 108 can be caused to execute a remedial measure associated with a safety mode of the exoskeleton 100. One example of a remedial measure is discussed above regarding controlling the joint mechanism 106*a* based on sensor output data from one or more auxiliary sensors S2-S4 rather than from that of the target sensor S1. Other examples of remedial measures are exemplified below. Failure of a joint position sensor (e.g., target sensor S1) can have serious safety or control consequences, such as a joint locking in place, generating incorrect commands to control a joint mechanism, etc., which can impair the ability of the exoskeleton to follow its operator's movements. The term "remedial measure" as used herein is referred to as an action (or inaction) facilitated or executed by a controller of an exoskeleton to facilitate safe operation of the exoskeleton.

Notably, the controller 108 can be configured to operate, in parallel or simultaneously with operation of the exoskeleton 100 and the sensor suite discrepancy detection system 102, a sensor self-test process, or a sensor compare test process, or both of these together, to provide redundancy in terms of detecting a defect of a component (e.g., sensor, motor, bearing, etc.) and to achieve and maintain safe operation of the exoskeleton, as further exemplified below. As an overview, the self-test process facilitates a "self-test" for each sensor of the sensor groups 110*a*-*n* of the suite of sensors S1-Sn to determine whether each sensor is defective itself, or whether the sensor output data provided by the sensor is indicative of another defect or malfunction of the exoskeleton, such as discussed above. The sensor compare test process facilitates comparing the sensor output data associated with each sensor within a group of sensors against the sensor output data associated with every other sensor within the same group of sensors to determine whether a discrepancy exists (which can be indicative of a defect or malfunction of the exoskeleton) between the sensor output data, so that the controller 108 can recruit or select one or more appropriate auxiliary sensor(s) as a substitute for the target sensor within that group of sensors for safe operation of the exoskeleton. This same test process can be carried out at the same time for each of the sensor groups 110*a*-*n*. The results of these "parallel-run processes" can be combined to provide another layer of redundancy that provides a more robust system of detecting defects or malfunctions of an exoskeleton. Further details of these processes are exemplified below.

As illustrated in FIG. 2, the sensor suite discrepancy detection system 102 can include a plurality of sensor groups 110*a*-*n* that are each identified as being associated with a respective joint mechanism 106*a*-*n*. For instance, FIG. 1 shows a joint mechanism 106*b* associated with flexion/extension rotation of an elbow joint, and a sensor group 110*b* comprising sensors S5-S8 is identified as being associated with the joint mechanism 106*b*. The particular sensors of a sensor group can be "identified as being associated" with a particular joint by being based on known associations related to proper or safe movement of one or more joints of an exoskeleton. For instance, sensors coupled to, or positioned proximate to, a particular joint mechanism (such as thermal sensors, current sensors, position sensors) may be candidates as possible auxiliary sensors that complement a particular target sensor associated with the joint mechanism, or a target sensor associated with another joint mechanism. Other possible auxiliary sensors may be one or more sensors, such as one or more motion sensors (e.g., IMUs), that are coupled to various support structures of the exoskeleton, which may or may not necessarily be part of the joint of the joint mechanism with which the target sensor is associated. For instance, an IMU supported about the support structure 104*a* may be identified as being part of a sensor group associated with a joint mechanism for controlling the joint of the exoskeleton corresponding to hip flexion/extension, because the spatial position of a hip support structure and the range of motion of the hip joint that facilitates hip flexion/extension may be correlated in a pre-determined manner to the rotational position of the knee joint, as further exemplified below. Similar correlations can be pre-determined for each of the sensors of the exoskeleton 100 The same can be said for each of the joints and joint mechanisms of the exoskeleton 100.

Figure 3:
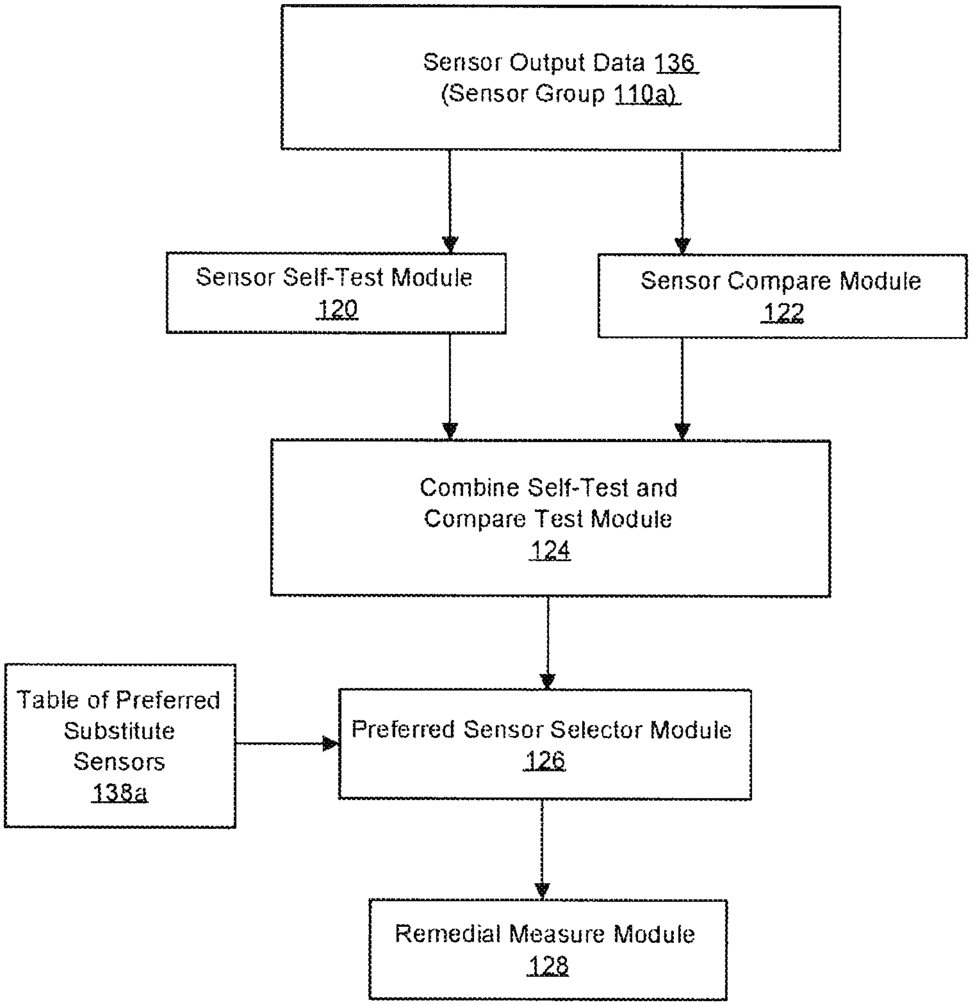
FIG. 3 is a flow diagram that illustrates an example method executed by a sensor suite discrepancy detection system, in accordance with an example of the present disclosure.

The sensor discrepancy detection system 102 exemplified in FIG. 2 can comprise the controller 108 and the plurality of sensor groups 110*a*-*n*, each comprising a respective plurality of sensors (e.g., S1-S4, or S5-S8). The controller 108 can be considered a computing device or a control system, which can include a sensor self-test module 120, a sensor compare module 122, a combine self-test and compare module 124, a preferred sensor selector module 126, a remedial measure module 128, a data store 130, one or more processors 132, one or more memory module(S) 134, and other system components discussed herein. FIG. 3 illustrates a flow diagram representative of a method executed by the controller 108 as associated with the various modules of the sensor discrepancy detection system 102. For instance, sensor output data 136 generated by the plurality of sensors S1-S4 of sensor group 110*a* can be received and processed (by the processors(s) 132), and then the sensor self-test module 120 may be configured to perform a self-test process using the sensor output data 136 (see e.g., FIG. 13). The sensor compare module 122 can be configured to perform a compare test process based on data associated with or derived from the sensor output data 136 (see e.g., FIG. 14), which can occur in parallel with the self-test process. Then, the combine self-test and compare test module 124 may be configured to combine and compare the results of the sensor self-test module 120 and the sensor compare module 122 (see e.g., FIG. 15) to generate combination test data. Based on the results produced by the combine self-test and compare test module 124 and the generated combination test data, the preferred sensor selector module 126 may be configured to then select or recruit one or more auxiliary sensors S2-S4, for instance, of the sensor group 110*a* as a substitute for the target sensor S1 from a table of preferred substitute sensors 138*a* (which can be stored in the data store 130) (see e.g., FIG. 16). Then, based on the sensor output data associated with the recruited one or more auxiliary sensors, the remedial measure module 128 may be configured to execute one or more remedial measures associated with a safety mode of the exoskeleton, as further exemplified below.

The various processes and/or other functionality contained within the controller 108 may be executed by the one or more processors 132 that are in communication with one or more memory modules 134. The controller 108 can include a number of computing devices that are arranged, for example, in one or more server banks or computer banks, or in other arrangements. The term "data store" can refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store 130 can include storage systems such as a SAN (Storage Area Network), cloud storage network, volatile or non-volatile RAM, optical media, or hard-drive type media. The data store 130 may be representative of a plurality of data stores 130 as will be appreciated. API calls, procedure calls, inter-process calls, or other commands can be used for communications between the modules.

Figure 4:
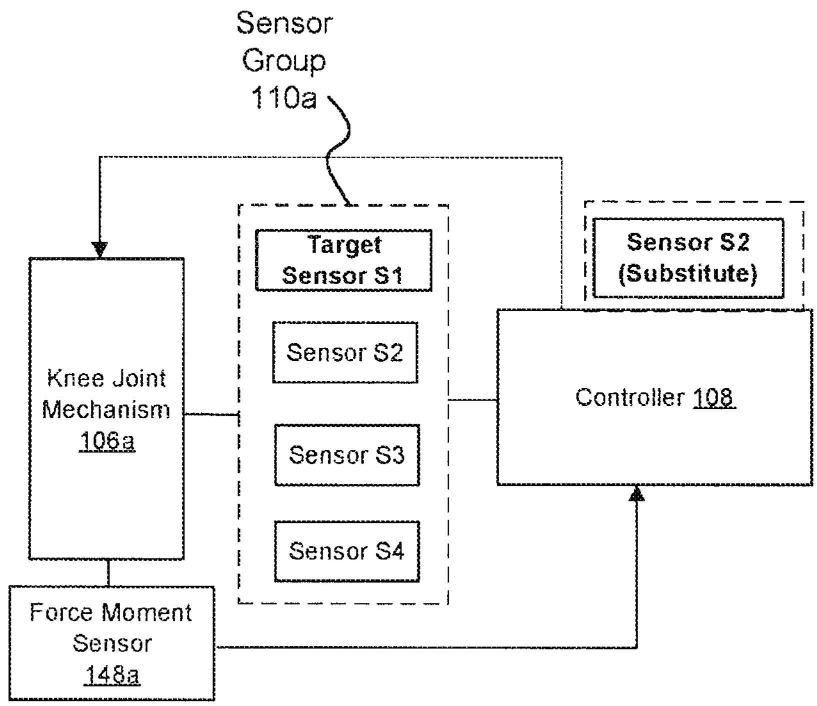
FIG. 4 is a block diagram that illustrates example components included in an exoskeleton and sensor suite discrepancy detection system, in accordance with an example of the present disclosure.

FIG. 4 illustrates a control schematic for operating the joint mechanism 106*a* implementing the sensor suite discrepancy detection system 102 of the exoskeleton 100, in accordance with an example of the present disclosure. Note that FIG. 4 illustrates one example of executing a remedial measure in response to detecting discrepant sensor output data, which includes actuating the joint mechanism 106*a* with the controller 108 based on data from substitute sensor S2. In one example illustrated in FIG. 5, a particular joint mechanism 106, such as any one of the joint mechanisms 106*a-n*, may include some or all of the components shown. For instance, the joint mechanism 106 may include an actuator 140, such as a pneumatic, electric, or hydraulic actuator or motor (see e.g., FIGS. 6-10), wherein the joint mechanism can facilitate an active or actuated joint. One or more transmissions 142 may be operatively coupled to the actuator 140, such as gear train(s), belt(s), etc. (see e.g., FIGS. 6-10). The joint mechanism 106 may further include a clutch or brake device 144, such as friction disks or plates (see e.g., FIGS. 7-10) for restricting or limiting rotation about the joint (which may be a remedial measure, discussed below). The joint mechanism 106 may further comprise an elastic element 146, such as a rotary air spring (e.g., FIG. 7A), torsion spring (e.g., FIG. 8), or other suitable elastic element operable to store and release energy. Note that a particular joint mechanism may facilitate a passive joint (i.e., a non-actuated joint or joint mechanism, or a joint/joint mechanism not having an actuator), such as a joint mechanism having a clutch/brake device and an elastic element, whereby the clutch/brake device is controllable via the controller 108 to engage or disengage application of the elastic element, and configured to fully "freeze" or brake the joint, in one example of a remedial measure.

As mentioned above, a force moment sensor 148, 148*a* may be coupled to a support structure (or strap or other component coupled to or otherwise associated with a structural support (e.g., a foot support, a leg or arm support, etc.)) adjacent the joint mechanism 106, 106*a*, the structural support being positioned to be in contact with a human element of a user donning and operating the exoskeleton 100, for instance. The force moment sensor 148, 148*a* may be part of a contact displacement system, in which the force moment sensor 148, 148*a* transmits output signals to the controller 108 in response to user movements so that the controller 108 can execute appropriate control functions of the joint mechanism 106, 106*a*. As also mentioned above, the controller 108 can be configured to recruit or select a substitute sensor, such as sensor S2 as illustrated in FIG. 4, for the target sensor S1 in the event of an identified discrepancy of sensor output data of the target sensor S1 (or in the event the target sensor S1 fails the self-test process, as exemplified below). As illustrated in FIG. 4, the controller 108 has selected sensor S2 as an appropriate substitute for sensor S1 for purposes of estimating or determining a rotational joint position of the joint mechanism 106*a* for controlling a function of the joint mechanism 106*a*, and according to the aforementioned contact displacement system.

That is, as an example remedial measure of the safety mode, the controller 108 may transmit a command signal to the actuator (e.g., 140) of the joint mechanism 106*a* for effectuating rotation of the joint as intended or desired by the user (i.e., the user may not know or realize there is a defect or malfunction, because the actuator may be operated as expected based on the user's movement). As another example of a remedial measure of the safety mode, the controller 108 may transmit a command signal to the clutch or brake device (e.g., 144) for an appropriate/safe function, such as entirely disengaging the clutch or brake device, partially engaging the clutch or brake device (while also actuating the actuator), or fully engaging the clutch or brake device (to "freeze" up the joint). Such possibilities are further discussed below regarding FIGS. 8-10. Note that the controller 108 may perform this remedial measure for some or all of the other possible brakes or clutches of the other joint mechanisms of the exoskeleton.

Figure 5:
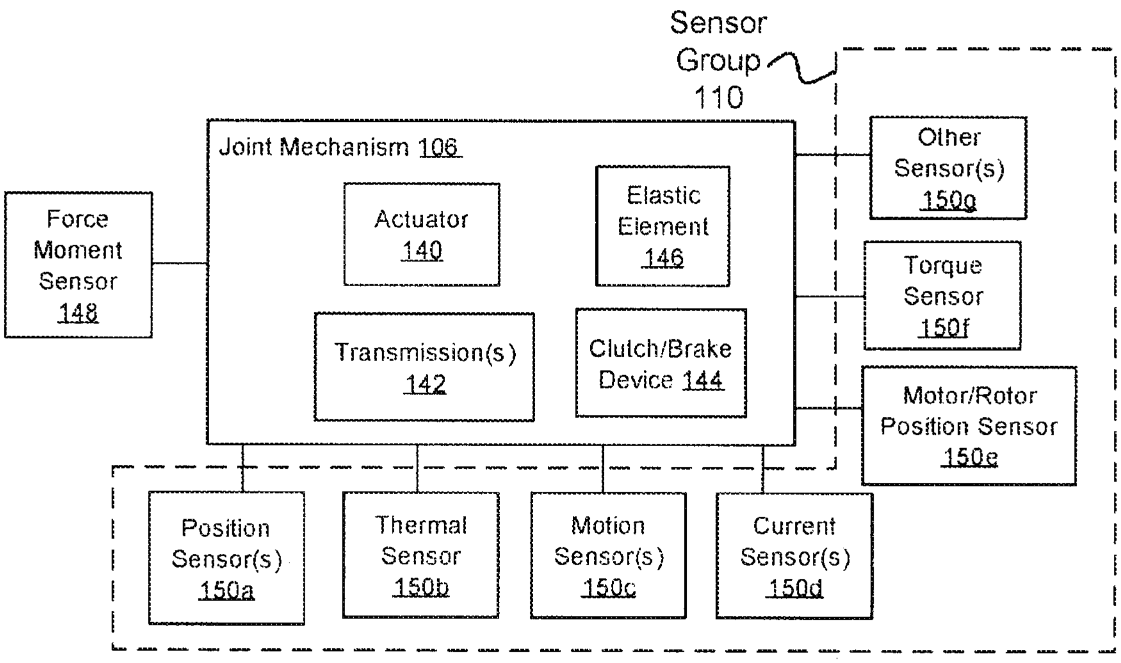
FIG. 5 is a block diagram that illustrates example components included in a joint mechanism of an exoskeleton and of a sensor suite discrepancy detection system, in accordance with an example of the present disclosure.

The sensors S1-S4 of the sensor group 110*a* (and/or of any sensor group of a suite of sensors), may include some of the types of sensors 150*a*-*g* illustrated in FIG. 5 as being part of a sensor group 110 identified as comprising sensors that complement each other. Indeed, the sensors of a sensor group can include, but are not limited to, joint position sensors 150*a* (e.g., Hall effect sensor), thermal sensors 150*b*, inertial-based motion sensors 150*c* (e.g., IMUs), current sensors 150*d* (e.g., phase current sensor), motor rotor position sensors 150*e*, force or torque sensors 150*f*, and/or other sensors 150*g*. As indicated above, the target sensor S1, such as a joint position sensor 150*a*, has a primary sensing function of sensing a rotational position of the joint (e.g., based on a rotational position of a drive/transfer shaft or other component of the joint mechanism). The remaining sensors, even though termed auxiliary sensors (e.g., 150*b*-*e*) in terms of their relationship to the target sensor and their associated group of sensors, may each have a primary sensing functionality that is different from the primary sensing functionality of the target sensor S1. For instance, the torque or force sensor 150*f* has a primary sensing functionality (which is an auxiliary sensing functionality with respect to the target sensor) of sensing a torque output of a shaft or other component of the joint mechanism 106 for purposes of monitoring and managing or controlling forces being applied by the exoskeleton 100 via the joint mechanism 106. As another example, the motor rotor position sensor 150*e* has a sensing functionality of sensing a rotational position of a rotor of an electromagnetic motor (e.g., actuator such as a BLDC motor) of the joint mechanism 106 for purposes of controlling the motor phase commutation with a controller, among other useful purposes, such as a velocity signal. As another example, the inertial-based motion sensors 150*c*, such as IMUs, have a sensing functionality of sensing a gravitational vector of a support structure coupled to the joint mechanism 106 (or another joint mechanism) for purposes of gravity compensation operations associated with operating the exoskeleton. It is noted that each of these sensors can comprise other sensing functions for a variety of purposes as will be appreciated by those skilled in the art. It will also be appreciated that the other sensors within the sensor group 110/110*a* have one or more sensing functions associated with their identified sensor type as noted in FIG. 5. Thus, in this example, each sensor within the sensor group 110/110*a* that is not a position sensor has a sensing function that is something other than facilitating determination of a rotational position of the joint. However, as discussed herein, one or more of these auxiliary sensors S2-S4 (e.g., 150*b*-150*g*) can be recruited as a substitute for the target sensor S1 (e.g., 150*a*), which is advantageous because the auxiliary sensors are already part of the exoskeleton and are in operation for other purposes, so there is no need to include additional/redundant position sensors for each joint, for instance, along with a complicated redundancy control system. Therefore, the controller 108 can recruit and use complementary auxiliary sensors that are already part of the exoskeleton 100 for purposes of operating in a safety mode in the event of a possible defect or malfunction that causes one or more discrepancies in sensor output within the group of sensors 110/110*a*. The term "recruit" as used herein is referred to as the action or method of procuring or selecting an auxiliary sensor (and its sensor output data) as a substitute for a target sensor. The term "substitute" as used herein is referred to as an auxiliary sensor serving or functioning in place of a target sensor by utilizing the transformed sensor output data from the substitute auxiliary sensor.

FIG. 6 illustrates an exoskeleton 200 having a sensor discrepancy detection system 202, in accordance with an example of the present disclosure. The exoskeleton 200 can comprise a plurality of support structures 204*a*-*n* (not all labeled) and a plurality of joint mechanisms 206*a*-*n* (not all labeled) rotatably coupling together the support structures 204*a*-*n* in accordance with pre-determined desired or required degrees of freedom within the exoskeleton 100 that correspond to the various degrees of freedom of a human operator. As will be appreciated by those skilled in the art, an exoskeleton can be configured in a number of different ways and with a number of degrees of freedom. As such, the exoskeleton configurations described herein, and shown in the drawings are not intended to be limiting in any way. In the example shown, each joint mechanism 206*a*-*n* rotatably couples two or more adjacent support structures 204*a*-*n* to define a joint rotatable about an axis of rotation that facilitates movement of the exoskeleton 200 in one or more degrees of freedom corresponding to one or more degrees of freedom of a human operator. For instance, the joint mechanism 206*a* can rotatably couple support structures 204*a* and 204*b*, and can be operable to rotate about an axis of rotation associated with knee flexion/extension of the exoskeleton 200 that corresponds to knee flexion/extension of a human operator. The joint mechanism 206*a* can have an actuator, such as an electromagnetic motor, as part of a drive system for actuating the joint, such as exemplified in FIGS. 7A and 7B and further discussed below.

The exoskeleton 200 and the sensor discrepancy detection system 202 can comprise a suite of sensors S1-Sn configured to generate sensor output data associated with at least one operational function of the exoskeleton 200. The sensors S1-Sn can be coupled to various portions or aspects of the exoskeleton 200, as further exemplified herein, for producing sensor output data transmitted via sensor output signals to a control system or controller 208 of the sensor discrepancy detection system 202 of the exoskeleton 200. In one example, a force moment sensor 248 (e.g., 6-axis load cell) associated with the joint mechanism 206*a* can be provided as part of a contact displacement system to sense movement of a user to effectuate movement of the exoskeleton 200 that at least partially corresponds to movement in accordance with the degrees of freedom of the user when the exoskeleton 200 is being worn or donned by the user, similarly as discussed above regarding FIGS. 1-5. The force moment sensor 248 can be coupled to the support structure 204*a* proximate a shin/leg strap of the exoskeleton 200. Note that each joint mechanism 206*a*-*n* can include or be associated with a force moment sensor coupled to a portion of the exoskeleton to be in contact with (or proximate) a human element of a user wearing and operating the exoskeleton 200.

Notably, a plurality of sensors S1-S4 of the suite of sensors S1-Sn can be identified as a sensor group 210*a* associated with the joint mechanism 206*a*. FIGS. 7A and 7B further illustrate possible sensors S1-S4 and their possible positions on the exoskeleton 200 as being associated with the joint mechanism 206*a*. Note that the joint mechanism 206*a* is shown inverted in FIG. 7B. Connections between the various sensors and the controller are omitted to avoid obscuring the invention. However, it will be appreciated by those skilled in the art that suitable wired or wireless connections are provided to communicate sensor data from each sensor to the controller. A suitable power source (not shown) can be provided for powering operations of the exoskeleton. The power source can provide a source of electrical power for electronic components, such as the sensors, the controller, or other components. The power source can comprise a battery, a fuel-based power generator or a tethered connection to an external power source. For exoskeletons that use pneumatic or hydraulic actuators, the exoskeleton can also include a source of pressurized air or hydraulic fluid, as well as associated fluid lines, valves, busses, etc. The power source and the source of pressurized air can be carried on-board the exoskeleton or can be provided from a remote base unit by means of a tether arrangement.

As introduced above, the controller 208 can be configured to determine a discrepancy between sensor output data of two or more sensors of a group of sensors, such as sensors S1-S4 of the sensor group 210*a*, and can be configured to recruit at least one sensor S1-S4 of the sensor group 210*a* as a substitute sensor to account or compensate for discrepant sensor output data of one of the sensors S1-S4. For instance, a target sensor S1 can comprise a joint position sensor 222 (e.g., Hall effect sensor of FIG. 7A) that transmits rotational position data via sensor output signals to the controller 208 for processing to facilitate determination of a rotational position of the joint defined by the joint mechanism 206*a*. As schematically shown in FIGS. 7A and 7B, an auxiliary sensor S2 can be supported by or coupled to the joint mechanism 206*a*, such as a torque or force sensor, motor rotor position sensor, or other possible auxiliary sensor discussed herein. Another auxiliary sensor S3 can be supported by or coupled to the first support structure 204*a*, such as an inertial-based motion sensor (e.g., an IMU). An auxiliary sensor S4 can be supported by or coupled to the second support structure 204*b*, and can comprise a second inertial-based motion sensor, such as an inertial measurement unit (IMU). Note that support structure 204*b* is hidden from view in FIG. 7A, but see FIG. 6 showing the second support structure 204*b* that could support the auxiliary sensor S4. Further details of the sensors S1-S4 of the sensor group 210*a* are further discussed below, following the below details of the joint mechanism 206*a*.

The joint mechanism 206*a* can include the same features of the tunable actuator joint module 109*a* discussed in U.S. patent application Ser. No. 15/810,108, filed Nov. 12, 2017, which is incorporated herein. More specifically, the joint mechanism 206*a* can be configured to recover energy during a first gait movement and then release such energy during a second gait movement to apply an augmented torque to rotate the knee joint about the degree of freedom in parallel with a torque applied by a primary actuator of the joint mechanism 206*a*, similarly as discussed in incorporated U.S. patent application Ser. No. 15/810,108. The joint mechanism 206*a* comprises a primary actuator 232 and an elastic element, such as a quasi-passive elastic actuator 234, structurally coupled to each other and operable with one another to provide torque to the joint. An input member 236*a* and an output member 236*b* (coupled to the quasi-passive elastic actuator 234) can rotate relative to one another about an axis of rotation 237 to achieve a flexion/extension degree of freedom of the exoskeleton 200 corresponding to a degree of freedom of a human joint, namely the flexion/extension of the knee joint. Note that the input and output members 236*a* and 236*b* may be the respective first and second support structures 204*a* and 204*b* of FIG. 6, but are shown in FIG. 7B as generic members coupled to the input and output of the joint mechanism 206*a* for purposes of illustration.

The primary actuator 232 (e.g., a geared electric motor) is operable to apply a torque to the output member 236*b* for rotation about the axis of rotation 237, and the quasi-passive elastic actuator 234 (e.g., a rotary pneumatic actuator) is selectively operable to generate a braking force, or to apply an augmented torque to the output member 236*b* along with the torque applied by the primary actuator 232 to actuate the joint, such as during a certain portion of a gait movement. As further discussed in incorporated U.S. patent application Ser. No. 15/810,108, the quasi-passive elastic actuator 234 is operable or controllable by a control system (e.g., a valve assembly) to selectively store energy or to selectively generate a braking force (in an elastic state or a semi-elastic state) upon a first rotation of the input member 236*a*, and to selectively release that energy (while still in the elastic or semi-elastic state) during a second or subsequent rotation of the input member 236*a*. Such functionality may be effectuated by the controller 208 in concert with the valve assembly.

With respect to the elastic state of the quasi-passive actuator 234 as it operates to store and release energy, in one aspect, the first rotation of the input member 236*a* can be achieved via active actuation of the primary actuator to actuate the tunable joint module and to cause rotation of the joint module (and any structural supports coupled thereto). In another aspect, the first rotation of the input member 236*a* can be achieved passively, namely by exploiting any available gravitational forces or external forces acting on the robotic system suitable to effectuate rotation of the input member 236*b* within the tunable actuator joint module (e.g., such as a lower exoskeleton being caused to perform a sitting or crouching motion, which therefore affects rotation of the various tunable joint modules in the exoskeleton). The exploiting of such gravitational forces by the quasi-passive actuator in parallel with a primary actuator provides the tunable joint module with compliant gravity compensation. Once the energy is stored, it can be released in the form of an augmented torque to the output member 236*b*, or it can be used to brake or restrict further rotation.

The quasi-passive elastic actuator 234 can further be configured, upon a third or subsequent rotation(s), to neither store nor release energy, the quasi-passive elastic actuator 234 being caused to enter an inelastic state. In this inelastic state, the input and output members 236*a* and 236*b* are caused to enter a "free swing" mode relative to each other, meaning that negligible resistance exists about the quasi-passive elastic actuator 234 (this is so that the actuator 234 does not exhibit a joint stiffness value that would restrict rotation of the input member 236*a* relative to the output member 236*b*, such as would be desired during a leg swing phase of a gait cycle of the robotic device). In this manner, the quasi-passive elastic actuator 234 is switchable between the elastic state and the inelastic state, such that the quasi-passive elastic actuator 234 applies an augmented toque (in the elastic state) in parallel with a torque applied by the primary actuator 234. This combined torque functions to rotate the output member 236*b* relative to the input member 236*a* in a more efficient manner as less torque is required by the primary actuator to perform the specific gait phase, thereby reducing the power requirements/demands of the primary actuator 234, as further detailed below.

As further illustrated in FIG. 7B, the quasi-passive elastic actuator 234 can be structurally mounted to the primary actuator 232 by a first mounting plate 238*a* and a second mounting plate 238*b*, each positioned on either side so as to constrain the primary actuator 232 and the quasi-passive elastic actuator 234 in a "sandwich" state. The first mounting plate 238*a* is mounted to a housing mount 240 of the primary actuator 232 via a plurality of fasteners 242 (with spacers there between). The first mounting plate 238*a* comprises a primary aperture 244*a* that rotatably supports a collar bearing of the primary actuator 232, and comprises a secondary aperture 244*b* that rotatably receives a collar bearing supported by the quasi-passive elastic actuator 234.

The primary actuator 232 can comprise a housing mount 240 to house and structurally support the primary actuator 232. The primary actuator 232 comprises a motor 278, such as a high-performance Permanent Magnet Brushless DC motor (PM-BLDC). The motor described above and shown in the drawings is not intended to be limiting in any way. Indeed, other motors suitable for use within the primary actuator 232 are contemplated herein, as are various other types of actuators, such as hydraulic actuators. The motor 278 can comprise a central void that receives a gear train or transmission, such as a planetary transmission 286. A rotatable transfer wheel 298 can be fastened to the rotor of the motor 278 to transfer rotation from the rotor of the motor 278 to a sun gear of the transmission 286 about the axis of rotation 203. Upon applying an electric field to the motor 278 (i.e., from the controller 208), the rotor rotates about axis 203, which causes the transfer wheel 298 to rotate, which thereby causes the sun gear to rotate, which causes an output shaft 209 to rotate primary pulley 216. The primary pulley 216 is rotatably coupled to a transmission belt 224, which is rotatably coupled to a gear ring 268 that ultimately causes rotation of the joint via a vane device coupled to the output member 236*a* (see U.S. patent application Ser. No. 15/810,108 incorporated herein for further details on the vane device and valve assembly).

In one example, a sensor plate 220 can be fastened to an outer side of the housing 240, and has an aperture that supports the position sensor 222 (i.e., target sensor S1, in this example). The position sensor 222 is adjacent the transfer wheel 298, which has an aperture through to the sun gear (of the transmission 286) that facilitates the position sensor 222 to determine the rotational position of the sun gear. The sensor output data produced by the position sensor 222 can be transmitted via an output signal to the controller 208 for processing to determine the rotational position of the joint. The position sensor 222 can be any suitable sensor, such as a 13-bit Hall effect sensor, magnetic encoder, optical encoder, resolver, potentiometer, etc. It should be appreciated by those having skill in the art that the type of joint position sensor used may dictate the possible location on the joint mechanism that such sensor is mounted to. As discussed above, the particular rotational position of the knee joint mechanism is relevant for determining and controlling actuation of the joint via control of the motor 278 based on the contact displacement system.

The motor 278 can comprise a stator and rotor rotatable relative to each other (in a typical fashion for commercially available frameless brushless motors), and the auxiliary sensor S2, such as a motor rotor position sensor, can be operably coupled to or proximate to the motor 278 for producing sensor output data associated with a rotational position of the rotor relative to the stator. For instance, based on the sensed rotational position of the rotor using the auxiliary sensor S2, the controller 208 can execute a transformation calculation that transforms the sensor output data from the sensor S2 into a format or value that can be an estimate of the rotational position of the joint defined by the joint mechanism 206*a* (in the event the target sensor S1 provides data that "fails" testing processes, as exemplified below). Such transformation of the sensor output data associated with the auxiliary sensor S2 can produce "transformed sensor output data" that can be compared against the sensor output data of the target sensor S1, as further exemplified below regarding FIGS. 11A-16. Such calculation may need to take into consideration the gear reduction provided by a transmission (e.g., planetary transmission 286, and/or belt 224). For instance, if a particular transmission provides a 40:1 gear reduction from the output of the motor, then the position recorded at the motor is merely divided by a factor of 40 when calculating the transformed sensor output data. Such calculation may also need to take into consideration the torque being applied by the motor in instances where a compliant transmission is used, such as a transmission (e.g., a belt) having an elastic element with a particular stiffness value (K value), because a certain amount of stretch or elasticity would need taken into consideration when calculating the position of the joint using force and torque values (i.e., F=Kx). Other transmissions or couplers may have a particular stiffness value that may need taken into consideration when determining such joint position. For example, in the case where the transmission mechanism has a stiffness value of K and the transmission gear reduction is N:1, the joint position, $\theta_J$ can be estimated using rotor position, $\theta_M$ as: $\theta_J=\theta_M/N\pm T_J/K$ where the sign of the joint position correction due to the application of a non-zero torque to a compliant joint depends on the joint position sign convention.

The data provided by the rotor position sensor can be used: (1) to control the commutation of the motor phases, and (2) for closed-loop position/velocity control of the rotor in control policies such as software stop limits, for instance. If a rotor position sensor malfunctions, it can render the motor unusable as a power source, or it may generate random commutations sequences, or it may make the joint simply unresponsive. Note that, if the problem is detected, the motor can still be used as a controlled passive brake, for instance.

As noted above, the rotor position sensor can be used as an auxiliary sensor to a target sensor (e.g., joint position sensor). Inversely, the rotor position sensor can be considered as "a target sensor", and other sensors can be considered as "auxiliary sensors" that act as a "back-up" or substitute sensor if the rotor position sensor is malfunctioning. For instance, a joint position sensor can be used as an auxiliary sensor to the rotor position sensor being the target sensor.

Note that the relation between rotor position and joint position depends on multiple parameters including: (1) transmission ratio; (2) transmission compliance; (3) backlash; (4) transmission internal friction; (5) transmission non linearities and position dependent systematic error (e.g. periodic position error observed in harmonic drive gears); and (6) other parameters. This said, a good estimate of the joint position $\theta_J$ could be computed using an equation of the form: $\theta_J=f_{tr}(\theta_M, T_J, T_M, \theta_M)$, where $f_{tr}$ is a function that encapsulate the characteristics of the transmission, including but not limited to: gear ratio (NGR), compliance, friction, backlash, periodic systematic error (e.g. cyclic error observed in Harmonic Drive transmissions), to list the most important, $\theta_M$, is to rotor position, $T_J$, is the joint torque (the torque applied by the transmission to the joint, and as a rule it may be the total joint torque minus the torque contributed by the elastic element coupled to the output joint), $T_M$, is the rotor (motor torque) and $\theta_M$ is the rotor speed (also referred to as WM).

The structure and operation of a motor rotor position sensor is well known in the art, and therefore will not be discussed in great detail. However, note that the motor rotor position sensor has a primary sensing functionality of producing data associated with the rotational position of the rotor relative to the stator (or other component), which is different than the primary sensing functionality of the target sensor S1, for instance. Nonetheless, the motor rotor position sensor, as an auxiliary sensor to the target sensor, can generate sensor output data that can be transformed by the sensor suite discrepancy detection system 202 for purposes of allowing the motor rotor position sensor to function as a possible substitute sensor for the target sensor.

In one example, the controller 208 may include available software libraries tailored for "sensorless" control of the motor (i.e., rotor position state estimator) to measure the rotor position of the motor. The implementation of a rotor position state estimator could: provide the means for an actuator to continue operating in the event of a malfunction of the rotor position sensor where the rotor position sensor is relied upon as a complimentary sensor to the joint position sensor; allow joint position to be estimated by taking into account characteristics of a transmission (e.g., the transmission(s) discussed herein); allow rotor speed to be computed and used on one mechanism to determine if the primary joint position and rotor position sensors are working properly; and as a by-product of the state estimation algorithm to provide an estimate of the motor phase resistance, which, in turn, could be used to estimate motor coil temperature. Thus, the use of state estimator algorithms and software for sensorless motor control can serve as another "back-up" mechanism for a joint position sensor if it is defective or malfunctioning, thereby providing sensor redundancy.

In another example, another possible auxiliary sensor (of the sensor group 210*a*) can comprise a torque sensor operatively coupled to one or more components of the joint mechanism 206*a* in a suitable manner for producing sensor output data associated with a torque applied to the joint by the motor. For instance, a joint torque sensor can be coupled to the shaft 209, or to the sun gear of the transmission 286, or at or near the input or output members of the joint mechanism 206*a*, or to any other rotational component that generates or experiences a torque of the exoskeleton for purposes of sensing torque. Thus, the primary sensing functionality of the torque sensor is to produce data regarding a torque value generated or experienced by a component of the joint mechanism 206*a* to appropriated close the loop on a torque command, such as in the case of its use with a force moment sensor (e.g., a 6-axis load cell) as part of a contact displacement system, as mentioned above. Note that the same or additional torque sensor(s) may also be used for gravity compensation purposes of the exoskeleton itself, and also during tasks such as acquiring and lifting a load. A joint torque sensor may also be used to control the compliance and/or impedance characteristics of a joint, and/or to allow a joint to respond in a preset way to external forces applied to the exoskeleton. However, as noted above, in the event the target sensor S1 (e.g., position sensor 222) "fails", sensor output data produced by the torque sensor can be combined with information from other sensors such as a pair of IMUs installed on adjacent structural members rotatably couple to form a joint and can be transformed and used to estimate the rotational position of the joint, wherein the torque sensor and complementary sensors used together operate as a possible substitute sensors for the target sensor S1, as further exemplified herein.

Each joint mechanism can include a joint torque sensor that is used a means to implement closed-loop joint level torque control, such as for control policies that include contact displacement, payload compensation, and gravity compensation, for instance. If a torque sensor malfunctions, this can result in a joint mechanism that improperly responds, or possible loses control due to large, unwanted torque commands being generated and executed by actuators of the joint mechanisms. Thus, appropriately sensing or estimating joint torque is a safety-critical operation for safe operation of the exoskeleton. Similar to the description above, in one example the joint torque sensor can be considered a target" sensor, while other sensors can be considered "auxiliary sensors" that are used to estimate joint torque in the event that the joint torque sensor malfunctions. For instance, the total torque applied at a particular joint can be estimated by using (1) the magnetic flux versus rotor angle (which is a parameter that may be characterized independently and measured current flowing in three phases of the motor to estimate electromagnetic torque generated by the motor), (2) measured and/or estimated contribution from the brake and/or elastic element operating in parallel with the (geared) motor, and (3) model of the transmission, including friction, backlash, and other non-linearities.

Note that a number of other auxiliary sensors can be included within the sensor group 210*a* as associated with the joint mechanism 206*a*, and coupled to or about various components of the joint mechanism 206*a*, as also discussed above regarding FIG. 5. For instance, a temperature or thermal sensor can be coupled to the motor 278 for sensing a temperature of the motor coils, which can be used by the controller 108, 208 to prevent motor coils from being damaged as a result of overheating. A suitable thermal sensor may be a resistance temperature sensor (RDT), a thermocouple sensor, etc., which can be coupled at or near a coil of the motor 278, or to the housing 240, or even to a battery pack of the exoskeleton. The operating temperature of the motor 278 can be determined by measuring the electrical resistance of the motor coils, taking advantage of the fact that the resistance of the coils increases in a deterministic way as their temperature increases. This is monitored because if the temperature sensor is not responding, the sensed resistance can be used instead of the temperature sensor. This can be important for safe operation of the motor, because if it is running at temperatures above those that are normal (i.e., "too hot") this can be an indication of a problem with the joint mechanism 206*a* and could result in damage to the motor that in turn can render the motor (or a joint actuator comprising the motor) unusable. In such a case, the controller 208 can function to operate the exoskeleton in a safety mode, such as shutting off power to the motor and engaging a clutch or brake, and/or limiting the maximum torque that a motor can produce, thereby reducing heat generated due to Joule heating (i.e. resistive heating) of the motor coils. The term "safety mode" as used herein is referred to as a specific mode of the controller where one or more commands or processes executed by the controller operate the exoskeleton (or component(s) thereof) in a manner that reduces the likelihood, or prevents, injury to an operator and/or damage to property.

As also noted above, auxiliary sensors such as one or more inertial-based motion sensors can be coupled to the joint mechanism 206*a* and/or to the support structures 204*a* and 204*b* rotatably coupled together by the joint mechanism 206*a* (or another support structure of the exoskeleton 200). For instance, motion sensors such as single axis or multi axis accelerometers, gyroscopes, magnetometers, IMUs, etc. can be utilized as auxiliary sensors that have a primary sensing functionality of sensing position, velocity, and/or motion of relevant support structures of the exoskeleton, but that can be recruited by the controller 208 to estimate a rotational position of the joint upon transformation of their sensor data. For instance, based on the sensed spatial orientation of the first support structure 204*a* (as sensed by the IMU auxiliary sensor S3), and based on the sensed spatial orientation of the second support structure 204*b* (as sensed by the IMU auxiliary sensor S4), the controller 208 can determine the rotational position of the joint defined by the joint mechanism 206*a*. More specifically, each IMU measures its orientation and that of the structural member to which it is coupled, so the controller can monitor and measure the change in the orientation for each IMU from the prior orientation to determine the rotational position of a joint (e.g., 206*a*) situated between a pair of adjacent IMUs (e.g., one IMU, S3) on support structure 204*a* and the other IMU, S4 on support structure 204*b*). One method to calculate joint position from a pair of IMUs can include a 4D quaternion method (a 4-tuple that is a concise representation of rotations) calculated based on the data collected by each IMU. Specifically, the unit magnitude quaternion $$q_{S3,S4} = q_{S3}^{*} \otimes q_{S4},$$

describes the joint angle and the direction of the joint axis of rotation, and where $\otimes$ is the quaternion multiplication, $q_{S3}^{*}$ is the conjugate of the unit magnitude quaternion generated from data from IMU S3, and $q_{S4}$ The joint angle $\alpha_J=(\alpha-\alpha_0)$, can be calculated from the real part of the quaternion for the joint, $q_{S3,S4}$, using the formula $$\cos\left(\frac{\alpha}{2}\right) = \mathrm{Real}(q_{S3,S4}),$$

and where, $\alpha_o$ is a constant that depends on the convention used to define the zero angle of the joint. The inverse can be appreciated in a similar manner, namely that a group of position sensors can be used in the determination whether one or more IMUs is defective or faulty. For instance, data generated a joint position sensor on joint mechanism 206*a* and a joint position sensor on joint mechanism 206*c* can be used by the controller to "check" whether an IMU (i.e., on the support structure linking such joint mechanisms) is accurately calculating its orientation (represented as a quaternion, as Euler angles, as a rotation matrix, or other representation of rotation and orientation) or is faulty.

Such calculation or transformation of the sensor output data associated with the auxiliary sensors S3 and S4 can generate "transformed sensor output data" that can be compared against the sensor output data of the target sensor S1, as further exemplified below regarding FIGS. 11A-16, for purposes of estimating joint rotational position. Note that such calculation may need to take into consideration the kinematic makeup or construction of the exoskeleton, including the distance and spatial position of the IMUs relative to the axis of rotation 237 of the joint mechanism 206*a* for knee rotation, for instance. The structure and functionality of motion sensors, such as IMUs, is well known, and therefore will not be discussed in great detail herein. Those having skill in the art can readily appreciate the incorporation of one or multiple inertial-based motion sensor(s) with an exoskeleton, and the well-known operations for receiving and processing data produced by motion sensors.

Note that other IMUs (i.e., those which can be considered as auxiliary sensors of other pre-determined or defined sensor groups) of the exoskeleton that are supported on other support structures (e.g., other than 204*a* and 204*b*) can be used to determine or estimate joint rotation position of one or more joints. For instance, an IMU supported by support structure 204*c*, with its sensor output data transformed, can be used along with joint position sensors on the robot hip, knee, and ankle joints to "simulate" the output of a possibly defective IMU (e.g., auxiliary sensor S3) supported by the support structure 204*a*. This is merely one example of using other sensor(s) as substitutes for a possible faulty sensor. Thus, it should be appreciated that sensors supported away from (i.e., not necessarily directly associated with) any one specific joint or joint mechanism can be used, such as an IMU supported by a support structure that is not directly coupled to the joint mechanism in question.

Further to this concept, in one example, all of the IMUs of the exoskeleton can be used to map the exoskeleton, along with the joint position sensors (e.g., 222) of each joint mechanism, to determine if one or more of the IMUs is faulty so that the faulty IMU can be discarded and not used by the controller. Based on a frame of reference of the kinematics of the exoskeleton, and in the event a particular IMU does not "agree" with other IMUs, for instance, this may indicate a defect or malfunction with the particular IMU, so that data produced by this IMU can be ignored or not used in processing operations and for control of the exoskeleton, such as one or more joint mechanisms of the exoskeleton. A similar principle applies for other groups of the same sensor, such as a group of joint position sensors associated with a limb of the exoskeleton. More specifically, a consecutive number of joint position sensors associated with flexion/extension of the respective wrist, elbow, and shoulder joints of a limb may be utilized to determine whether one of the joint position sensors (or another sensor) is faulty or defective by comparing the sensor output data of such sensors against each other. This is because, based on the known geometry of the exoskeleton arm, the controller can discern the expected torque at an elbow joint (flex/extend) based on the sensed torque of the shoulder joint (flex/extend), and perhaps based on the sensed position of the shoulder and elbow joints. Thus, if the expected torque at the elbow joint is much greater or lower than the value the torque sensor is actually outputting, then the controller may determine that the torque sensor at the elbow joint is faulty or defective. This is merely one non-limiting example of how a group of sensors can be used in combination by the controller to indicate whether one or more sensors is faulty.

In another example, a possible auxiliary sensor of the sensor group 210*a* can comprise one or more current sensors, such as one or more total current sensors, which can be included for generating data associated with a transmitted current to the motor (or other type of actuator). The current sensors can be supported at or near a battery pack of the exoskeleton, and/or at network bus branches of the controller 208. Another type of current sensor includes a motor phase current sensor, such as a sensing resistor, Hall effect sensor, etc., which can be used to generate data associated with the phase current transmitted to the motor during commutation of the motor. Therefore, in one exemplary embodiment, the data generated by a motor phase current sensor can be used to approximate joint torque by allowing the controller to estimate the electromagnetic torque, $T_M$, produced by the motor as $T_M=K_T(\theta_M)*I_{ph}$ where, $K_T(\theta_M)$ is the motor torque constant at rotor position, $\theta_M$ and $I_{ph}$, is the phase current, or using another observer for the electromagnetic torque produced by the electric motor, and also by taking into account, as needed to achieve the desired level of accuracy, the characteristics of the transmission (gear ratio N, friction, backlash, and other parameters that may be used to describe the characteristics transmission) as discussed herein. More specifically, if the output of the torque sensor "disagrees" with the motor phase current sensor, the controller can conclude that the torque sensor has failed. Alternatively, the controller 208 can switch from one control policy (e.g., based on a contact displacement system) to another control policy (e.g., admittance control) as one example of a remedial measure, whereby the admittance control policy may not rely on joint torque sensors for control, but can rather rely on joint position sensor to determine or estimate rotational joint position. The controller 208 may instead switch to a third control policy of a plurality of control policies that are available and running in the background concurrently. The "switching" between control policies (as a remedial measure) is further described in U.S. patent application Ser. No. 17/114,458, filed on Dec. 7, 2020, which is incorporated herein by reference in its entirety. A "control policy" is referred to herein as the basis in which control of function(s) and/or component(s) of one or more aspects of an exoskeleton to achieve or produce a certain performance (e.g., a motion) is carried out. In one example, a "control policy" can comprise a set of rules programmed and stored in a controller of an exoskeleton to achieve a particular goal or task (e.g., controlling lower and upper body joint mechanisms to achieve a gait motion of the exoskeleton). A particular control policy programmed into a controller may take into consideration sensor data from various sensors on the exoskeleton, such as strain gauge sensors, that indicate a desired movement of the user of the exoskeleton, so that the controller can then control one or more components (e.g., actuators, clutches, brakes, etc.) of the exoskeleton to effectuate the desired movement received from the user via the sensors, which can close the control loop for any particular component. Examples of control policies are further provided herein.

In one example, a motor phase current sensor, used to measure phase current to an electric motor of the joint mechanism, can be considered a "target sensor" in that auxiliary sensors can be used as "back-up" in the event of a malfunction of the motor phase current sensor (such malfunction can cause an incorrect torque value to be produced by the motor). More specifically, because phase currents (i.e., three phase current sensors) need to sum up to zero when the motor is spinning, the controller can constantly calculate the phase current sum and ensure it is zero. When the data from the three phase current sensor do not sum to zero, the controller can analyze the phase/amplitude relationships of the three phases to determine with of the three sensors failed. That failed sensor can then be ignored, because the missing phase current could be calculated by calculating the value that is necessary to sum the two correct phase currents to zero. In another example of a state estimator designed to allow the motor torque to be controlled by controlling phase voltage, thereby bypassing, in the process, the need for phase current sensing.

As indicated above, the structure and functionality of inertial-based motion sensors, such as IMUs, is well known, and therefore will not be discussed in great detail herein. Those having skill in the art can readily appreciate the incorporation of a motion sensor with an exoskeleton, and the well-known operations for receiving and processing data produced by motion sensors.

In yet another example, one or more auxiliary sensors (and also possible target sensors) may include voltage sensors and current sensors. For instance, a voltage to RT and electronic bus sensor (i.e., a target sensor) provides voltage measurement for high-power branch sensors to supplement the current information load. If this sensor malfunction, data from a high-power branch sensor can be compared against RT controller's voltage sensor.

In another example, a battery module current primary sensor (i.e., a target sensor) provides current measurement for a battery module to control the amount of power delivered by the battery and the rate of charging. A comparison between the battery management controller and the high-power branch sensors could detect a malfunctioning sensor in the battery module when the battery is discharging. When the battery is being charged, the battery current can be compared with the charger current. A malfunctioning sensor could wrongly turn off the batter, fail to isolate a short, or act slowly in protecting the battery during power delivery or charging. In this manner, a battery shutting off during a loaded robotic task could become a safety hazard, so proper battery current sensing is needed for safe operation of the exoskeleton. As an "auxiliary sensor" in this example, the charger current/sum of limb current value can be used to estimate the current of the battery module.

In another example, if a battery module voltage sensor is malfunctioning, the control power voltage or limb power voltage can be used to estimate the voltage of the battery module.

Both at the joint level and the controller level, joint speed plays a key role in control policies for controlling the joint mechanisms of the exoskeleton. In one example, joint speed of a particular joint can be computed by numerically differentiating data provided by the joint position sensor (e.g., a target sensor) associated with the joint. In another example, joint speed can be computed numerically by using rotor position sensor data, as further detailed below. Regardless of how joint speed is computed for a particular joint, it may have an impact on particular control policies, including at the joint level using recurrence controller policies where joint speed is used to control stability of the joint mechanism. It may also include a control policy associated with software limit stops algorithms where damping uses joint speed as an input parameter. It may also include a control policy associated with damping and stopping a joint when a "large command" is generated for controlling the joint that may otherwise cause the exoskeleton to collide with the operator, surrounding bystanders, and/or objects in the area. It may also include a control policy by the high-level controller safety processes, such as when mapping trajectory of end-points (e.g., end effectors) and create software defined exclusion zones. In any scenario, fault or malfunction or computational error of joint speed by the controller may reveal a problem with the target sensor used to computed joint speed, which may result in an unsafe operation or movement of the exoskeleton.

More particularly, in one example joint speed can be computed using an auxiliary sensor, such as a rotor position sensor that provides rotor speed information $\theta_M$ along with characteristics of the transmission. The speed of the rotor can be calculated by comparing differing rotor positions over time, which may be 15 to 120 times larger than that of the speed of the joint; this depends on the transmission ratio of a transmission of a particular joint mechanism.

In another example, the IMUs (e.g., as auxiliary sensors) can be used as a means to convert the exoskeleton into a full body motion capture device to compute joint speed of one or more joints (in the event of malfunction of one or more target sensors, such as joint position sensors). To estimate individual joint speed, the data needed would include either (1) data from IMUs located on adjacent support structures (as also discussed above), or (2) IMU data on other nearby support structures (i.e., not adjacent IMUs), along with position sensor data and kinematics information required to compute angular speed of the two support structures about the axis of rotation of the joint of interest. Because some IMUs are sampled at 250 samples/second, if the IMU data from adjacent support structures is available to each link controller, joint speed computation using IMUs could be performed at the level of the joint controllers (i.e., using firmware running on individual link controllers) and the result (i.e., joint speed) can be used, not only as part of a control policy of the central controller, but also as part of the joint level control. Additionally, computing joint speed using IMU data at the level of the local controllers on each joint mechanism allows comparison of data obtained from the target sensor (e.g., joint position sensor) and auxiliary sensors, and selection of an alternative sensor in the event of malfunction of the target sensor, which is performed at the local controller level of each joint mechanism.

Similarly, rotor speed can be calculated and used as a part of joint level control policies in which computed damping or software stops are applied directly to the rotor by controlling the rotor. Rotor speed can be computed by numerically differentiating rotor position sensor data, which may provide a higher quality signal for joint speed than that obtained from the joint position sensor. Joint position sensor, along with characteristics of the transmission, can be implemented as an "auxiliary sensor" that can estimate rotor speed. Similarly, as discussed above, the controller 208 may include available software libraries tailored to "sensorless" control of the motor (i.e., rotor speed state estimator) to measure the rotor speed of the motor. Thus, the use of state estimator algorithms and software for sensorless motor control can serve as another "back-up" mechanism for a rotor position sensor if it is defective or malfunctioning, and thereby providing sensor redundancy.

Referring back to FIG. 6, the exoskeleton 200 may include one or more force moment sensors 250, such as 8-strain gauge bridges, supported about a foot support structure 204*g* of the exoskeleton for determining a force moment associated with movement of the user's leg for controlling one or more joint mechanisms of the leg of the exoskeleton 200. The controller 208 can detect whether any of these strain gauge bridges is faulty by the use of a shunt calibration operation (i.e., shorting one of the bridges to obtain a reading equivalent to loading the force moment sensor) to determine if one or more bridges is faulty, or even a structural component of the force moment sensor itself. Based on the detection of any faulty strain gauge bridges, the controller 208 may be configured to control one or more joint mechanisms by utilizing at least 6 of the bridges of the force moment sensor. This is another example of redundancy because for some key axis (such as the force normal to the sole of the foot) the information sensed by the force-moment sensor (e.g. by measuring the strain experienced by structural members of the force-moment sensor as a function of load applied to the sensor) is readily redundant (i.e. the sensor is equipped with more strain sensing devices than the minimum needed to measure the force-moments) and part of this information is not necessary to estimate the force-moments applied by the operator to the exoskeleton.

In one example, the exoskeleton can include one or more ground contact sensors to measure one or more interaction force moments between the foot and/or hands and the ground and/or object. The ground contact sensors can be embedded between the sole and the base of the foot of the exoskeleton, for instance (and similarly regarding the hands of the exoskeleton). Data produced by the ground contact sensors can function in a complementary manner to detect when a load supported by the feet is low, for instance. This information can be fused with that provided by the force moment sensors on the feet in order to modulate control parameters. This can be a safety feature in terms of the controller knowing whether or not the feet of the exoskeleton make contact with the ground or leave the ground, which provides a level of redundancy for the other sensors of the exoskeleton in terms of the interaction forces, etc.

Figure 8:
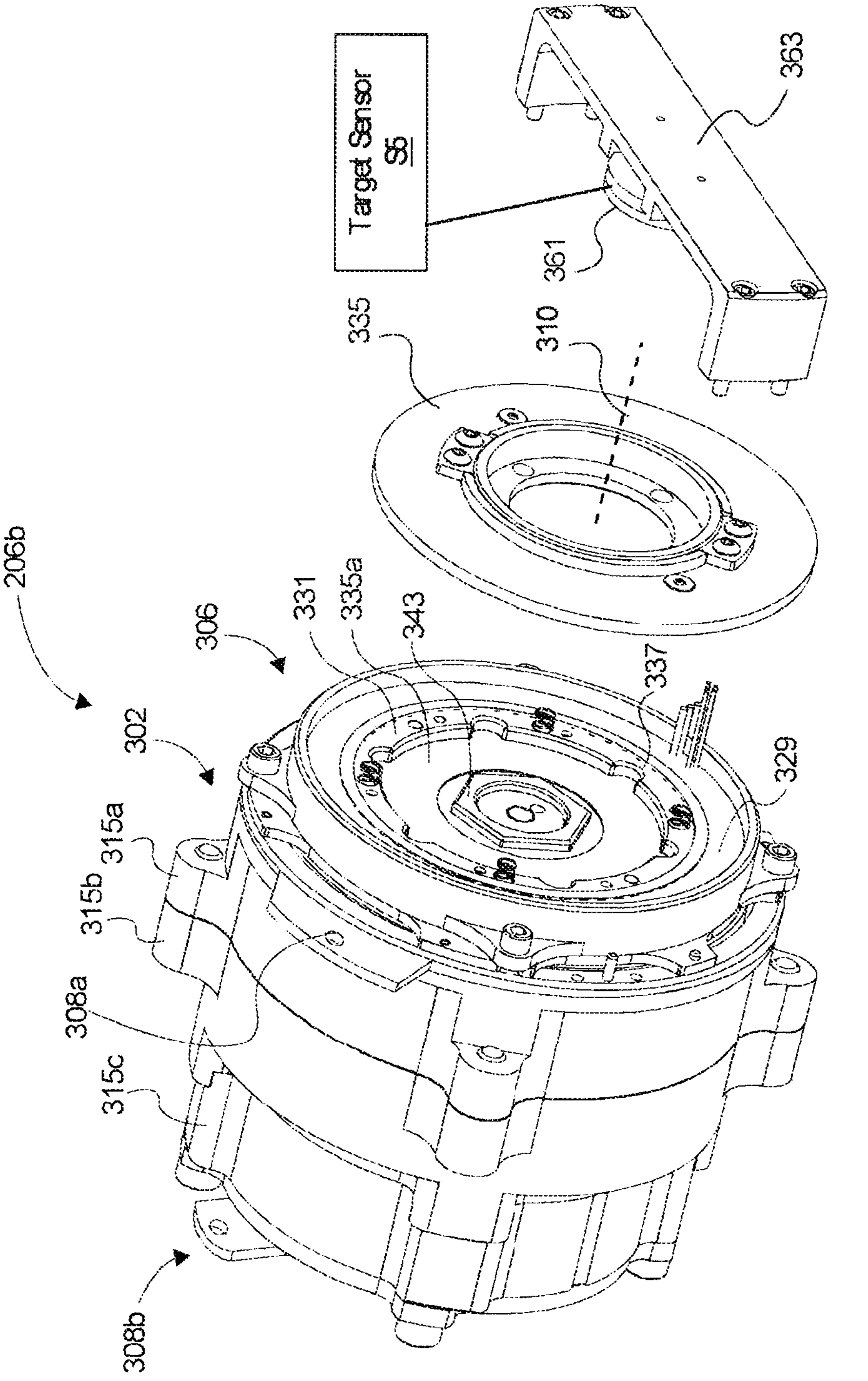
FIG. 8 is a partially exploded view of a joint mechanism of the exoskeleton of FIG. 6, in accordance with an example of the present disclosure.
Figure 9:
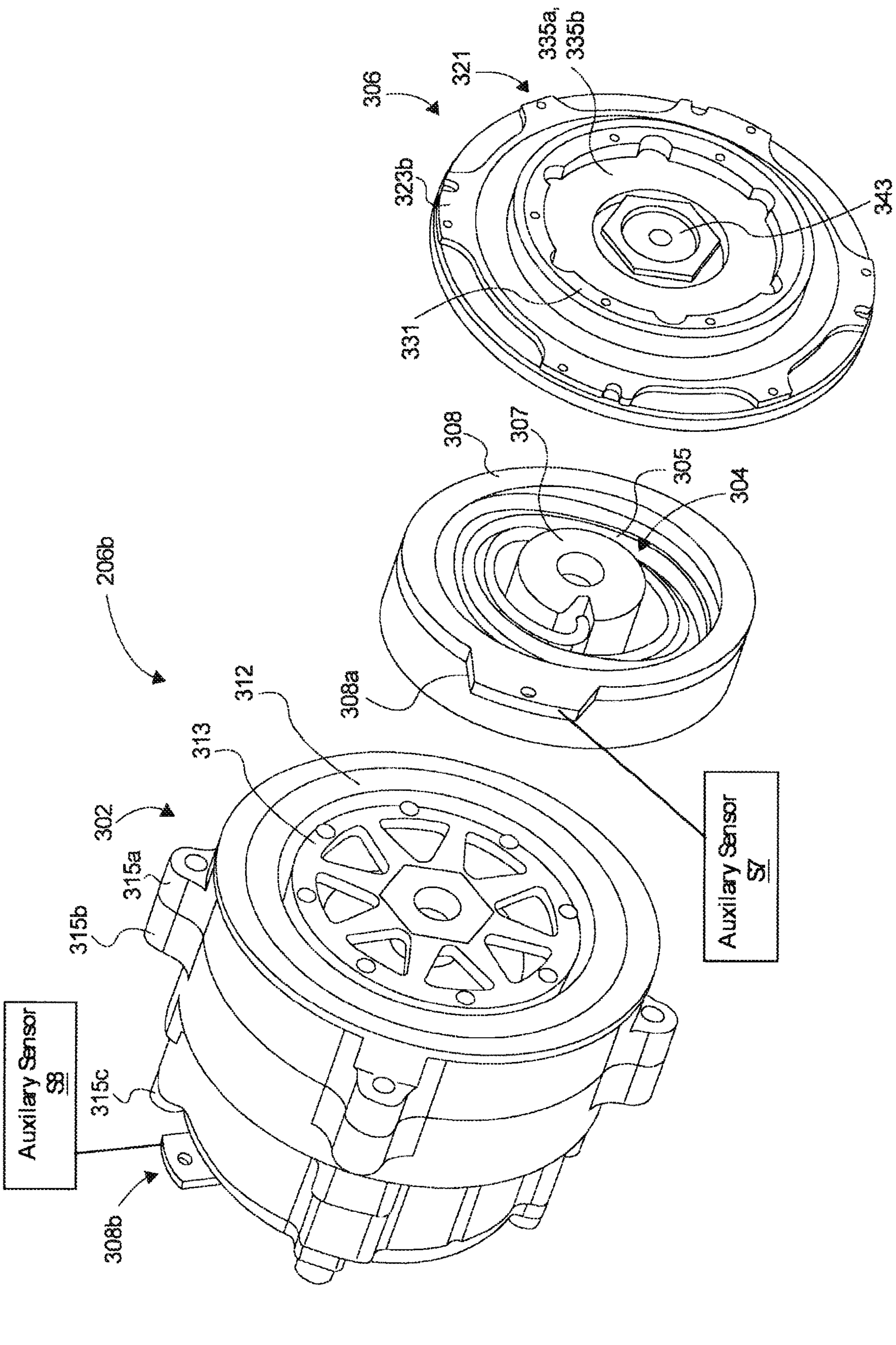
FIG. 9 is a partially exploded view of the joint mechanism of FIG. 8.
Figure 10:
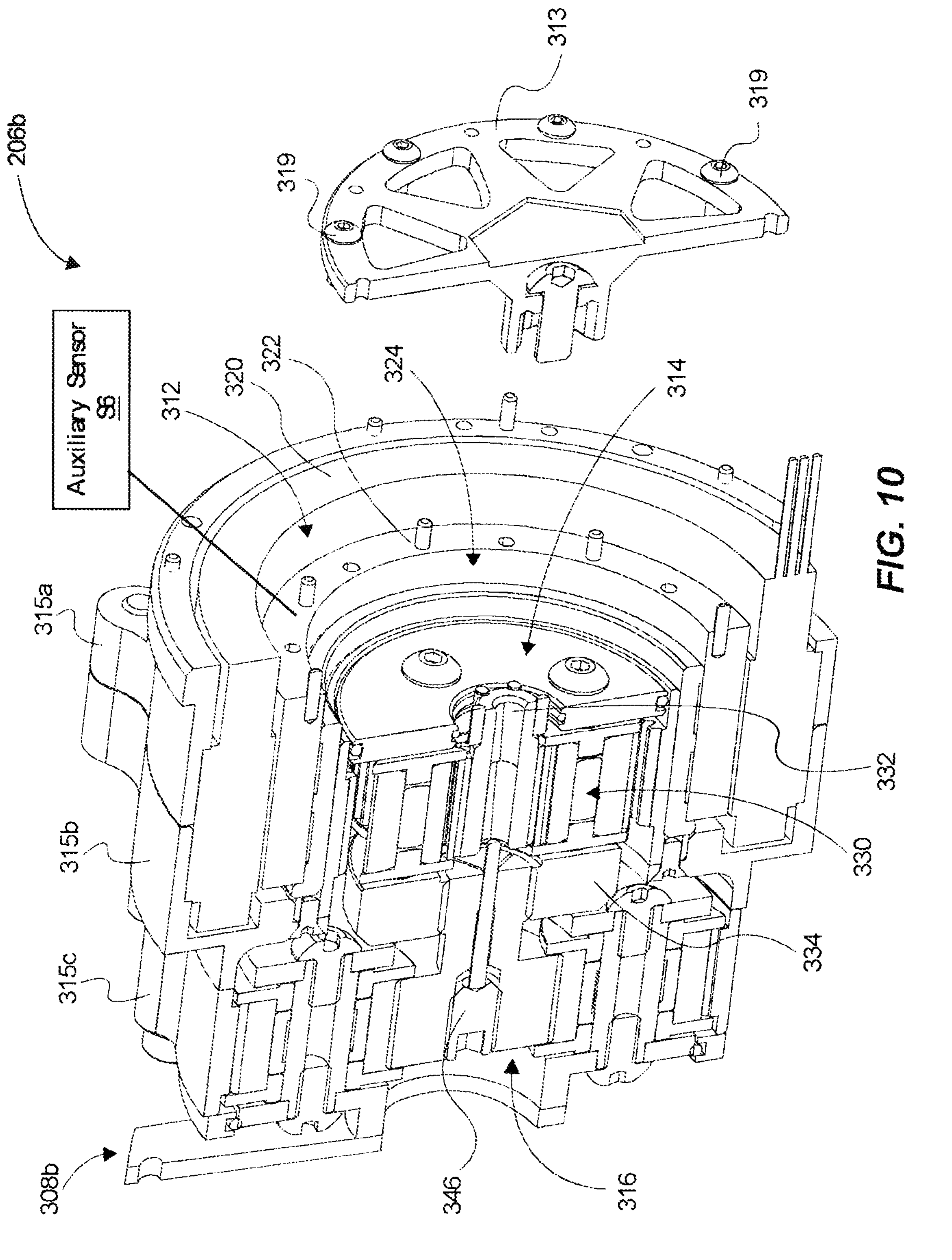
FIG. 10 is a cross sectional view exploded view of a portion of the joint mechanism of FIG. 8.

FIGS. 8-10 illustrate further details of the joint mechanism 206*b* introduced regarding the exoskeleton of FIG. 6, in accordance with an example of the present disclosure. Thus, again with reference to FIG. 6, the suite of sensors S1-Sn can include a plurality of sensors S5-S8 identified as a sensor group 210*b* associated with the joint mechanism 206*a*. As an overview, sensor S5 can comprise a joint position sensor 361, as shown and discussed in FIG. 8 indicated as a target sensor S5. FIG. 10 schematically illustrates auxiliary sensor S6 that can be a motor rotor position sensor, as detailed below. FIG. 9 schematically illustrates sensors S7 and S8 that can comprise auxiliary sensors that can be IMUs supported by respective support structures 204*e* and 204*f* (FIG. 6). Note that sensors S7 and S8 are schematically illustrated as being associated with respective input and output members 308*a* and 308*b*, but it will be appreciated that such sensors S7 and S8 can be supported by the support structures 204*e* and 204*f* coupled to the input and output of the joint mechanism 206*b*. The sensor group 210*b* will be further discussed below, following a description of the joint mechanism 206*b*.

The joint mechanism 206*b* can include the same features of the clutched joint module 300 discussed in U.S. patent application Ser. No. 15/810,102, filed Nov. 12, 2017, which is incorporated by reference herein. More specifically, the joint mechanism 206*b*, which defines a degree of freedom corresponding to extension/flexion of an elbow joint, can be configured to recover energy during a first movement and then release such energy during a second movement to apply an augmented torque to rotate the elbow joint about the degree of freedom in parallel with a torque applied by a primary actuator of the joint mechanism 206*b*, similarly as discussed in incorporated U.S. patent application Ser. No. 15/810,102. More particularly, the joint mechanism 206*b* can comprise a primary actuator 302, a quasi-passive elastic actuator 304 (FIG. 9), and a brake or clutch device/mechanism 306 operatively coupled to each other, and each situated or arranged along and operable about an axis of rotation 310. As further detailed below, the input member 308*a* and the output member 308*b* can be coupled to respective support structures 204*e* and 204*f* of the exoskeleton 200, which support structures are rotatable relative to each other about the axis of rotation 310 of the joint, which can correspond to a degree of freedom of a human elbow joint. Note that input and output members 308*a* and 308*b* are shown generically as members coupled to their respective components, but they can take many different forms and configurations of suitable input and output members or components that are coupleable to support structures, for instance, or can even comprise the pair of support structures rotatably coupled together by the joint mechanism 206*b*.

The primary actuator 302 can comprise a motor 312 (FIG. 10) and, optionally, a transmission, such as a first planetary transmission 314 and, further optionally, a second transmission, such as second planetary transmission 316. The motor 312 is operable to apply a primary torque to the output member 308*b* for rotation about the axis of rotation 310, and the quasi-passive elastic actuator 304 (e.g., one having an elastic component in the form of a torsional coil spring) is selectively operable to store energy during a rotation of the joint via the joint mechanism 206*b*, and to release energy in the form of augmented torque to be applied to the output member 308*b* along with the primary torque applied by the motor 312 (the two torques being combined to generate an output via the output member 308*b*). The brake or clutch device 306 is operable to selectively control the quasi-passive elastic actuator 304 and to generate the braking force or application of the augmented torque. Indeed, a braking force can be generated to restrict rotation of the joint in some operational scenarios, such as when the controller 208 operates the joint mechanism 206*b* in a safety mode discussed below, or an augmented torque can be generated and applied in combination with a primary torque to assist in rotation of the output member and the joint, as discussed below.

The joint mechanism 206*b* can comprise a first support frame 315*a*, a second support frame 315*b*, and a third support frame 315*c* fastened together to retain and support the various components discussed herein, such as the motor 312, the planetary transmissions 314 and 316, the brake or clutch device 306, etc. As further detailed below, the elastic element or quasi-passive elastic actuator 304 is operable to selectively store energy or generate a braking force (when in an elastic or semi-elastic configuration or mode or state) upon a rotation of the input member 308*a* (e.g., where the rotation is either actively carried out using the primary actuator, or passively carried out, such as rotation of a joint under the influence of gravity of some other externally applied force that induces rotation) when the brake or clutch device 306 is in the engaged or semi-engaged state, and is operable to selectively release energy (also when in the elastic or semi-elastic configuration or mode or state) upon a rotation (in the same or a different direction as the rotation for storing the energy) of the input member 308*a*, when the brake or clutch device 306 is in the engaged or semi-engaged state, to apply the augmented torque to the output member 308*b* in parallel with a primary torque applied by the primary actuator 302, in this case the motor 312.

The quasi-passive elastic actuator 304 is further operable in the inelastic state to neither store nor release energy during rotation of the joint (inelastic configuration) when the clutch mechanism 306 is selectively caused to be in the disengaged state. In this inelastic state, the input member 308*a* is in "free swing" relative to the output member 308*b*, meaning that negligible resistance is applied within the joint module 300 via the quasi-passive elastic actuator 304 (so that the quasi-passive elastic actuator 304 does not have a stiffness value that would restrict rotation of the input member 308*a* relative to the output member 308*b*). The brake or clutch device 306 can also move from an engaged or semi-engaged state to a disengaged state to dissipate any stored energy (i.e., dissipate any braking force generated, such as when the braking force is no longer needed). Thus, the quasi-passive elastic actuator 304 is selectively switchable between the elastic state, the semi-elastic state, and the inelastic state via operation of the brake or clutch device 306.

In examples, "semi-engaged" can mean that the brake or clutch device is engaged, but not fully engaged nor disengaged, such that some slippage occurs within the brake or clutch. For example, in the case of the brake or clutch device having a plurality of plates, such as input and output plates, the semi-engaged state would mean that the plates are under a compression force sufficient to compress the plates together some degree, but that some relative movement (i.e., slippage) occurs between the plates (i.e., they are not completely locked up such that they rotate together and movement between them is not completely restricted) and a friction force is generated between them (e.g., a usable braking force). The term "engaged state" as used herein can include the semi-engaged state as these are also meant to describe at least a partially engaged state of the brake or clutch device, as well as to describe the brake or clutch device where the amount of slippage and thus the amount of the braking force (or augmented torque) is controllable and variable between the disengaged state where negligible braking force is generated and fully engaged where the clutch models a rigid connection member.

In examples where the quasi-passive actuator is caused to enter a "semi-elastic state" or mode of operation, the quasi-passive elastic actuator can be actuated to partially compress the elastic or spring component of the quasi-passive elastic actuator to store, and be enabled to release, an amount of energy or be enabled to generate a magnitude of a braking force that is less than what would otherwise be achieved if the quasi-passive elastic actuator were in a fully elastic state. Stated another way, "semi-elastic" describes that state in which there is a less than 1:1 transfer of energy or forces, due to rotation of the joint, to the quasi-passive elastic actuator coupled between the input and output members (e.g., because the brake or clutch device is in the semi-engaged state). "Semi-elastic," as used herein, is not intended to refer to the inherent elastic property (i.e., the elasticity) of the elastic component of the quasi-passive elastic actuator, but merely to a degree of compression of the elastic component.

In one example, the motor 312 can comprise a high-performance Permanent Magnet Brushless DC motor (PM-BLDC). The motor 312 can comprise a stator 320 and rotor 322 (FIG. 10) rotatable relative to each other (in a typical fashion for commercially available frameless brushless motors). Thus, the motor 312 of the primary actuator 302 comprises a cylindrical void 324 about the central area of the rotor 322. Advantageously, the first planetary transmission 314 can be positioned (at least partially) within the cylindrical void 324 of the motor 312, which provides a low-profile, compact geared motor configuration because the first planetary transmission 314 and the motor 312 are packaged together, as shown and described. A transfer wheel 313 can be coupled to the rotor 322 via fasteners 319, so that rotation of the rotor 322 causes rotation of the transfer wheel 313 about the axis of rotation 310. A sun gear 332 can be disposed centrally between four planet gears 330 and along the axis of rotation 310, with the sun gear 332 comprising teeth operable to engage the teeth of each of the four planet gears 330 that rotate around the sun gear 332 and about an outer housing 326. The outer housing 326 can be fastened to the second support frame 315*b* to hold it stationary. At the output of the first planetary transmission 314, the planet gears 330 are coupled to a carrier plate 334, which is coupled to a sun gear 346 of the second planetary transmission 316. Thus, the output of the second planetary transmission 316 is coupled to the output member 308*b*.

In response to the motor 312 receiving a control or command signal from the controller 208, the rotor 322 drives/rotates the transfer wheel 313, which rotates/drives the sun gear 332, which drives/rotates the carrier plate 334 (via planet gears 330). The carrier plate 334 then drives/rotates the sun gear 346 of the second planetary transmission 316, which ultimately drives/rotates the output member 308*b* via the output of the second planetary transmission

316. Accordingly, the present example provides a 16:1 final drive transmission from the motor 312 to the output member 308*b*.

As introduced above, the quasi-passive elastic actuator 304 is operable to apply an augmented torque to rotate the output member 308*b* along with the primary torque applied by the primary actuator 302, or to generate a braking force within the joint mechanism 206*b*. Thus, the quasi-passive elastic actuator 304 is switchable between an elastic configuration, a semi-elastic configuration, and an inelastic configuration via operation of the brake or clutch device 306 for selectively controlling application of the augmented torque applied by the quasi-passive elastic actuator 304.

In one example, the quasi-passive elastic actuator 304 can comprise an elastic element in the form of a torsional coil spring 305. One end of the torsional coil spring 305 can be coupled to a transfer shaft 307 and can be wound clockwise therefrom, and the other end can be coupled to the input member 308*a* (or to an intermediate component coupled between the torsional coil spring 305 and a suitable input member). The input member 308*a* can comprise an annular ring surrounding the torsional coil spring 305, or it can take other suitable forms as being coupled between the torsional coil spring 305 and a robotic support member. An output end of the transfer shaft 307 can be coupled to the transfer wheel 313, such that rotation of the transfer shaft 307 (e.g., an applied augmented torque) causes rotation of the transfer wheel 313, as detailed below. Note that the torsional coil spring 305 is only shown in FIG. 9, but it will be appreciated that it can be disposed between the transfer wheel 313 and the brake or clutch device 306 shown in the other FIGS. 8 and 10.

The brake or clutch device 306 can comprise an electromagnetic clutch configured to operate in series with the quasi-passive elastic actuator 304. The brake or clutch device 306 can comprise the same or similar features discussed in U.S. patent application Ser. No. 15/810,102, incorporated herein, which will not be discussed in great detail in the present disclosure. However, the brake or clutch device 306 can comprise a plurality of input plates 335*a* (e.g., four total) retained by the plate retention component 331 to restrict movement of the input plates 335*a* relative to a clutch housing 321. A plurality of output plates 335*b* (e.g., four total, hidden from view) can each be slidably or frictionally interfaced (i.e., sandwiched between) with adjacent input plates 335*a* in an alternating manner. The output plates 335*b* can each have a curvilinear perimeter that is slidably supported within curved inner surfaces of the plate retention component 331. Thus, rotation of the output plates 335*b* causes concurrent rotation of the clutch output shaft 343. The clutch output shaft 343 is coupled to the transfer shaft 307 that is coupled to the quasi-passive elastic actuator 304, such that rotation of the clutch output shaft 343 causes rotation of the transfer shaft 307 (which is coupled to the transfer wheel 313 discussed above). The output plates 335*b* can be comprised of a non-ferromagnetic material while the input plates 335*b* can be comprised of a ferromagnetic material. Upon receiving a clutch control signal (e.g., from the controller 208), an electromagnetic actuator 329 of the brake or clutch device 306 is activated to apply an electromagnetic field in a direction that tends to axially urge the input plates 335*a* along the axis of rotation 310, which thereby compresses the output plates 335*b* between the respective input plates 335*a*, such that the plates 335*a* and 335*b* are restricted from movement relative to the plate retention component 331 (which is attached to the clutch housing 321, and which is attached to the first support frame 315*a*). This is the engaged state of the brake or clutch device 306. Such restricted movement of the plates 335*a* and 335*b* thereby restricts movement of the clutch output shaft 343, which engages or otherwise activates the quasi-passive elastic actuator 304. Therefore, upon rotation of the input member 308*a* (either via the primary actuator or via application of an external force), and while the brake or clutch device 306 is in this engaged state, the quasi-passive elastic actuator 304 will therefore store energy or release energy (being in the elastic configuration), as described above, and depending upon the rotation of the input member 308*a* (e.g., clockwise rotation of FIG. 9 stores energy, while counterclockwise rotation releases energy, but opposing directions are not to be limiting as the storage and release of energy can occur in the same rotational direction).

The electromagnetic actuator 329 can be selectively operated and controlled by the controller 208 to apply a variable magnetic field and a variable compression force, such that the brake or clutch device 306 operates between a disengaged state, a semi-engaged state, and a fully engaged state to generate a variable braking force or a variable augmented torque. Indeed, in another aspect, with the brake or clutch device 306 operating in a semi-engaged state, movement between the input plates 335*a* and the output plates 335*b* can be partially restricted by the actuator 329 applying a smaller compression force to the input and output plates 335*a*, 335*b*, such that some movement between the input plates 335*a* and the output plates 335*b* is facilitated or caused to occur. In the engaged or the semi-engaged state, the brake or clutch device 306 and the quasi-passive elastic actuator 304 can function as a brake, or in other words, can provide a braking force operable to dissipate energy within the joint mechanism, or these can function to apply an augmented torque to the output member. The degree or magnitude of the compression force applied by the actuator 329 to the input and output plates 335*a*, 335*b* can be dynamically controlled in real-time by controlling or varying the amount of force generated and applied by the actuator 329.

Conversely, upon receiving a clutch control signal from the controller 208, the electromagnetic actuator 329 can be caused to place the brake or clutch device 306 in the disengaged state. That is, a clutch control signal is received by the electromagnetic actuator 329, such that the applied electric field is removed, thereby releasing compression pressure applied by the input plates 335*b*. This allows the output plates 335*b* to freely rotate relative to the input plates 335*a*. This permits relatively "free swing" rotation of the input member 308*a* relative to the output member 308*b*, therefore placing the quasi-passive elastic actuator 304 in its inelastic state. Thus, the quasi-passive elastic actuator 304 exerts negligible resistance in this "free swing" mode, when the brake or clutch device 306 is disengaged, so that the input and output members 308*a* and 308*b* can freely rotate relative to each other with minimal resistance. Furthermore, once stored, the energy can be dissipated at any time without being used either as a braking force or to apply an augmented torque, by disengaging the brake or clutch device 144.

When the brake or clutch device 306 is in the engaged or semi-engaged state, and the quasi-passive elastic actuator 304 is in the elastic or semi-elastic state, the augmented torque can be applied by the torsional coil spring 305. This augmented torque can be translated via the transfer shaft 307 to the sun gear 332 of the first planetary transmission 314, and so on (as described above), to rotate the output member 308*b*. For example, assume the torsional coil spring is wound in the clockwise direction from the transfer shaft 307

(as shown), so that, upon a first clockwise rotation of the input member 308*a* about the axis of rotation 310, the torsional coil spring 305 stores energy. Such rotational movement can be the result of an elbow movement of an exoskeleton during a certain task (e.g., downward movement of "push-ups" of an operator wearing an exoskeleton). Upon further rotation, or in the event of the disengagement of the brake or clutch device, such as in the counter-clockwise direction or depending upon the engaged state of the brake or clutch device, the quasi-passive elastic actuator 304 can release its stored energy, thereby transferring an augmented torque to rotate the output member 308*b* (as detailed above) or to apply a braking force. Concurrently, and upon such rotation, the motor 312 of the primary actuator 302 can be operated to apply a primary toque (along with the augmented torque) to rotate the output member 308*b* about axis of rotation 310 to actuate the joint mechanism 206*b*. Because the primary torque applied by the motor 312 is supplemented with the augmented torque applied by releasing stored/recovered energy via the quasi-passive elastic actuator 304, the electric motor 312 can be selected from a group of smaller (e.g., less power dissipation) motors than would otherwise be needed, which contributes to the compact configuration of the joint mechanism 206*b*, as also discussed above.

In one example discussed above, brake or clutch device 306 can be controlled as a binary device (i.e., the brake or clutch device 306 is either on/engaged or off/disengaged) when applying a compression force to compress the plates together, and when removing the compression force to release compression between the plates. Alternatively, the brake or clutch device 306 can be configured and controlled as an analog device, meaning a variable electromagnetic force can be applied by the electromagnetic actuator 329 to compress the plates together to a varying degree to generate a braking force and to facilitate gradually storing energy or dissipating/releasing stored energy in a more controlled manner for damping or braking purposes. In one example operational scenario, the brake or clutch device 306 can be fully engaged or semi-engaged such that the quasi-passive elastic actuator 304 at least partially stores energy. This stored energy can function to generate a braking force that can restrict rotation of the output member (e.g., such as in the case where the primary actuator is inactive and not producing a primary torque, yet rotation of the joint is still desired or needed (e.g., rotation of the joint under the influence of gravity or in response to some externally applied force to the exoskeleton)), or it can be released as an augmented torque to assist the primary actuator. Furthermore, in the event of the release of the energy as an augmented torque, when the quasi-passive elastic actuator 304 is releasing energy in the elastic or semi-elastic states (e.g., during a stance extension), the actuator 329 can be operated to cause slight compression of the plates together to generate a gradual "braking force" about the plates so that the augmented torque can be discharged or applied in a controlled, gradual manner.

As further explanation, and to further illustrate, the multi-plate configuration of the brake or clutch device 306 can act as a brake. This is achieved by controlling the compression force applied to the input and output plates 335*a* and 335*b*, thus providing a beneficial energy saving mode of operation, and/or providing a safety mode of operation. That is, in the event of a detection of a malfunction or defect of the exoskeleton, the controller 208 can operate the exoskeleton in a safety mode, which can include engaging or partially engaging the brake or clutch device 306, as further discussed below.

Similarly, as discussed above regarding the plurality of sensors S1-S4 of FIGS. 6A-7B, the plurality of sensors S5-S8 of the suite of sensors S1-Sn can be identified as a sensor group 210*b* associated with the joint mechanism 206*b*. As introduced above, the controller 208 can be configured (i.e., programmed) to determine a discrepancy between sensor output data of two or more sensors S5-S8 of the sensor group 210*b*, and configured to recruit at least one sensor S5-S8 of the sensor group 210*b* as a substitute sensor for discrepant sensor output data. For instance, a target sensor S5 can comprise the joint position sensor 361 (e.g., Hall effect sensor) configured to produce and transmit data via sensor output signals to the controller 208 for processing to facilitate determination of a rotational position of the joint defined by the joint mechanism 206*b*. Similarly as discussed above regarding joint mechanism 206*a*, the auxiliary sensor S6 (FIG. 10) can comprise a motor rotor position sensor positioned proximate the rotor 322 of the motor 312, which can be used as a substitute if the target sensor S5 fails, as further discussed herein. Likewise, the auxiliary sensors S7 and S8 can each comprise an IMU, which can be used as substitutes if the target sensor S5 fails, as further discussed herein.

It should be appreciated that the sensor group 210*b* associated with the elbow joint mechanism 206*b* can comprise any number of other auxiliary sensors, such as described above regarding other possible auxiliary sensors of sensor group 210*a* associated with the knee joint mechanism 206*a*.

Figure 11B:
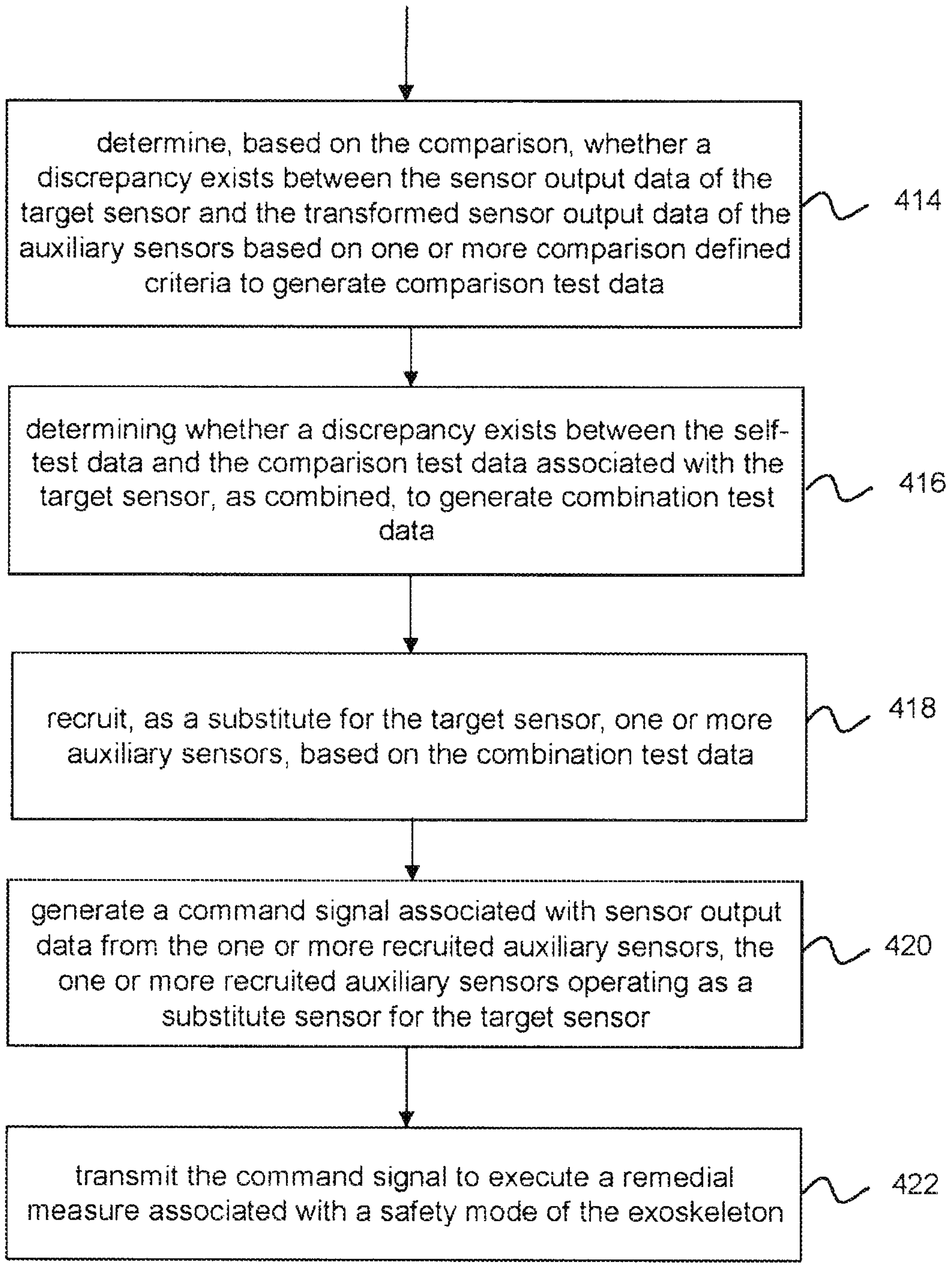

FIGS. 11A and 11B provide a flow diagram of a method 400 for safe operation of an exoskeleton, which can be executed by a controller (e.g., 108, 208) of a sensor suite discrepancy detection system (e.g., 102, 202), in accordance with an example of the present disclosure. As in block 402, a controller can be configured to facilitate operation of an exoskeleton (e.g., 100, 200) having a suite of sensors, wherein the sensor suite comprises one or more pre-determined sensor groups, wherein the sensors in a group are known to be able to complement one another (i.e., one or more sensors in the group are able, as pre-determined, to function as substitutes for one or more other sensors within the group, or more specifically, to provide sensor output data that can substitute for the sensor output data of the target sensor). For example, FIGS. 11A and 11B illustrate a sensor suite comprising a plurality of sensors. At least some of the sensors (e.g., S1-S4) within the sensor suite S1-SN can be grouped together in a sensor group, or in other words, identified as a group of sensors (e.g., 110*a*, 210*a*) that complement one another. The sensor group can comprise a target sensor (e.g., target sensor S1) associated with a joint mechanism (e.g., 106*a*, 206*a*) of the exoskeleton, and a plurality of auxiliary sensors (e.g., S2-S4).

As in block 404, the method can comprise receiving sensor output data generated by each sensor of the plurality of sensors (e.g., S1-S4). The sensor output data received can be in the form of data or information transmitted from each sensor as output sensor signals that are received and processed by a processor (e.g., 132) of the controller or another computer having processing capabilities, in accordance with known signal processing techniques and methods. The processed sensor output data can then be ready for testing processing purposes described herein.

As in block 406, the method can comprise determining whether each of the plurality of sensors satisfies at least one self-test defined criterion, which generates self-test data. Such determination can be an aspect of the self-test process discussed above, as executed by the sensor self-test module 120. See also FIG. 13 for an example of a self-test process executed by the sensor self-test module 120 for performing a self-test on each of the sensors of a sensor group.

As in block 408, the method can comprise transforming the sensor output data for each auxiliary sensor into transformed sensor output data that corresponds to the sensor output data of the target sensor. As further detailed below, in order to compare sensor output data of disparate types of sensors (e.g., target sensor and auxiliary sensor(s)), the sensor output data associated with the auxiliary sensors must be transformed, meaning that a calculation or computation can be performed by the controller to "transform" (i.e., change) sensor output data associated with the auxiliary sensors into "transformed sensor output data", as will be appreciated from the following discussions. The sensor compare module 122 may be configured to perform the operation of block 408, as further exemplified below regarding the discussion of FIG. 14.

As in block 410, the method can comprise generating a sensor output data map comprising, at least in part, the sensor output data from the target sensor and the transformed sensor output data derived from the auxiliary sensors. As further exemplified below, the term "sensor output data map" refers to a number of different matrices having sensor output data in which each matrix "maps" (e.g., charts, plots, etc.) sensor output data against each other for comparison purposes. The sensor compare module 122 may be configured to perform the operation of block 410, as further exemplified below regarding the discussion of FIG. 14.

As in block 412, the method can comprise comparing, using the sensor output data map, the sensor output data of the target sensor with the transformed sensor output data of each of the auxiliary sensors. In this manner, each auxiliary sensor can operate as a sensor state observer for the target sensor. As well known, in control theory a "state observer" is a device or system that provides an estimate of the internal state of a given real system (e.g., the target sensor). For instance, as detailed below, the sensor output data associated with one or more of the auxiliary sensors can be used to assist in the estimation of a rotational position of a joint, for instance, where the auxiliary sensors are not directly used to determine the rotational position of the joint as their primary sensing function. Therefore, as taught herein, one or more of the auxiliary sensors can act as, or operate as, a part of a sensor state observer system for the target sensor using transformed sensor output data of the auxiliary sensor(s). The term "sensor state observer" as used herein is the system, including one or more auxiliary sensors, the controller and software that provides an estimate of the output data of a target sensor, from measurements or output data of one or more auxiliary sensors. The sensor compare module 122 may be configured to perform the operation of block 412, as further exemplified below regarding the discussion of FIG. 14.

As in block 414, the method can comprise determining, based on the comparison as in block 412, whether a discrepancy exists between the sensor output data of the target sensor and the transformed sensor output data of the auxiliary sensors based on at least one comparison defined criterion, which can generate comparison test data. The term "discrepancy" as used herein refers to a lack of compatibility or similarity between two or more sets of output data associated with respective two or more sensors. Thus, by mapping and comparing sensor output data associated with the target sensor and the auxiliary sensors, the controller can determine whether a discrepancy (or more than one discrepancy) exists among the plurality of sensors, which may be indicative of a defect or malfunction of the exoskeleton. The sensor compare module 122 may be configured to perform the operation of block 414, as further exemplified below regarding the discussion of FIG. 14.

As in block 416, the method can comprise determining whether a discrepancy exists between the self-test data and the comparison test data associated with the target sensor, as combined, which can generate combination test data. The combine self-test and compare test module 124 may be configured to perform the operation of block 416, as further exemplified below regarding the discussion of FIG. 15.

As in block 418, the method can comprise recruiting, as a substitute for the target sensor, one or more auxiliary sensors, based on the combination test data. The preferred sensor selector module 126 may be configured to perform the operation of block 418, as further exemplified below regarding the discussion of FIG. 16.

As in block 420, the method can comprise generating a command signal associated with sensor output data from the one or more recruited auxiliary sensors. That is, the one or more recruited auxiliary sensors can operate as a substitute for the target sensor, as further exemplified below.

As in block 422, the method can comprise transmitting the command signal to execute a remedial measure associated with a safety mode of the exoskeleton. Possible remedial measures are further discussed herein.

Figure 12:
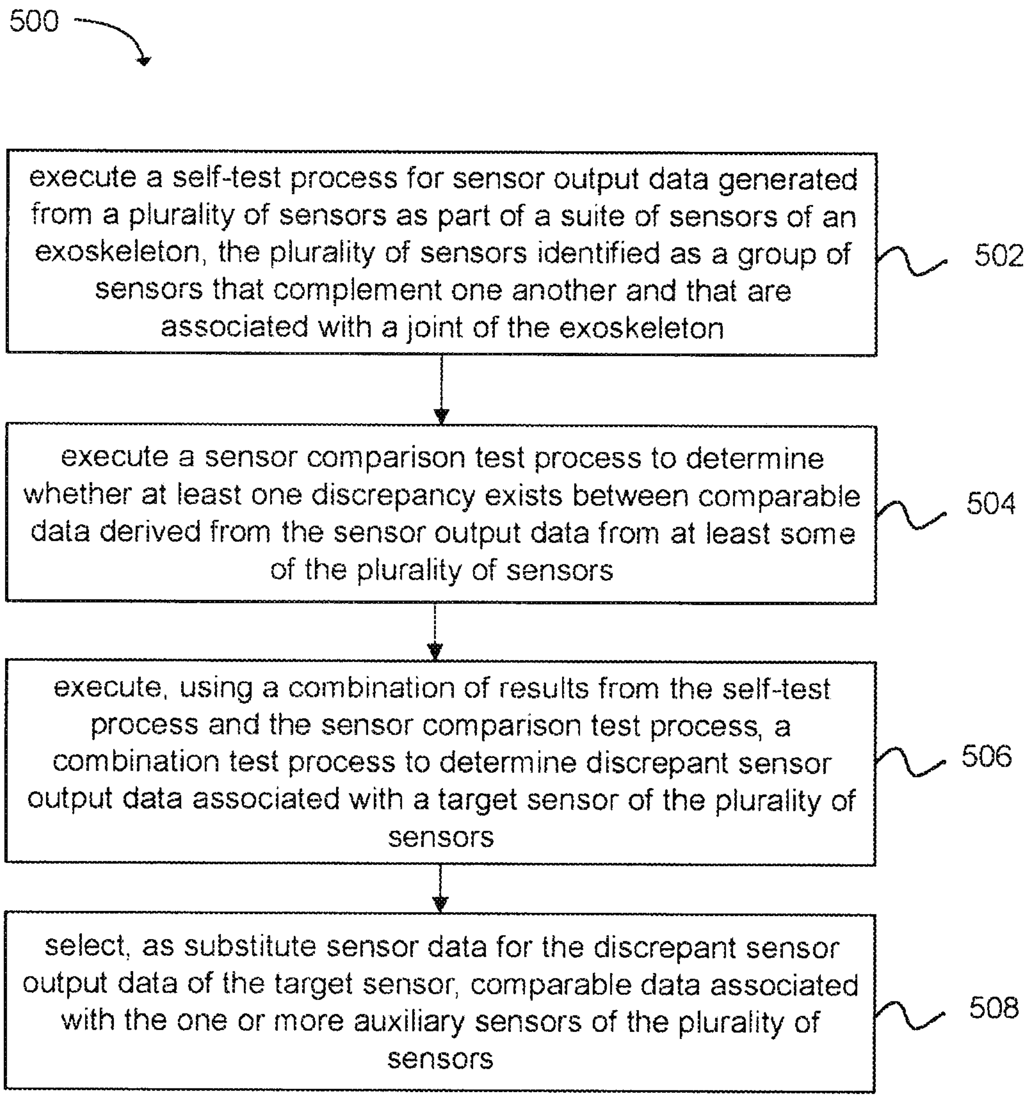
FIG. 12 is a flow diagram that illustrates an example method for safe operation of an exoskeleton, in accordance with an example of the present disclosure.

FIG. 12 illustrates a flow diagram of a method 500 for safe operation of an exoskeleton, which can be executed by a controller of a sensor suite discrepancy detection system, in accordance with an example of the present disclosure. As in block 502, a controller (e.g., 108, 208) can be configured to execute a self-test process (e.g., FIG. 13) for sensor output data generated from a plurality of sensors as part of a suite of sensors of an exoskeleton. The plurality of sensors can be identified as a group of sensors that complement one another and that are associated with a joint of the exoskeleton, as exemplified above.

As in block 504, the controller can be configured to execute a sensor comparison test process (e.g., FIG. 14) to determine whether at least one discrepancy exists between comparable data derived from the sensor output data from at least some of the plurality of sensors. As in block 506, the controller can be configured to execute, using a combination of results from the self-test process and the sensor comparison test process, a combination test process (e.g., FIG. 15) to determine discrepant sensor output data associated with a target sensor of the plurality of sensors. As in block 508, the controller can be configured to select, as substitute sensor data for the discrepant sensor output data of the target sensor, comparable data associated with the one or more auxiliary sensors of the plurality of sensors ((e.g., FIG. 16).

Figure 13:
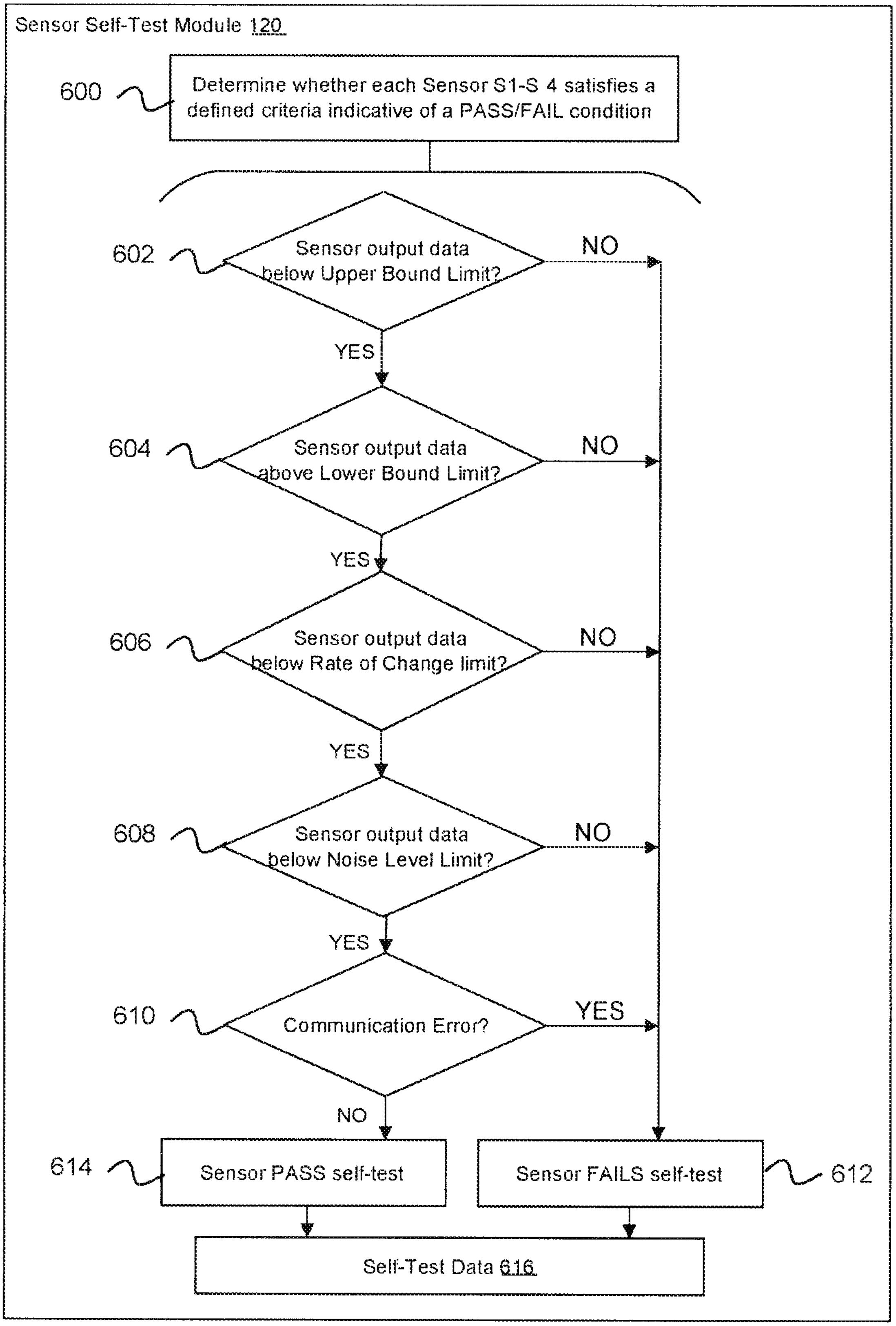
FIG. 13 is a flow diagram that illustrates an example method for performing a self-test process, in accordance with an example of the present disclosure.

FIG. 13 illustrates a self-test process executed by the sensor self-test module 120, in accordance with an example of the present disclosure. As noted above regarding example method 500 (as in block 502 of FIG. 12), the sensor self-test module 120 can be configured to perform or execute a self-test process for each of the sensors of a suite of sensors (e.g., S1-Sn of exoskeleton 200), and therefore, for each sensor (e.g., S1-S4) of each sensor group (e.g., 110*a*). See also example method 400 discussed above, and particularly block 406 of FIG. 11. Note that the indication of "sensors S1-Sn" are used interchangeably throughout the specification for purposes of simplification, so it should be appreciated that any sensor of the sensors S1-Sn can be any type of sensor discussed herein, and therefore notation to "a target sensor S1" or "an auxiliary sensor S2" is not meant to be limiting in any way to any particular sensor type or to any particular sensor suite discrepancy detection system.

Accordingly, as in block 600, using sensors S1-S4 as example sensors within a sensor group, the sensor self-test module 120 may be configured to determine whether each sensor S1-S4 satisfies at least one self-test defined criterion indicative of a pass/fail condition (i.e., whether the sensor "passes or fails"). The term "self-test defined criterion" is referred to herein as a specific criterion on which a determination is at least partly (could have one or more self-test defined criterion (i.e., self-test defined criteria)) based regarding sensor output data (and/or sensor operation and/or other data associated with a sensor) during a self-test process or function executed by the self-test module. In step 602, as one aspect or example of the "at least one self-test defined criterion", a determination is made whether the sensor output data (for each sensor S1-S4) is below an upper bound limit. For example, an "upper bound limit" for an elbow joint rotational position may be set at 170 degrees (or equivalent radians), because it may be unsafe or undesirable (or impossible) for an elbow joint to be positioned beyond or above 170 degrees from normal. Therefore, if the sensor output data associated with the target sensor S1, for instance, indicates that the elbow joint rotational position is at 190 degrees, the sensor self-test module 120 will determine that the sensor output data is not below the upper bound limit (i.e., above the upper bound limit), and therefore the sensor output data of the sensor S1 is indicative of a fail condition (i.e., a "NO") of the sensor S1. The fail condition in this example is the fact that it may be known to be impossible for the elbow joint to be at such a high rotational position, so something must be broken or malfunctioning associated with the target sensor S1 and/or the joint mechanism. Thus, in such example, the sensor S1 has failed the self-test as in block 612, wherein data indicating the fail is recorded as part of self-test data 516 (along with any other sensors S2-S4 that have "failed"). The term "self-test data" as used herein is referred to as the data or information that is indicative of or the result of the self-test process executed by the self-test module.

If in block 602 the sensor S1 passes the self-test, such that the sensor output data is below the pre-determined upper bound limit, then the sensor output data will be indicative of a pass condition (i.e., a "YES"). In this case, a determination is then made, in accordance with block 604, whether the sensor output data is above a pre-determined lower bound limit. For example, a lower bound limit for an elbow joint rotational position may be set at 5 degrees, because it may be unsafe or undesirable (or impossible) for an elbow joint to be positioned less than 5 degrees from normal. Therefore, if the sensor output data associated with the target sensor S1, for instance, provides that the elbow joint rotational position is at 2 degrees, the sensor self-test module 120 will determine that the sensor output data is not above the upper bound limit, and therefore the sensor output data from the sensor S1 is indicative of a fail condition (i.e., a "NO"). Thus, the sensor S1 has failed the self-test as in block 612, which failure is recorded and represented in the self-test data 616. As noted above, in some cases, the determinations of failure of the at least one self-test defined criterion may be indicative of a defect or malfunction of the exoskeleton and not necessarily the sensor(s). As such, self-test data can be representative of various issues with the exoskeleton, such as a faulty sensor or sensor wiring, bearing, transmission, elastic element, actuator, or other component or system.

It should be appreciated that each sensor S2-S4 of the sensor group may have different unit values for appropriation of the self-test process. For instance, a torque sensor may have an upper bound limit of 20 N-m (and so on for the other sensors of the suite of sensors that are subjected to the self-test process). Alternatively, the unit values for the other sensors S2-S4 may first be transformed, so that their unit values correspond to the unit value of the target sensor S1, thus providing comparable sensor output data. In this manner, each sensor output data for each sensor S1-S4 can be processed using the same unit values for purposes of comparison, and satisfying the upper or lower bound limit criterion, for instance. Such transformation of the sensor output data is further detailed below regarding FIG. 14. Furthermore, the sensor output data may not be fully processed to have a unit value, and therefore the upper and lower bound limits may merely correspond to numerical values, for instance.

If in block 604 the self-test returns a pass (represented by a "YES"), then in accordance with block 606, a determination can further be made as to whether or not the sensor output data is "below a rate of change limit" (for sample to sample). Calculating a rate of change is well known and will not be discussed in detail; however, the sensor self-test module 120 may be configured to perform such calculation based on the most recently received or historical senor output data (first sample) as compared to present sensor output data (second sample and/or multiple samples or a filtered (digitally or using analog filtering means) set of samples). Moreover, a rate of acceptable change (e.g., moving from one joint position to another joint position relative to the first joint position within a certain period of time) can be pre-determined and associated with the self-test. For instance, an acceptable pre-determined threshold or limit for a rate of change for an elbow joint rotational position may be set at +/−100% which is not to be achieved in under one second for the target sensor S1. Thus, if the most-previous rotational position of the elbow joint was 35 degrees, and the present sensor output data indicates a present rotational position of 105 degrees, and this was achieved in under one second, then the rate of change is +200%, which is above the +/−100% limit, and the rate at which this was achieved was under the acceptable time limit. Therefore, the sensor output data of the target sensor S1 is indicative of a fail condition (i.e., a "NO") because it can be established or pre-determined that it is unsafe or undesirable to move from 35 degrees to 105 degrees in less than one second, for instance. Thus, the sensor S1 has failed the self-test as in block 612, which is recorded and represented as self-test data 616. It will be apparent to those skilled in the art that any pre-determined rate of change limits can be pre-determined and established for use in the self-test. Note that the rate of change can be according to an acceptable limit, or according to latched output (in which case the sensor signal would exhibit a rate of change equal to or very close to zero).

If the outcome from the self-test in block 606 is a pass (i.e., a "YES"), then a determination can then be made, in accordance with block 608, as to whether or not the sensor output data is below a noise level limit. Noise or crosstalk is known as an unwanted disturbance signal that is combined with the desired signal, which disturbance signal can be problematic by interfering with the receipt of accurate sensor output data, or interfering with appropriate processing of the sensor output data. Noise or crosstalk can come from many different sources. In some example, noise or crosstalk can originate from components of the exoskeleton and/or surrounding systems in the form of electromagnetic interference, radio frequency interference, vibration, heat, or other interference. Of course, some amount of noise typically exists, but high levels of noise can be problematic as being indicative of something operating incorrectly. More particularly, a noise level limit (or noise ratio limit) may be set at an "n value" for each sensor S1-S4 under test, for instance. Accordingly, if the noise level associated with the sensor output data of the target sensor S1 is greater than the pre-determined n value, the sensor output data from the target sensor S1 is indicative of a fail condition (i.e., a "NO"). Thus, the sensor S1 has failed the self-test as in block 612, which is recorded and represented as self-test data 616. Note that noise levels or ratios can vary depending on the sensor and system, and can be measured and characterized by various suitable means. Thus, the noise level or ratio limit used by the sensor self-test module 120 is dependent on the system and on which noise characterization metric is used (e.g., noise level estimated as root mean square (RMS) of the sensor signal, mean squared error (MSE) of the sensor signal, or noise spectral density, and so on).

If the results from the self-test in block 608 are indicative of a pass (a "YES"), then, in accordance with block 610, a determination can be made whether a communication error is present. For instance, a communication error or failure may be the fact that the controller did not receive any sensor output data from the target sensor S1 at a given time, or it can be a gap in a data signal communication stream, or a data formatting error (or other possible communication errors or failures between the sensor(s) and the controller). Detecting communication errors is well known in the art, so it will not be discussed in great detail herein. Accordingly, if in block 610 the sensor self-test module 120 detects the existence of one or more communication errors, the sensor output data from the target sensor S1 may be indicative of a fail condition (i.e., a "NO"). As a result, the sensor S1 has failed the self-test process as in block 612, which is recorded and represented as self-test data 616.

On the other hand, in the event that the target sensor S1, for instance, satisfies all of the self-test defined criteria, as in blocks 602-610, the sensor S1 can be identified as having "passed" the self-test process as in block 614, which is recorded and represented as self-test data 616. The same self-test can be carried out for all of the sensors in the sensor group, such as the auxiliary sensors S2-S4. Thus, sensors that have passed the self-test process may indicate that there are no faults or defects or malfunctions of the exoskeleton. However, additional safety protocols can be put into place that may still indicate one or more issues with the exoskeleton that would warrant putting the exoskeleton in a safe mode of operation. For example, one or more sensors that have passed the self-test process can be further subjected to a sensor comparison test, as further detailed below.

As a result of the sensor self-test module 120 performing the self-test process for each sensor of a suite of sensors, the self-test data 616 can include information regarding pass/fail conditions for dozens of sensors of the suite of sensors of the exoskeleton. Note that the test results embodied in the self-test data can be separated or categorized according to their respective sensor groups (e.g., 110*a*-*n*) associated with a respective joint mechanism (e.g., 106*a*-*n*), for instance.

It will be apparent to those skilled in the art that the self-test process may include only one, or some of, or all of, the at least one self-test defined criterion illustrated in FIG. 13, and it may include additional self-test determinations for determining whether a particular sensor output data is erroneous or faulty according to at least one defined criterion that are not necessarily discussed herein, but that are contemplated. Further note that the order shown in FIG. 13 is not meant to be limiting in any way, and can be reordered as appropriate, and other criterion can be added or removed as appropriate or desired.

Figure 14:
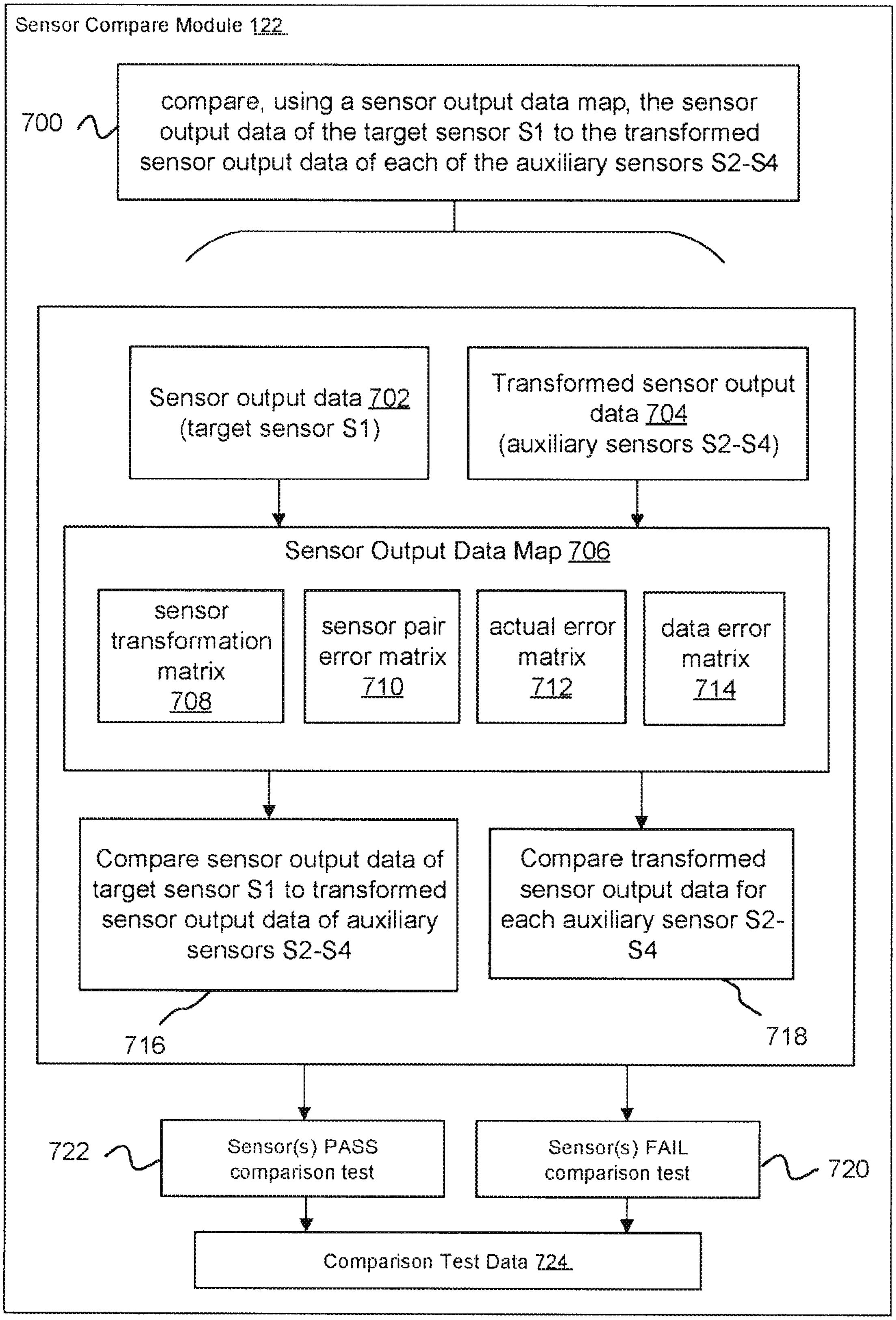
FIG. 14 is a flow diagram that illustrates an example method for performing a sensor compare process, in accordance with an example of the present disclosure.

FIG. 14 illustrates a sensor comparison process (i.e., a sensor comparison test) operated by the sensor compare module 122, in accordance with an example of the present disclosure. As noted above regarding example method 500 (block 504 of FIG. 12), the sensor compare module 122 can be configured to perform or execute a sensor comparison process for each of the sensors of a suite of sensors (e.g., S1-Sn), and therefore, for each sensor (e.g., S1-S4) of each sensor group (e.g., 110*a*). See also method 400 of FIGS. 11A and 11B, particularly blocks 408, 410, and 412, which provide operations that can be executed by the sensor compare module 122.

As in block 700, the sensor compare module 122 can be configured to compare, using a sensor output data map, sensor output data 702 of the target sensor (e.g., target sensor S1) to transformed sensor output data 704 of each of the auxiliary sensors within a sensor group (sensors S2-S4, for instance). This can include transforming the sensor output data for each auxiliary sensor S2-S4 into transformed sensor output data that corresponds to the sensor output data of the target sensor S1. More specifically, the sensor output data for each auxiliary sensor S2-S4 can be "transformed" or calculated into a unit value that is comparable to the unit value of the target sensor S1, thereby producing comparable data in the form of transformed sensor output data 604. The term "transform" as used herein is referred to as the act of changing the characterization of sensor output data of a sensor (e.g., changing from one unit value to a different unit value as associated with sensor output data). Accordingly, the term "transformed sensor output data" as used herein is the stored data or information that is indicative of or the result of the transformation or calculation processes executed by the sensor compare module as pertaining to the sensor output data received from the target sensor and one or more auxiliary sensors. For instance, if the sensor output data for the target sensor S1 (which can comprise a position sensor associated with the joint mechanism) has been processed into a readable format of position having as its unit value that of degrees (or equivalent radians), then the sensor output data for each auxiliary sensor S2-S4 should be calculated to an equivalent unit value (e.g., degrees or equivalent radians). It is noted that the sensors in a sensor group are selected to be within the group and to be identified as being complementary to one another based on the condition where the sensor output data of any one of the sensors within a sensor group is able to be transformed into sensor output data having a corresponding or comparable unit value with at least the target sensor, and possibly other auxiliary sensors within the sensor group.

In one example, assume auxiliary sensor S2 is a torque sensor and S3 is a rotor position sensor associated with a joint mechanism for producing output signals having information associated with output torque of a motor of the joint mechanism and for commutation of the phase windings of the motor, such as exemplified above regarding FIGS. 6-10. Using a mathematical calculation, the sensor output data of the auxiliary sensors pair S2 and S3 can be transformed into data that is comparable to the sensor output data of the target sensor S1, which is a position sensor. Thus, assume the torque output from the torque sensor S2 has been processed to a readable form of 10 N-m, which is not directly comparable to the "degree" (and/or radians) unit value of position derived from sensor output data from the target sensor S1 and also assume that the rotor position sensor S3 reading is 460 deg. measured at the input of a 10:1 transmission that couples the rotor to the joint output. Thus, the controller can perform a transformation calculation or computation on the sensor output data associated with the sensor S2 and the rotor position sensor S3 so that it can be transformed and then compared to the sensor output data of the target sensor S1 (for purposes of detecting a discrepancy, as detailed below). Based on known information of a previous rotational position of the joint, along with the output torque of 10 N-m at the output of a compliant joint with compliance of approximately 0.8 degrees/N-m, and rotor position sensor S3 of 460 degrees the sensor compare module 122 can perform a calculation to transform the original sensor output data (e.g., 10 N-m) of auxiliary sensor S2 and 460 degrees into transformed sensor output data (e.g., [(460 degrees/10)−(0.8 degrees/N-m)*10 N-m]=45.2 degrees) that is comparable with the sensor output data of the target sensor (e.g., 45 degrees).

In another example, assume auxiliary sensors S3 and S4 are each an IMU supported by respective support structures (e.g., 204*a* and 204*b* of FIG. 6) rotatably coupled together by a joint mechanism (e.g., 206*a*). Thus, the sensor output data generated by the auxiliary sensors S3 and S4 could be in the form of various unit values associated with attitude, acceleration, velocity, and/or position (i.e., orientation in pitch, roll, yaw). The sensor compare module 122 can transform such output data into transformed output data having a unit value representative of a position (e.g., 47 degrees), that is comparable to the position unit value of the target sensor S1 (e.g., 45 degrees). Note that two IMUs may be needed for this purpose, because if the controller knows the spatial orientation of each IMU relative to each other and to the position of the joint, the controller can calculate and estimate the rotational position of the joint situated spatially between the IMUs. This is merely an estimation of the rotational position of the joint defined by the joint mechanism, and therefore, the auxiliary sensors S3 and S4 can act as part of a sensor state observer for the target sensor S1, as also mentioned above. For example, IMU sensors S3 and S4 installed on two support structures rotatably coupled to form a joint can each be used to calculate unit quarternions, $q_{S3}$ and $q_{S4}$, respectively, that each contain information about rotation of sensors S3 and S4 in a global frame of reference. The information contained in the quarternions obtained from S3 and S4 can in turn be used to estimate joint position, $\alpha_J=(\alpha-\alpha_0)$, in degrees, radian and/or other units by using the formula $$\cos\left(\frac{\alpha}{2}\right) = \mathrm{Real}(q_{S3}^* \otimes q_{S4}),$$

where ⊗ is the quaternion multiplication, $q_{S3}^*$ is the conjugate of the unit magnitude quaternion generated from data from IMU S3, and where, $\alpha_o$ is a constant that depends on the convention used to define the zero angle of the joint. For example, $$\mathrm{Real}(q_{S3}^* \otimes q_{S4})$$

may be calculated to be equal to ½, corresponding to α=120 degrees, and $\alpha_o$ may be equal to 90 degrees, in which case the joint angle may be estimated to 30 degrees using information from sensors S3 and S4, that is comparable with the sensor output data of the target sensor, the joint position sensor (e.g., 29 degrees).

It is noted that although the example of transforming sensor output data into a position-based unit, this is not intended to be limiting in any way. Indeed, those skilled in the art will recognize that unit values other than position can be used, into which sensor output data can be transformed. This can depend upon the target sensor being used, and the various complementary sensors within a sensor group including the target sensor.

Once the sensor compare module 122 has generated the transformed sensor output data 704 for each auxiliary sensor S2-S4, for instance, the sensor compare module 122 can be configured to generate a sensor output data map 706 for purposes of comparing the sensors S1-S4 to each other to detect any discrepancies in the data. More specifically, the sensor output data map 706 can comprise at least one of a sensor transformation matrix 708, a sensor pair error matrix 710, an actual error matrix 712, a delta error matrix 714, or any combination of these for purposes of mapping and comparing sensor output data 702 of the target sensor S1 and the transformed sensor output data 704 of the auxiliary sensors S2-S4. Each matrix 708-714 includes one example methodology for comparing sensors and their output data (including any transformed output data) against one another, as exemplified below.

More specifically, regarding the sensor transformation matrix 708, for sensors S1-S4 of a sensor group (e.g., 110*a*, 210*a*), $$S_{j,i}^{TR}$$

of the below matrix 708 represents the estimated output sensor data (or output signal) for sensor j computed using output sensor data from sensor i (e.g., sensor output data for sensor S2 is mapped to sensor S1, represented as $$S_{1,2}^{TR})$$

and/or from sensor group i (i.e., sensors 3 and 4 output data combined to create and equivalent sensor S2 that is mapped to sensor S1, represented as $$S_{1,2}^{TR}).$$

That is, for all i=1 to Sn, and all j=1 to Sn (which is sensors S1-S4 in this example). That is, $$S_{j,i}^{TR} = S_i$$

for i=j for sensors sensor S1, S2 . . . Sn. Accordingly, the sensor transformation matrix 708 can be provided as follows:

$$S^{TR}=\begin{bmatrix} S^{TR}_{1,1} & S^{TR}_{1,2} & \cdots & S^{TR}_{1,N} \\ S^{TR}_{2,1} & S^{TR}_{2,2} & & S^{TR}_{2,N} \\ \vdots & \vdots & \ddots & \vdots \\ S^{TR}_{N,1} & S^{TR}_{N,2} & \cdots & S^{TR}_{N,N} \end{bmatrix}=\begin{bmatrix} S1 & S^{TR}_{1,2} & \cdots & S^{TR}_{1,N} \\ S^{TR}_{2,1} & S2 & & S^{TR}_{2,N} \\ \vdots & \vdots & \ddots & \vdots \\ S^{TR}_{N,1} & S^{TR}_{N,1} & \cdots & SN \end{bmatrix}$$

Regarding the sensor pair error matrix 710, for sensors S1-Sn (e.g., S1-S4 in the example of FIG. 14) of a sensor group (e.g., 110*a*, 210*a*), E specifies the estimated upper error limits between a given pair of sensors (e.g., the sensor output data of target sensor S1, and the transformed sensor output data of auxiliary sensor $$S^{TR}_{1,2}).$$

Note that this maximum error limit may depend on other parameters, such as temperature, vibration, torque level, end point force and moment, joint angle, noise level for each of the target sensor and auxiliary sensor, and others. There will be some error limit that is used to compare to the sensor output data of the target sensor S1 and the transformed sensor output data $$(S^{TR}_{1,2}, S^{TR}_{1,3}, S^{TR}_{1,4})$$

estimated using the auxiliary sensors S2-S4. Accordingly, the sensor pair error matrix 710, where $E_{i,j}$ are positive numbers, can be provided as follows:

$$E=\begin{bmatrix} 0 & E_{1,2} & \cdots & E_{1,N} \\ E_{2,1} & 0 & & E_{2,N} \\ \vdots & \vdots & \ddots & \vdots \\ E_{N,1} & E_{N,2} & \cdots & 0 \end{bmatrix}$$

For example, the error on joint position (the target sensor, S1, in this example) estimated using a joint position sensor observer that combines data from rotor position (S2) and joint torque sensor (S3) (forming a combined equivalent auxiliary sensor $S2_{eqv.}$ for S1) may be estimated to be +/−0.1 degrees (combining sensors noise level, repeatability and accuracy of all sensors S1, S2 and S3), in which case $E_{1,2}$=0.1 degrees.

Regarding the actual error matrix 712, for sensors S1-Sn (e.g., sensors S1-S4 in this example) of a sensor group (e.g., 110*a*, 210*a*), the actual error between given sensor pairs (e.g., sensor output data of the target sensor S1, and the transformed sensor output data of auxiliary sensor S2), is provided by:

$$|S_{TR}-S_{sensor}|=\left|S^{TR}-\begin{pmatrix} S1 & S1 & \cdots & S1 \\ S2 & S2 & \cdots & S2 \\ \vdots & & & \\ SN & \cdots & & SN \end{pmatrix}_{N\times N}\right|=\begin{pmatrix} \Delta_{1,1} & \Delta_{1,2} & \cdots & \Delta_{1,N} \\ \Delta_{2,1} & \Delta_{2,3} & \cdots & \Delta_{2,N} \\ \vdots & \ddots & & \\ \Delta_{N,1} & \cdots & & \Delta_{N,N} \end{pmatrix}$$

. . . where $$\Delta_{i,j=}|S^{TR}_{j,i}-Si|.$$

Note that: $\Delta_{i,j}$=0 for i=j, or equivalently $\Delta_{i,i}$=0 for all i=1 to N.

If the computed error exceeds the preset error limit, it is indicative of a failure of a match or pair of sensors. If the computed error does not exceed the error limit, then the matched or paired sensor would indicate proper functionality. This is determined as follows:

$$A=\begin{pmatrix} a_{1,1} & a_{1,2} & \cdots & a_{1,N} \\ a_{2,1} & a_{2,2} & \cdots & a_{2,N} \\ \vdots & \ddots & & \\ a_{N,1} & \cdots & & a_{N,N} \end{pmatrix}_{N\times N}$$

. . . where $$a_{i,j}=\begin{cases} 1 \text{ if } \Delta_{i,j}>E_{i,j} \text{ OR if } S_i \text{ fail self test then } a_{i,j}=1 \\ 0 \text{ otherwise} \end{cases}$$

For example if the measured absolute value of the difference between sensor S1 (a joint position sensor) reading and the value of S1 estimated using S2 (i.e.

$$S^{TR}_{1,2}$$

determined using rotor position and/or rotor position and joint torque) is determined to be 0.5 degrees while the upper limit for the error for S1 estimated using S2 is 0.1 degrees then $a_{1,2}$=1.

Once the sensor compare module 122 has populated the sensor output data map 706 (using any one or more of the above matrixes) including the relevant sensor output data and transformed sensor output data from the sensors S1-S4, for instance, the sensor compare module 122 may be configured to execute a comparison test process. For instance, as in block 716, the sensor compare module 122 may be configured to compare sensor output data of the target sensor S1 to the transformed sensor output data of the auxiliary sensor S2-S4. The sensor compare module 122 may be further configured to compare the transformed sensor output data 604 for each auxiliary sensor S2-S4, as in block 718. Note that the operations of blocks 716 and 718 may occur simultaneously according to the sensor output data map 706. That is, each of the sensors S1-S4 can be compared to each other using the sensor output data map 706 to detect any discrepancies that may exist between the mapped data associated with the sensors S1-S4 based on at least one comparison defined criterion to generate comparison test data 724. The term "comparison defined criterion" is referred to herein as the specific criterion on which a determination is at least partly (could have more than one comparison defined criterion (i.e., comparison defined criteria) based with respect to sensor output data during a comparison test process or function executed by the sensor compare module 122. In one example, a comparison defined criterion can comprise one of an upper bound limit value or a lower bound limit value as pertaining to the comparison between sensor output data of a target sensor and transformed sensor output data of one or more auxiliary sensors, and/or also as pertaining to the comparison of the transformed sensor output data of two or more auxiliary sensors (i.e., the sensor output data of the target sensor would not be compared in this scenario).

For instance, in an example hypothetical operating scenario, assume the sensor output data 702 of the target sensor S1 (joint position sensor) indicates a joint rotational position of 90 degrees from a known or initial starting position, but in reality the joint rotational position is actually closer to 46 degrees. Such a discrepancy in the measured or sensed position of the target sensor S1 and the actual position of the joint mechanism indicates that the target sensor S1 is defective for some reason, or that a component of the joint mechanism is defective, or both of these. Further assume that the transformed sensor data for the auxiliary sensor S2 (e.g., torque sensor or motor/rotor position sensor) indicates an estimated joint rotational position of 45 degrees, while the auxiliary sensors S3 and S4 (e.g., IMUs) indicate an estimated joint rotational position of 47 degrees. And further assume that the comparison defined criteria is set as a lower bound limit of 10 percent and an upper bound limit of 10 percent (i.e., ±10%). Thus, because the measured or sensed position and transformed output data information of sensor S2 and sensors S3 and S4 are "more agreeable" (e.g., within ±10% deviation from each other in terms of upper and lower bound limits) with one another and are discrepant from the measurements of the target sensor S1 (i.e., "outside of" the ±10% upper and lower bound limit criteria), it is likely that the sensor output data of sensor S1 is erroneous. Of course, the more auxiliary sensors that are "agreeable" (i.e., within the defined upper and lower bound limit criteria), such as 6 or more auxiliary sensors, the more likely it is that sensor S1 is defective (or indicative of a defect or malfunction of the exoskeleton). Moreover, the degree of acceptable deviation in measurements between the auxiliary sensors, and between the auxiliary sensors and the target sensors can vary as needed or desired.

Therefore, using the sensor output data map 706, the sensor compare module 122 can detect or identify this discrepancy between the "90 degree" reading of the target sensor S1 and the "45 and 47 degrees" of respective sensors S2 and S3/S4 based on at least one comparison defined criterion. Accordingly, in this example, the sensor compare module 122 can determine, based on this identified discrepancy, that the target sensor S1 has "failed" the sensor comparison process or test, as in block 720, and that sensors S2-S4 have each passed the sensor comparison process, as in block 722, thus meaning they may be acceptable substitute sensors for the joint mechanism in place of the target sensor S1. In other words, the transformed sensor output data from sensors S2-S4 may be suitably substituted and used by the controller of the exoskeleton to operate the joint mechanism in one or more ways in place of the sensor output data from the target sensor S1, which can be ignored or otherwise disregarded by the controller, as discussed below. The test results of the comparison test process are recorded or stored as comparison test data 724, which includes a pass or fail condition of each sensor S1-S4. The term "comparison test data" is used herein is the data or information that is indicative of or the result of the comparison test process executed by the sensor compare module as pertaining to the sensor output data of the target sensor and the transformed sensor output data of one or more auxiliary sensors.

Note that, for instance, if sensor S1 and S3/S4 are more agreeable (e.g., at or near 45 degrees), and sensor S2 is more than an acceptable deviation from any one or each of the sensors S1 and S3/S4 (e.g., +/−20% deviation (e.g., 60 degrees)), then sensor S2 may be identified as having "failed" the sensor comparison process or test, and therefore may be removed or not included as an auxiliary sensor of the table of preferred substitute sensors, as further discussed below. The exact parameters of acceptable deviations may be dependent on the particular joint mechanism, and can be pre-determined and selected and programmed accordingly.

The following equations may be used to determine if a given sensor (e.g., sensor S1) and/or group of sensors (e.g., sensors S1-S4) pass the self-test process and/or the sensor comparison process.

$$\text{(a) Sum row}_j(A) = \sum_{i=1}^{N} a_{j,i}$$

$$\text{(b) Sum column}_j(A) = \sum_{i=1}^{N} a_{i,j}$$

$$\text{(i) if } \begin{cases} \text{sum row}_j(A) \geq 2 \\ \text{or} \\ \text{sum column}_j(A) \geq 2 \end{cases}$$

. . . then sensor; fails, and the controller may use the next preferred sensor as a substitute for $\text{sensor}_j$. That is, a hierarchy exists among the preferred sensors.

$$\text{if } \begin{cases} \text{sum row}_j(A) = 1 \\ \text{or} \\ \text{sum column}_j(A) = 1 \end{cases} \tag{ii}$$

. . . then use $S_j$ if the target sensor (sensor j in this case) passes the self-test process, or use as a substitute sensor if the target sensor fails the self-test process. In this case, data generated by the self-test process and by the comparison test process can be processed through a fault manager algorithm that estimates probability that Sj has faulted or failed.

$$\text{if } \begin{cases} \text{sum row}_j(A) = 0 \\ \text{or} \\ \text{sum column}_j(A) = 0 \end{cases} \tag{iii}$$

Figure 15:
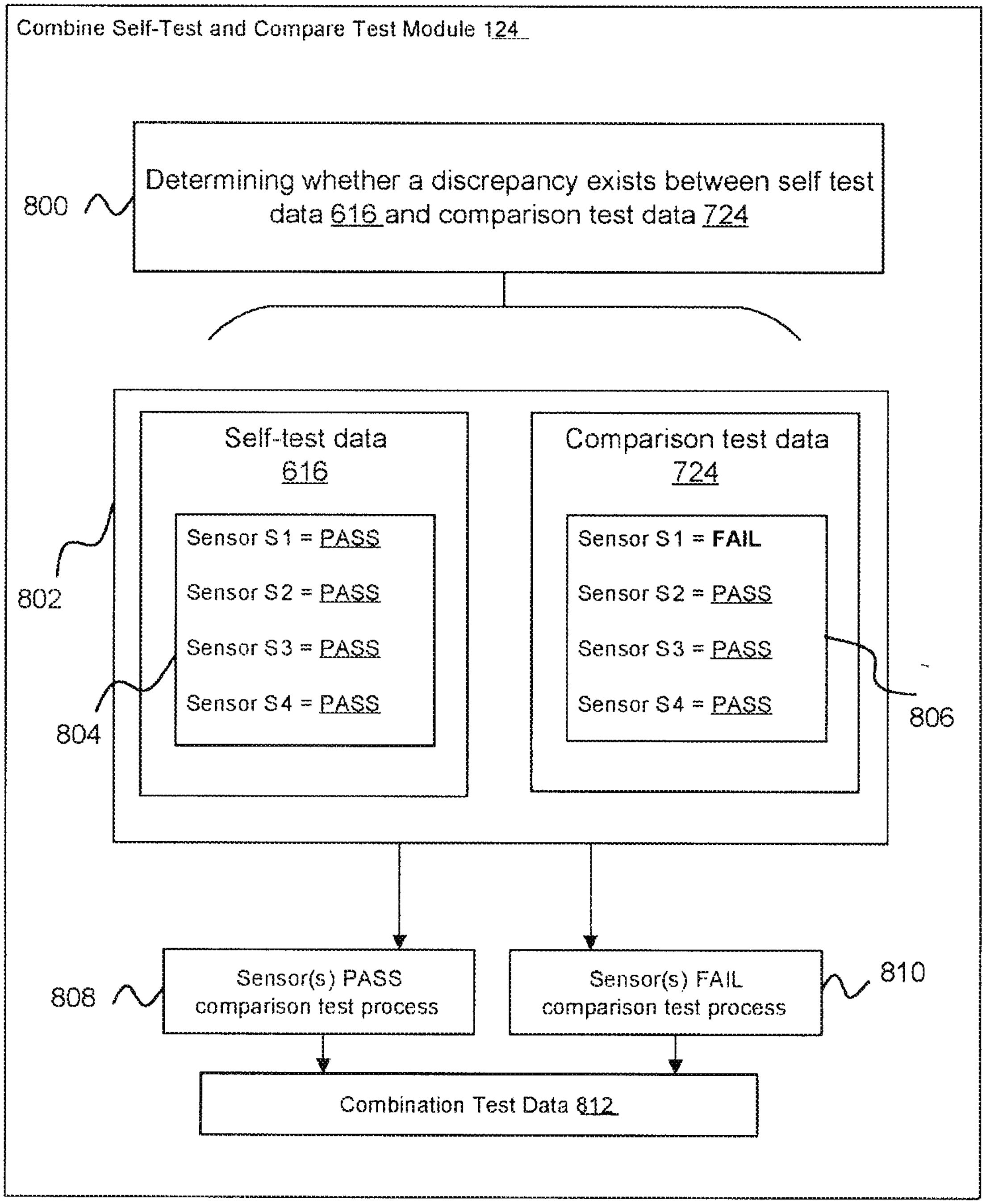
FIG. 15 is a flow diagram that illustrates an example method for performing a sensor combine process, in accordance with an example of the present disclosure.

. . . then if $\text{sensor}_j$ ($S_j$) pass, the controller can use $\text{sensor}_j(S_j)$ The fault manager algorithm can include some or all of the rules or processes discussed herein and shown in FIG. 15 for estimating whether the target sensor S1 is faulty or has failed, for instance.

FIG. 15 illustrates a combination test process executed by the combine self-test and compare test module 124, in accordance with an example of the present disclosure. As noted above regarding example method 500 (see FIG. 12, block 506), the combine self-test and compare test module 124 can be configured to perform or execute a combination test process for determining whether a discrepancy exists between the self-test data 616 and the comparison test data 724. See also block 414 of FIG. 11B. As mentioned above, the test results for each of the sensor self-test process (FIG. 13) and the comparison test process (FIG. 14) can be combined or "looked at together" to determine one or more discrepancies in the data, as in FIG. 15. This provides a more robust redundancy process because it eliminates or minimizes the risk of a false positive that a particular sensor had passed a self-test process, when in-fact a defect or malfunction indeed exists that may only be detectable by the compare test process. Thus, both the sensor self-test process and the compare test process can be run in parallel, and then their test results can be combined, to provide redundant pass/fail processes that are more effective than a single testing process, for instance.

In one example, and keeping with the discussion and examples of FIGS. 13 and 14, as in block 802 of FIG. 15, the combined self-test and compare test module 124 can be configured to execute a combination test process to determine discrepant sensor output data associated with the target sensor S1 as compared to the auxiliary sensors S2-S4. More specifically, as indicated by the self-test data 616 in block 804, all sensors S1-S4 have a "PASS" condition as a result of the sensor self-test process of FIG. 13. However, as in block 806 showing the comparison test data 724, the target sensor S1 has a "FAIL" condition as a result of the comparison test process of FIG. 14. This is possible because the target sensor S1 can meet or satisfy all the defined criteria of the self-test process, but can still fail the comparison test process, as exemplified above. Thus, based on this "comparison" of the self-test data 616 and the comparison test data 724, the combined self-test and compare test module 124 can record or store information that the sensors S2-S4 passed the comparison test process, as in block 808, and that the target sensor S1 that failed the comparison test process, as in block 810. Thus, overall and when looked at and indicated by the combined self-test and compare test module 124, the target sensor S1 has ultimately failed. Such results can be generated as combination test data 812. The term "combination test data" as used herein is referred to as the data or information that is indicative of or the result of the executed by the combine self-test and compare test module as pertaining to the comparison of self-test data and comparison test data.

Figure 16:
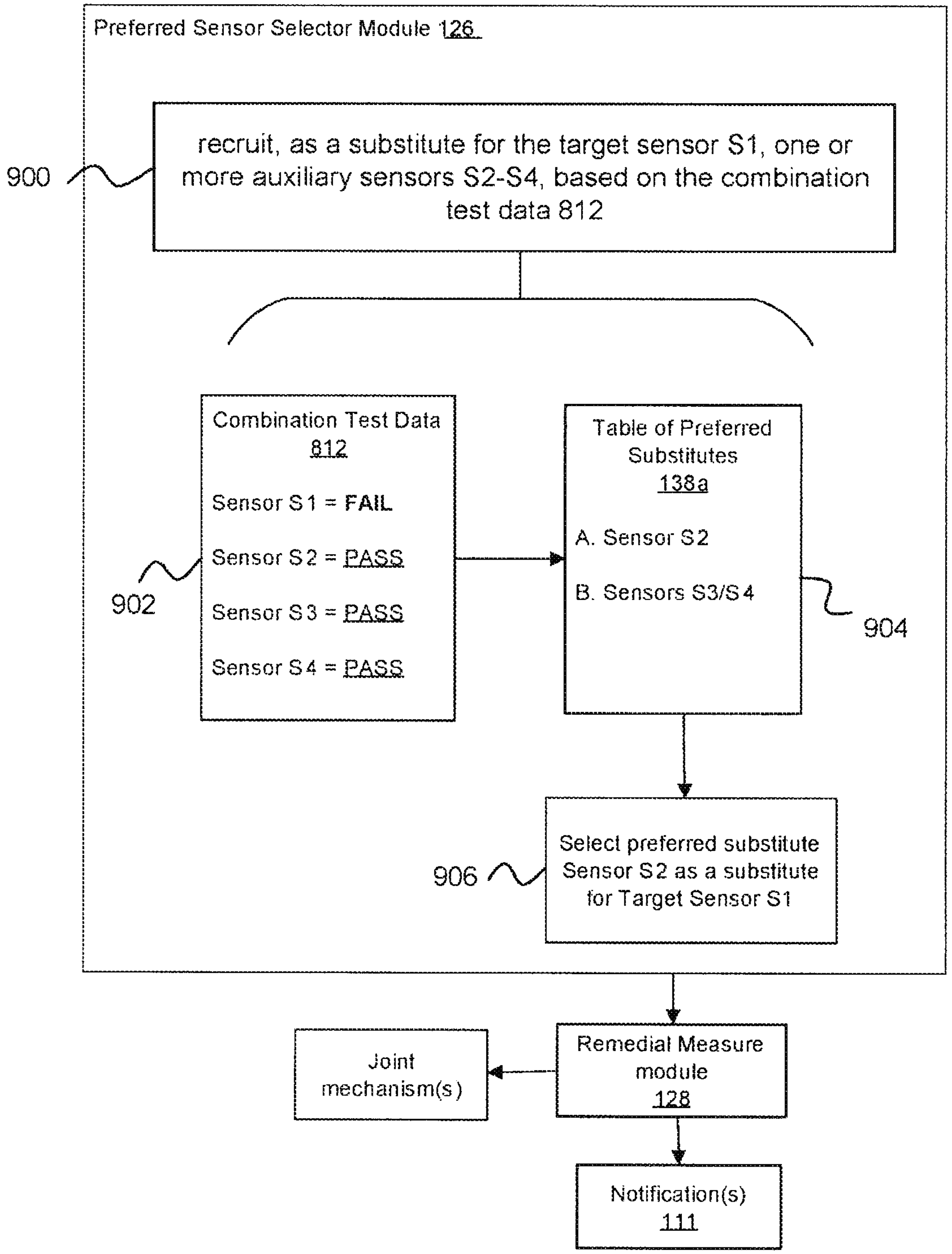
FIG. 16 is a flow diagram that illustrates an example method for performing a sensor selection process, in accordance with an example of the present disclosure.

FIG. 16 illustrates a sensor selection process executed by the preferred sensor selector module 126, in accordance with an example of the present disclosure. As in block 900, the preferred sensor selector module 126 can be configured to recruit, as a substitute for the target sensor S1, one or more auxiliary sensors S2-S4, based on the combination test data 812, in one example, wherein the sensor output data from the target sensor S1 can then be ignored or otherwise disregarded in favor of the substitute sensor(s). Similarly, see block 508 of method 500 of FIG. 12 as another example or method of selecting a substitute sensor. See also FIG. 11B, particular block 416, as another example of a method for recruiting, as a substitute for the target sensor, one or more auxiliary sensors based on the combination test data.

As exemplified in block 902, the combination test data 812 provides or indicates that the target sensor S1 has "failed" (as discussed above in connection with FIG. 15), and that sensors S2-S4 have "passed". Based on this information, as in block 906, the controller 108 may be configured to select or recruit a preferred substitute sensor, such as sensor S2 (e.g., torque sensor), as a substitute for the failed target sensor S1. Such selection or recruitment can be chosen from the table of preferred substitutes 138*a*, as in block 904. The table of preferred substitutes 138*a* can include some or all of the auxiliary sensors S2-S4 that have "passed" the combination test process, such as is exemplified in FIG. 15. Note that, in some applications, a particular table of preferred substitutes associated with a particular joint mechanism may include numerous auxiliary sensors, such as four or more, that may be suitable substitutes (i.e., those sensors that are able to provide comparable sensor output data, that may or may not need to be transformed) for use in place of the sensor output data of a particular failed sensor.

Notably, the table of preferred substitutes 138*a* can be based on a hierarchy of auxiliary sensors S2-S4, meaning that the auxiliary sensors (that have passed the sensor combination process) can be ranked in order of preference. Such ranking can be based on various criterion. In one example, the ranking can be based on the reliability of the particular auxiliary sensor(s), and other parameters such as a deviation from acceptable values associated with the particular joint based on known or acceptable behaviors or conditions. For instance, it may be known that a motor rotor position sensor is more reliable than a torque sensor for purposes of estimating a joint rotational position, because other/external factors can affect the reliability or accuracy of the output of the torque sensor, such as the existence of a compliant transmission, elastic element, or other component. In this way, it may be more preferable to select or recruit as a first option the motor rotor position sensor as a back-up or substitute sensor because its data may be more accurate or reliable.

As another example, it may be known that one or more, or a pair of IMUs are more reliable than a torque sensor along with a rotor position sensor in estimating joint position (the target sensor in this case) because the particular joint mechanism includes a compliant transmission or an elastic element, so the transformation calculation of the sensor output data of the torque sensor may be less reliable or accurate because it can produce an estimated joint rotational position value from a larger range of possible values. Thus, the pair of IMUs can be used as substitutes of the target sensor to more closely and reliably estimate the rotational position of the joint, which can subsequently be used for executing a remedial measure (e.g., generating torque and/or position commands for the joint mechanism 106*a*). In this example, the auxiliary sensors S3/S4 (e.g., IMUs) may be ranked higher than other auxiliary sensors in a particularly hierarchy of a table of preferred substitutes. It is also important to note that in the example provided the hierarchy of the table of preferred substitutes may depend on other parameters, such as the magnitude of the joint torque. For example when the joint torque is very low (e.g. below 1 N-m) the joint compliance related correction to joint position that must be made to joint position estimated using rotor position may result in an estimate that is more accurate than that obtained using sensors S3/S4 (e.g. IMUs), while at larger joint tor levels (e.g. >10 N-m) in which case the sensors S3/S4 may provide a more accurate estimate of the joint position that the combination of rotor position and joint torque.

Regarding other parameters that may affect or dictate the particular hierarchy of available auxiliary sensors as included within a table of preferred substitutes, such other parameters may be associated with the acceptability of the impending movement of the exoskeleton. Essentially, the hierarchy of preferred substitute sensors can be determined in accordance with a variety of factors or parameters. For instance, at low speeds joint speeds estimated from motor back electromotive force or other more complete model of the motor response, may be less accurate than that estimated using a pair of IMUs, while the situation may be reversed at high joint speeds.

The controller (e.g., 108, 208) may be configured to execute or perform a remedial measure using a remedial measure module 128 of the controller, which may be based on the selection of the preferred substitute sensor or sensors by the preferred sensor selector module 126. For instance, the remedial measure module 128 can cause or facilitate transmission of a command signal to an actuator (e.g., 232, 312) of the joint mechanism (e.g., 106*a*, 206*a*, 206*b*) to cause actuation of the joint based on the transformed sensor output data produced by the sensor S2 (instead of using the data of the target sensor S1, because it failed the tests discussed above). Thus, the joint may merely operate as intended and as expected, and the user may not necessarily know or realize that a defect exists or a malfunction has occurred. This may be one example of a fail-safe mode of a safety mode of operation of the exoskeleton by the controller, because the controller merely controls the actuator using different sensor output data from the recruited substitute auxiliary sensor, and therefore is able to facilitate safe operation of the joint mechanism until it can be determined why the target sensor failed, and what repairs the exoskeleton might need.

In some examples, the remedial measure module 128 can be configured to provide at least one notification 111 to indicate to the user (and/or to others) of the possibility of a defect or malfunction of the exoskeleton. The at least one notification 111 can be provided in one or more forms and in a variety of different ways. For example, a notification can comprise an audio signal, a visual signal, a haptic signal, or any combination of these that are sent to the operator, a computer system associated with the operation of the exoskeleton, or to support or other personnel. Based on such notification(s), the operator can then discontinue use of the exoskeleton, or return it to a docking station, or actively switch to another control policy that does not necessarily rely on sensor output data from the target sensor S1 (e.g., joint position sensor) for control of one or more joint mechanisms.

In another example of operating in the safety mode, the remedial measure module 128 can be configured to cause transmission of one or more command signals to a brake or clutch device (e.g., 306) of one or more joint mechanisms (e.g., 106*a-n*, 206*b*) to control or operate the brake or clutch device(s). For instance, if the controller detects a more serious possible defect of malfunction, such as a possible broken transmission of a hip or knee joint mechanism, the remedial measure module 128 may cause all of the lower body joint mechanisms to "freeze" by fully engaging each brake or clutch device of one or more joint mechanisms of the lower body portion of the exoskeleton (and even those of the upper body portion of the exoskeleton, if present, and if necessary). At the same time, the remedial measure module 128 can ensure that actuation command signals are not transmitted to the actuators/motors of the lower body joint mechanisms. This can prevent an unsafe movement of the knee or hip joint, for instance, by preventing any more actuated movement of the lower body joint mechanisms.

In another example of operating in the safety mode, the remedial measure module 128 may cause one or more brakes or clutch devices to be semi-engaged to limit or restrict the rotational speed at which the joint(s) are actuated, which may be useful to allow the operator to slowly and safely operate the exoskeleton to a position or location where the operator can doff the exoskeleton, such as to return the exoskeleton to a docking station, for instance.

In yet another example of operating in a safety mode, the remedial measure module 128 may cause one or more joint mechanisms to be actuated to a "safe position", such as a generally upright position of the exoskeleton so that the user can safely doff or step out of the exoskeleton. This can be independent of any contact displacement device or system designed to actuate movement of the exoskeleton based on operator movement in the exoskeleton. Thus, the remedial measure module 128 may be configured to ignore or shut off a contact displacement system of the exoskeleton, and cause autonomous movement of the exoskeleton independent of movement of the operator via actuating the joints to a pre-defined position. That is, the operator merely "follows" movement of the exoskeleton until it is in a safe location and/or position so that the operator can step out of the exoskeleton. This may be useful to allow the operator to be safely returned to a docking station, for instance, so that diagnostics/maintenance can be performed on the exoskeleton based on the possible defect or malfunction detected and reported by the controller. The remedial measure module 128 may also control one or more brake or clutch devices once the exoskeleton is positioned in a desired safety position, wherein the remedial measure module 128 can then shut off any command signals to all of the motors of the joint mechanisms, essentially shutting down the exoskeleton.

In one example, a discrepancy can be identified between the force moment sensor contacted by the operator to operate the exoskeleton and a known load at the end effector, or a sensed load measured by the at least one torque sensor associated with the joint mechanism. As described herein, the force moment sensor can be a 6-degree of motion force moment sensor. A plurality of force moment sensors can be located at each foot, the hip, the torso, and each hand, for a total of six force moment sensors. The force moment sensors can extract the operator's intent to move and position the exoskeleton and to apply force by the exoskeleton on a workpiece. The force moment sensors can be part of the contact displacement system. The force moment sensors can transmit output signals to the controller in response to user movements so that the controller can execute appropriate control function of the joint mechanism. The controller can transmit a command signal to the actuator of the joint mechanism for effectuating motion and/or applying force of the joint mechanism as intended or desired by the operator. As described herein, at least one load cell or torque sensor can be associated with the joint mechanism and/or actuator to measure and/or determine a load at each joint.

Another way to identify a discrepancy can be by comparing the loads as adjusted by an applied transmission ratio or gain between the sensors. A ratio or gain can be present between the force Fi the operator exerts or experiences on the force moment sensor and the force Fo exerted or experienced by the joint mechanism of the exoskeleton on a workpiece and/or environment. The ratio or gain can be expected or predetermined. In addition, the operator's intent is known. The operator's input or command on the force moment sensor and the expected or predetermined ratio or gain determines the force to be applied by the joint mechanism of the exoskeleton. A discrepancy between the applied force on the force moment sensor and the measured or known force on the torque sensor at the joint mechanism adjusted by the known ratio or gain can identify an issue to be addressed by the controller, such as by executing a remedial measure associated with a safety mode of the exoskeleton based on the identified discrepancy, as described herein. Load cell redundancy can be provided by the know input or command on the force moment sensor, and the desire or measured desired output. The input and output can be correlated to determine a misalignment, difference or disagreement. The force moment sensor and the torque sensor can be part of the sensor discrepancy detection system.

By way of example, the exoskeleton can have an elbow joint with a load at an end effector. The load may be known, or the load may be measured by a load cell or torque sensor at the elbow joint. In addition, the gain of the elbow joint may be set at 10:1. Thus, an input load Fi of 1 lb at the force moment sensor would expect an output force Fo of 10 lb at the end effector as measured by load cell or torque sensor associated with the elbow joint. The controller can compare the sensor data, adjusted by the gain, and determine a difference. If the difference exceeds a predetermined threshold, then the controller can execute a remedial measure associated with a safety mode for operator safety. In addition, the exoskeleton can have redundancy. The controller can use other redundant sensors to continue to operate to get to the safe mode. The torque sensors of other joint mechanisms, such as a wrist joint and a shoulder joint, can also sense a moment caused by the load at the end effector that can be analyzed by the controller.

Figure 17:
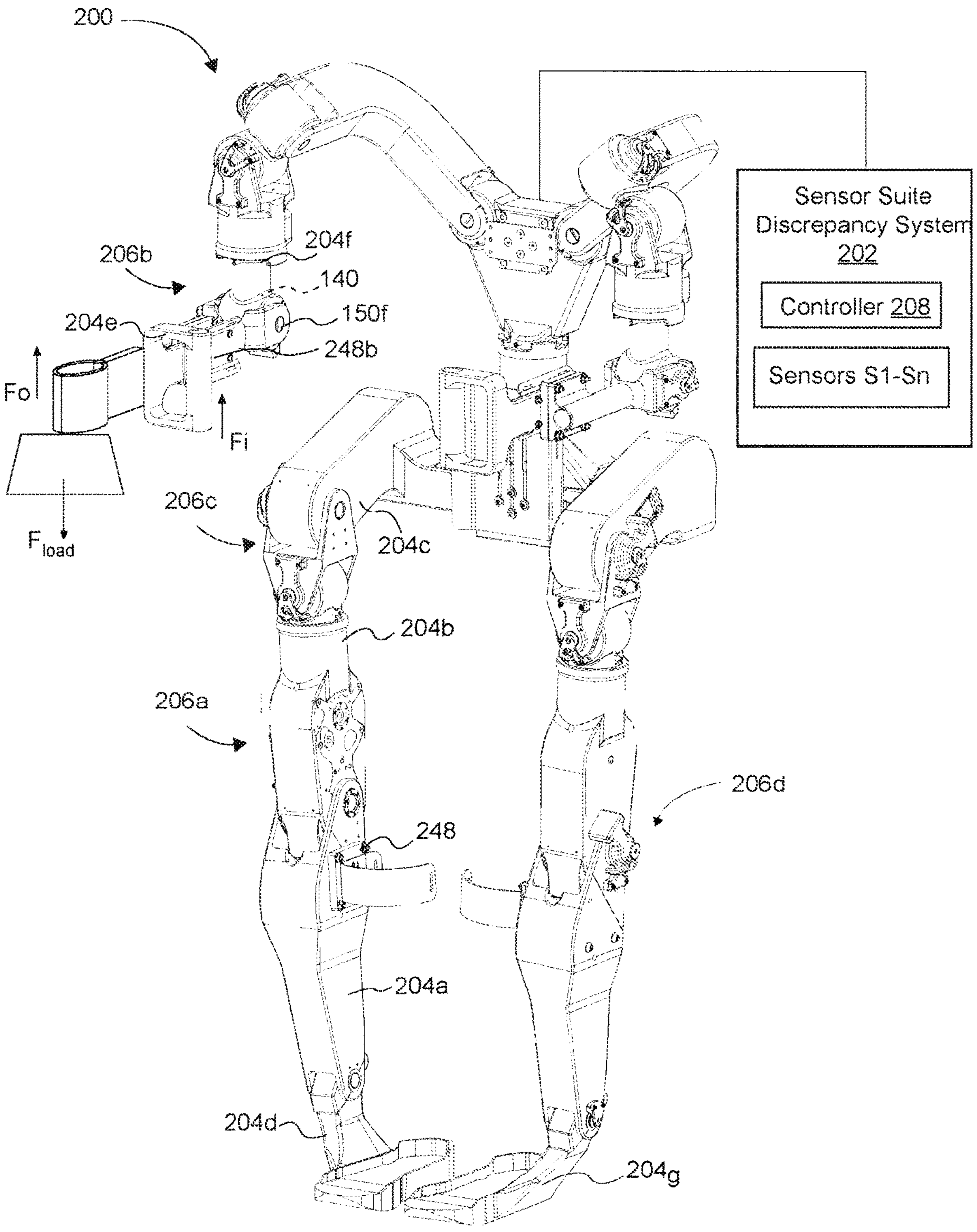
FIG. 17 is an isometric view of an exoskeleton having a sensor suite discrepancy detection system, in accordance with an example of the present disclosure.

FIG. 17 illustrates an exoskeleton 200 having a sensor discrepancy detection system 202, in accordance with an example of the present disclosure. As described herein, the exoskeleton 200 can have a plurality of joint mechanism 206*a-d* and associated actuators 140 (FIG. 5) to actuate the joint mechanism. Also, as described herein, a plurality of force moment sensors 248 and 248*b* can be associated with the joint mechanisms 206*a-d*, carried by the exoskeleton 200. The force moment sensors 248 and 248*b* can be coupled to or otherwise associated with a support structure (e.g., a leg or arm structure of the exoskeleton, a foot structure, etc.) adjacent the joint mechanisms, which support structure is positioned to be in contact with a human element of a user operating the exoskeleton, wherein the force moment sensors 248 and 248*b* operate to transmit output signals, such as by sensing movements of the human element of the user. In one example, the force moment sensors 248 and 248*b* can be 6-axis load cells to sense movement of the user. The force moment sensors 248 and 248*b* can transmit sensor output signals to effectuate position movement and applied force of the exoskeleton 200. The force moment sensors 248 and 248*b* can generate sensor output data associated with the force moment sensors. The force moment sensors 248 and 248*b* can be part of a contact displacement system, as described herein. Also, as described herein, the controller 208 can receive the sensor output data associated with the force moment sensors 248 and 248*b* and transmit a command signal to the actuators 140 (FIG. 5) of the joint mechanism to effectuate position motion and applied force of the joint mechanism as intended by the user. Also, as described herein, at least one torque sensor (e.g., torque sensor 150*f*) can be associated with one or more of the joint mechanisms 206*a-d*. The at least one torque sensor 150*f* can generate sensor output data associated with the one or more joint mechanisms.

In one example, the controller 208 can execute a remedial measure associated with a safety mode of the exoskeleton 200 based on an identified discrepancy between the sensor output data associated with the force moment sensor 248*b* and a known load 950 applied to the joint mechanism 206*b*. The controller 208 and/or the user may know the quantity of the applied load 950. The known load 950 can be an external force or weight applied to an end effector. The controller 208 can transform or adjust the known load 950 and/or the sensor output data of the force moment sensor 248*b* based on the gain ratio or factor for comparison.

In one example, the controller can execute the remedial measure associated with the safety mode of the exoskeleton based on an identified discrepancy between the sensor output data associated with the force moment sensor 248*b* and transformed sensor output data associated with the at least one torque sensor 150*f*. The sensor output data from the torque sensor 150*f*, and/or the force moment sensor 248, can be transformed or adjusted by the controller 208 in accordance with a gain ratio or factor between the force moment sensor 248*b* and the torque sensor 150*f*. In addition, the sensor output data from the torque sensor 150*f* can be transformed or adjusted by the controller 208 in accordance with units of torque and force. In one example, the known load can be measured by the torque sensor 150*f* and can be the sensor output data of the torque sensor 150*f*. Thus, the term "known load" is used herein to mean at least one of an external load of known quantity or load sensor data, such as from the torque sensor, corresponding to the load.

As described herein, the controller 208 can recruit the at least one auxiliary sensor 150*b-e* based on the identified discrepancy to execute the remedial measure associated with the safety mode of the exoskeleton. The force moment sensor 248*b* and/or the torque sensor 150*f* can be part of the sensor group and can define the target sensor. The force moment sensor 248*b*, the torque sensor 150*f*, and the controller 208 can be part of the sensor suite discrepancy system and/or a sensor discrepancy detection system.

Figure 18:
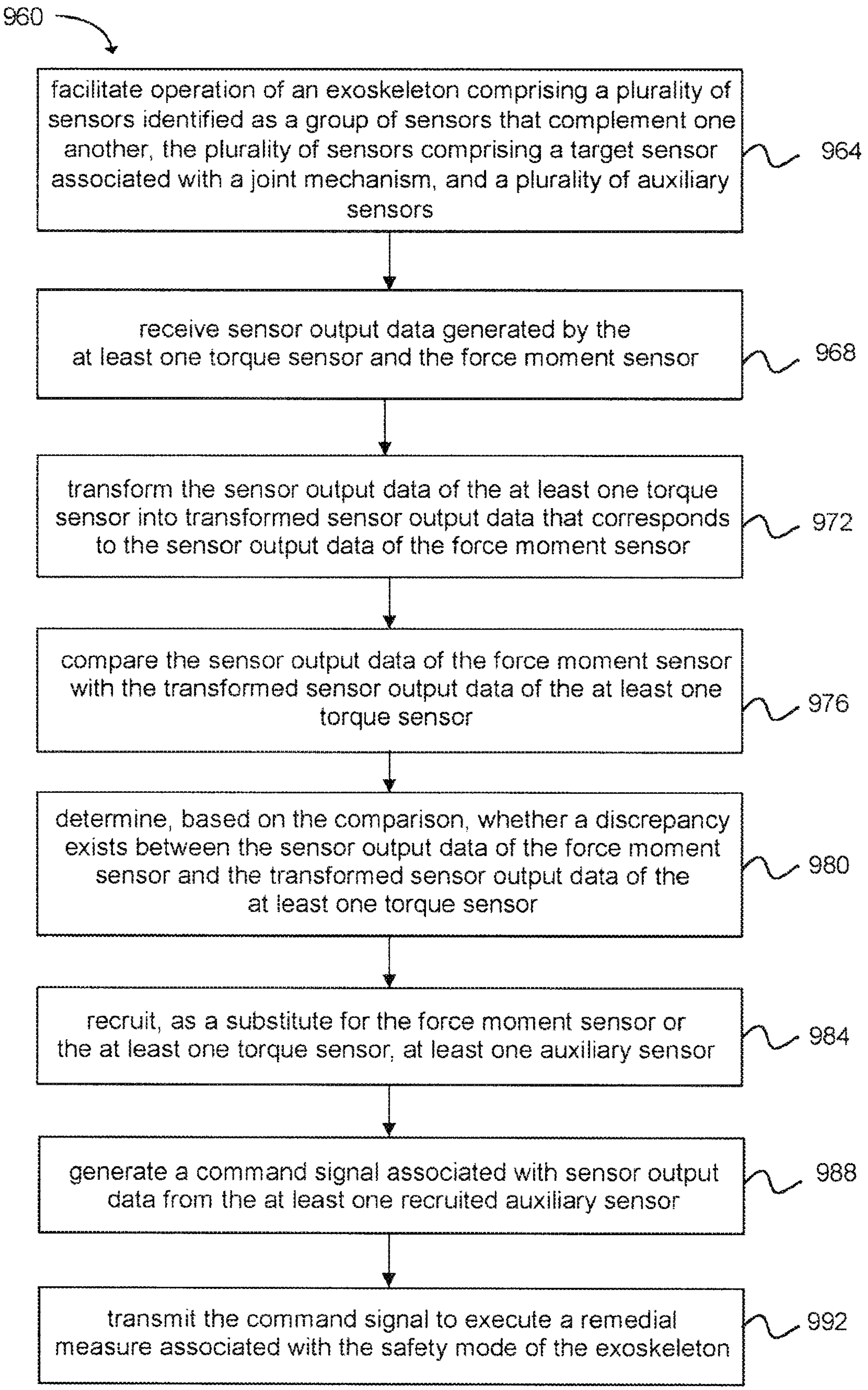
FIG. 18 is a flow diagram that illustrates an example method for safe operation of an exoskeleton, in accordance with an example of the present disclosure.

FIG. 18 provides a flow diagram of a method 960 for safe operation of an exoskeleton, which can be executed by a controller (e.g., 108, 208) of a sensor suite discrepancy detection system (e.g., 102, 202) or sensor discrepancy detection system, in accordance with an example of the present disclosure. As in block 964, a controller 208 can be configured to facilitate operation of an exoskeleton (e.g., 100, 200) having a force moment sensor 248*b*, at least one torque sensor 150*f*, and other sensors, such as a suite of sensors. The sensor suite can comprise one or more predetermined sensor groups, with the sensors in a group being known to be able to complement one another (i.e., one or more sensors in the group are able, as pre-determined, to function as substitutes for one or more other sensors within the group, or more specifically, to provide sensor output data that can substitute for the sensor output data of the target sensor).

As in block 968, the method can comprise receiving sensor output data generated by the at least one torque sensor 150*f* and the force moment sensor 248*b*. As in block 972, the method can comprise transforming the sensor output data of the at least one torque sensor 150*f* into transformed sensor output data that corresponds to the sensor output data of the force moment sensor 248*b*. As described herein, the sensor output data from the torque sensor 150*f* can be transformed or adjusted by the controller 208 in accordance with a gain ratio or factor between the force moment sensor 248*b* and the torque sensor 150*f*. As in block 976, the method can comprise comparing the sensor output data of the force moment sensor 248*b* with the transformed sensor output data of the at least one torque sensor 150*f*. As in block 980, the method can comprise determining, based on the comparison, whether a discrepancy exists between the sensor output data of the force moment sensor 248*b* and the transformed sensor output data of the at least one torque sensor 150*f*. As in block 984, the method can comprise recruiting, as a substitute for the force moment sensor 248*b* or the at least one torque sensor 150*f*, at least one auxiliary sensor, as described herein. As in block 988, the method can comprise generating a command signal associated with sensor output data from the at least one recruited auxiliary sensor. As in block 992, the method can comprise transmitting the command signal to execute a remedial measure associated with the safety mode of the exoskeleton.

Figure 19:
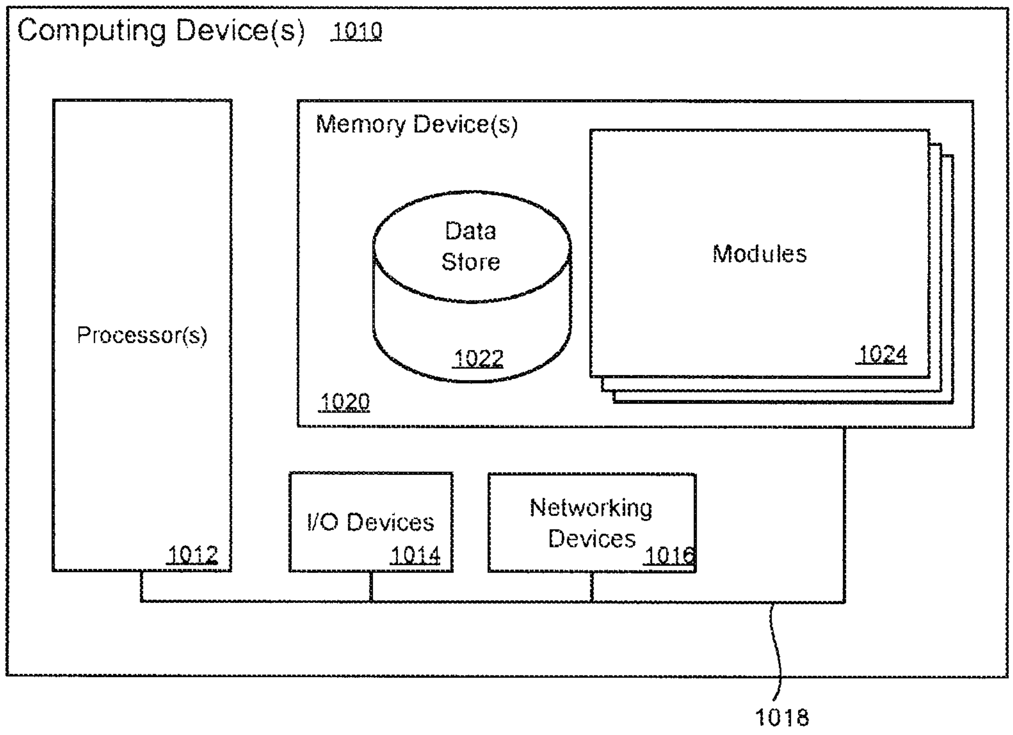
FIG. 19 is block diagram illustrating an example of a computing device that can be used to execute a method for safe operation of an exoskeleton, in accordance with an example of the present disclosure.

FIG. 19 illustrates a computing device 1010 on which modules of this technology can execute. A computing device 1010 is illustrated on which a high level example of the technology can be executed. The computing device 1010 can include one or more processors 1012 that are in communication with memory devices 1020. The computing device 1010 can include a local communication interface 1018 for the components in the computing device. For example, the local communication interface 1018 can be a local data bus and/or any related address or control busses as can be desired.

The memory device 1020 can contain modules 1024 that are executable by the processor(s) 1012 and data for the modules 1024. The modules 1024 can execute the functions described earlier. A data store 1022 can also be located in the memory device 1020 for storing data related to the modules 1024 and other applications along with an operating system that is executable by the processor(s) 1012.

Other applications can also be stored in the memory device 1020 and can be executable by the processor(s) 1012. Components or modules discussed in this description that can be implemented in the form of software using high-level programming languages that are compiled, interpreted or executed using a hybrid of the methods.

The computing device can also have access to I/O (input/output) devices 1014 that are usable by the computing devices. Networking devices 1016 and similar communication devices can be included in the computing device. The networking devices 1016 can be wired or wireless networking devices that connect to the internet, a LAN, WAN, or other computing network.

The components or modules that are shown as being stored in the memory device 1020 can be executed by the processor(s) 1012. The term "executable" can mean a program file that is in a form that can be executed by a processor 1012. For example, a program in a higher level language can be compiled into machine code in a format that can be loaded into a random access portion of the memory device 1020 and executed by the processor 1012, or source code can be loaded by another executable program and interpreted to generate instructions in a random access portion of the memory to be executed by a processor. The executable program can be stored in any portion or component of the memory device 1020. For example, the memory device 1020 can be random access memory (RAM), read only memory (ROM), flash memory, a solid state drive, memory card, a hard drive, optical disk, floppy disk, magnetic tape, or any other memory components.

The processor 1012 can represent multiple processors and the memory device 1020 can represent multiple memory units that operate in parallel to the processing circuits. This can provide parallel processing channels for the processes and data in the system. The local communication interface 1018 can be used as a network to facilitate communication between any of the multiple processors and multiple memories. The local communication interface 1018 can use additional systems designed for coordinating communication such as load balancing, bulk data transfer and similar systems.

While the flowcharts presented for this technology can imply a specific order of execution, the order of execution can differ from what is illustrated. For example, the order of two more blocks can be rearranged relative to the order shown. Further, two or more blocks shown in succession can be executed in parallel or with partial parallelization. In some configurations, one or more blocks shown in the flow chart can be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

Modules can also be implemented in software for execution by various types of processors. An identified module of executable code can, for instance, comprise one or more blocks of computer instructions, which can be organized as an object, procedure, or function. Nevertheless, the executables of an identified module need not be physically located together, but can comprise disparate instructions stored in different locations which comprise the module and achieve the stated purpose for the module when joined logically together.

Indeed, a module of executable code can be a single instruction, or many instructions and can even be distributed over several different code segments, among different programs and across several memory devices. Similarly, operational data can be identified and illustrated herein within modules and can be embodied in any suitable form and organized within any suitable type of data structure. The operational data can be collected as a single data set, or it can be distributed over different locations including over different storage devices. The modules can be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein can also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The use of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An exoskeleton, comprising:

a joint mechanism;

at least one actuator configured to actuate the joint mechanism;

a sensor group comprising a plurality of sensors configured to generate sensor output data, the sensor group associated with the joint mechanism;

at least one torque sensor associated with the joint mechanism and configured to generate sensor output data associated with the at least one joint mechanism and corresponding to a known load;

a force moment sensor carried by the exoskeleton and associated with a support structure in contact with a human element of a user operating the exoskeleton, the force moment sensor being configured to generate sensor output data associated with the force moment sensor;

a target sensor of the sensor group defined by at least one of the force moment sensor or the torque sensor;

at least one auxiliary sensor of the sensor group, the at least one auxiliary sensor and the target sensor positioned at different locations; and a controller configured to receive the sensor output data associated with the force moment sensor and transmit a command signal to the at least one actuator, wherein the controller is configured to execute a remedial measure associated with a safety mode of the exoskeleton based on an identified discrepancy between the sensor output data associated with the force moment sensor and a known load applied to the joint mechanism, and wherein the controller is configured to recruit the at least one auxiliary sensor and execute the remedial measure based on transformed sensor output data associated with the at least one torque sensor as the auxiliary sensor.

2. The exoskeleton as in claim 1, wherein the known load is an external weight applied to an end effector associated with the joint mechanism.

3. The exoskeleton as in claim 1, wherein the controller is configured to transform the sensor output data of the at least one of the force moment sensor and the at least one torque sensor in accordance with a gain ratio between the force moment sensor and the at least one torque sensor.

4. The exoskeleton as in claim 1, further comprising:

a sensor group comprising a plurality of sensors configured to generate sensor output data, the sensor group associated with the joint mechanism;

at least one auxiliary sensor of the sensor group, the at least one auxiliary sensor positioned at a different location than at least one of the force moment sensor or the torque sensor; and the controller configured to recruit the at least one auxiliary sensor based on the identified discrepancy to execute the remedial measure associated with the safety mode of the exoskeleton.

5. The exoskeleton as in claim 1, wherein the joint mechanism comprises at least one of a brake or a clutch device, and wherein the controller is configured to transmit a command signal to the brake or clutch device for operating the brake or clutch device to execute the remedial measure.

6. The exoskeleton as in claim 1, further comprising a plurality of joint mechanisms, wherein the controller is configured to control operation of an actuator of each of at least some of the joint mechanisms, independent of user control, to execute the remedial measure associated with the safety mode or a fail-safe mode of the exoskeleton.

7. The exoskeleton as in claim 1, further comprising a plurality of joint mechanisms, and a suite of sensors comprising a plurality of sensor groups, wherein each sensor group is associated with a respective joint mechanism of the plurality of joint mechanisms, and wherein each sensor group comprises a respective plurality of sensors that complement one another.

8. An exoskeleton, comprising:

a joint mechanism;

at least one actuator configured to actuate the joint mechanism;

at least one torque sensor associated with the joint mechanism and configured to generate sensor output data associated with the at least one joint mechanism;

a force moment sensor carried by the exoskeleton and associated with a support structure in contact with a human element of a user operating the exoskeleton, the force moment sensor being configured to generate sensor output data associated with the force moment sensor; and a controller configured to receive the sensor output data associated with the force moment sensor and transmit a command signal to the at least one actuator, the controller configured to execute a remedial measure associated with a safety mode of the exoskeleton based on an identified discrepancy between the sensor output data associated with the force moment sensor and transformed sensor output data associated with the at least one torque sensor, wherein the controller, as part of a sensor suite discrepancy detection system, is configured to:

receive sensor output data generated by the at least one torque sensor and the force moment sensor;

transform the sensor output data of the at least one torque sensor into the transformed sensor output data that corresponds to the sensor output data of the force moment sensor;

compare the sensor output data of the force moment sensor with the transformed sensor output data of the at least one torque sensor;

determine, based on the comparison, whether a discrepancy exists between the sensor output data of the force moment sensor and the transformed sensor output data of the at least one torque sensor;

recruit, as a substitute for the force moment sensor or the at least one torque sensor, at least one auxiliary sensor;

generate a command signal associated with sensor output data from the at least one recruited auxiliary sensor; and transmit the command signal to execute a remedial measure associated with the safety mode of the exoskeleton.

9. The exoskeleton as in claim 8, wherein the controller is configured to transform the sensor output data of at least one of the force moment sensor and the at least one torque sensor in accordance with a gain ratio between the force moment sensor and the at least one torque sensor.

10. The exoskeleton as in claim 8, further comprising:

a sensor group comprising a plurality of sensors configured to generate sensor output data, the sensor group associated with the joint mechanism;

at least one auxiliary sensor of the sensor group, the at least one auxiliary sensor positioned at a different location than at least one of the force moment sensor or the torque sensor; and the controller configured to recruit the at least one auxiliary sensor based on the identified discrepancy to execute the remedial measure associated with the safety mode of the exoskeleton.

11. The exoskeleton as in claim 8, wherein the joint mechanism comprises at least one of a brake or a clutch device, and wherein the controller is configured to transmit a command signal to the brake or clutch device for operating the brake or clutch device to execute the remedial measure.

12. The exoskeleton as in claim 8, further comprising a plurality of joint mechanisms, wherein the controller is configured to control operation of an actuator of each of at least some of the joint mechanisms, independent of user control, to execute the remedial measure associated with the safety mode or a fail-safe mode of the exoskeleton.

13. The exoskeleton as in claim 8, further comprising a plurality of joint mechanisms, and a suite of sensors comprising a plurality of sensor groups, wherein each sensor group is associated with a respective joint mechanism of the plurality of joint mechanisms, and wherein each sensor group comprises a respective plurality of sensors that complement one another.

14. The exoskeleton as in claim 8, further comprising:

a sensor group comprising a plurality of sensors configured to generate sensor output data, the sensor group associated with the joint mechanism;

a target sensor of the sensor group defined by at least one of the force moment sensor or the torque sensor, wherein the at least one auxiliary sensor and the target sensor positioned at different locations.

15. An exoskeleton, comprising:

a joint mechanism;

at least one actuator configured to actuate the joint mechanism;

at least one torque sensor associated with the joint mechanism and configured to generate sensor output data associated with the joint mechanism;

a contact displacement system comprising a force moment sensor associated with the joint mechanism, and coupled to a support structure adjacent the joint mechanism and positioned to be in contact with a human element of a user operating the exoskeleton, and configured to sense movement of the user and transmit output signals;

a controller configured to receive the output signals from the force moment sensor and transmit a command signal to the at least one actuator of the joint mechanism configured to effectuate position motion and applied force of the joint mechanism; and a sensor suite discrepancy detection system configured to execute a remedial measure associated with a safety mode of the exoskeleton based on an identified discrepancy between the output data associated with the force moment sensor and transformed sensor output data associated with the at least one torque sensor, the controller transforming the sensor output data with a gain ratio between the force moment sensor and the at least one torque sensor.

16. The exoskeleton as in claim 15, further comprising:

a sensor group comprising a plurality of sensors configured to generate sensor output data, the sensor group associated with the joint mechanism;

a target sensor of the sensor group defined by at least one of the force moment sensor or the torque sensor;

at least one auxiliary sensor of the sensor group, the at least one auxiliary sensor and the target sensor positioned at different locations; and the controller configured to recruit the at least one auxiliary sensor based on the identified discrepancy to execute the remedial measure associated with the safety mode of the exoskeleton.

17. A method for safe operation of an exoskeleton, the method comprising:

operating the exoskeleton in a normal operation mode, the exoskeleton comprising a torque sensor configured to generate sensor output data pertaining to an applied load on the exoskeleton;

operating a contact displacement system comprising a force moment sensor associated with the joint mechanism, and coupled to a support structure adjacent the joint mechanism and positioned to be in contact with a human element of a user operating the exoskeleton, the force moment sensor being configured to sense movement of the user and transmit output signals;

operating a sensor suite discrepancy detection system of the exoskeleton to identified discrepancy between the output data associated with the force moment sensor and transformed sensor output data associated with the torque sensor; and operating the exoskeleton in a safe operating mode as switched by the controller from the normal operating mode.

18. The method of claim 17, wherein the exoskeleton comprising a suite of sensors configured to generate sensor output data pertaining to at least one operational function of the exoskeleton; the method further comprising:

facilitating recruitment of, through continued use of the exoskeleton and through use of a controller of the sensor suite discrepancy detection system, at least one auxiliary sensor as a substitute for at least one of the force moment sensor and the at least one torque sensor; and operating the exoskeleton in a safe operating mode as switched by the controller from the normal operating mode, wherein the one or more recruited auxiliary sensors operate as a substitute for the at least one of the force moment sensor and the at least one torque sensor.

19. The method of claim 17, wherein the exoskeleton comprises a suite of sensors configured to generate sensor output data pertaining to at least one operational function of the exoskeleton; wherein the sensor suite discrepancy detection system comprises a sensor group comprising a plurality of sensors of the suite of sensors, the sensor group associated with a joint mechanism of the exoskeleton, the sensor group comprising a target sensor and a plurality of auxiliary sensors that complement each other; the method further comprising:

facilitating recruitment of, through continued use of the exoskeleton and through use of a controller of the sensor suite discrepancy detection system, at least one auxiliary sensor as a substitute for the target sensor based on an identified discrepancy between sensor output data of the target sensor and transformed sensor output data of at least one auxiliary sensor of the plurality of auxiliary sensors; and operating the exoskeleton in a safe operating mode as switched by the controller from the normal operating mode, wherein the one or more recruited auxiliary sensors operate as a substitute for the target sensor.

20. An exoskeleton, comprising:

a joint mechanism;

at least one actuator configured to actuate the joint mechanism;

a sensor group comprising a plurality of sensors configured to generate sensor output data, the sensor group associated with the joint mechanism;

at least one torque sensor associated with the joint mechanism and configured to generate sensor output data associated with the at least one joint mechanism;

a force moment sensor carried by the exoskeleton and associated with a support structure in contact with a human element of a user operating the exoskeleton, the force moment sensor being configured to generate sensor output data associated with the force moment sensor;

a target sensor of the sensor group defined by at least one of the force moment sensor or the torque sensor;

at least one auxiliary sensor of the sensor group, the at least one auxiliary sensor and the target sensor positioned at different locations;

a controller configured to receive the sensor output data associated with the force moment sensor and transmit a command signal to the at least one actuator; and the controller configured to recruit and at least one auxiliary sensor and execute a remedial measure associated with a safety mode of the exoskeleton based on an identified discrepancy between the sensor output data associated with the force moment sensor and transformed sensor output data associated with the at least one torque sensor.

* * * * *